United States Patent
Huang et al.

(10) Patent No.: US 12,280,889 B1
(45) Date of Patent: Apr. 22, 2025

(54) INDOOR NAVIGATION AND OBSTACLE AVOIDANCE FOR UNMANNED AERIAL VEHICLES

(71) Applicant: Amazon Technologies, Inc., Seattle, WA (US)

(72) Inventors: Chong Huang, Goleta, CA (US); Yibo Cao, Sunnyvale, CA (US); Cheng Chen, San Jose, CA (US); Yang Liu, Saratoga, CA (US); Kah Kuen Fu, Cupertino, CA (US); Tianyang Ma, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 272 days.

(21) Appl. No.: 17/855,071

(22) Filed: Jun. 30, 2022

(51) Int. Cl.
| | |
|---|---|
| *B64C 39/02* | (2023.01) |
| *B64D 35/08* | (2006.01) |
| *B64D 47/00* | (2006.01) |
| *G01C 21/20* | (2006.01) |
| *G05D 1/00* | (2024.01) |

(52) U.S. Cl.
CPC ............ *B64C 39/024* (2013.01); *B64D 35/08* (2013.01); *B64D 47/00* (2013.01); *G01C 21/206* (2013.01); *G05D 1/1064* (2019.05); *B64U 2201/00* (2023.01)

(58) Field of Classification Search
CPC .. B64C 39/024; B65G 1/1373; G06V 20/176; B64U 10/14; G05D 1/0016; G05D 1/10; B64D 31/04
See application file for complete search history.

(56) References Cited

U.S. PATENT DOCUMENTS

| | | | |
|---|---|---|---|
| 3,417,729 | A | 12/1968 | Gilday et al. |
| 3,575,527 | A | 4/1971 | Sumitani et al. |
| 3,805,723 | A | 4/1974 | Bernaerts |
| (Continued) | | | |

FOREIGN PATENT DOCUMENTS

| | | |
|---|---|---|
| CN | 101385059 A | 3/2009 |
| CN | 103224026 A | 7/2013 |
| (Continued) | | |

OTHER PUBLICATIONS

Wikipedia, "Ramer-Douglas-Peucker Algorithm," www.wikipedia.com, Wikipedia: The Free Encyclopedia, 5 pages, Aug. 18, 2022, URL: https://en.wikipedia.org/wiki/Ramer%E2%80%93Douglas%E2%80%93Peucker_algorithm, obtained via web.archive.org on Jan. 6, 2023.

(Continued)

*Primary Examiner* — Yuri Kan
(74) *Attorney, Agent, or Firm* — Athorus, PLLC

(57) ABSTRACT

An aerial vehicle is configured to operate within indoor spaces. The aerial vehicle is programmed with positions of waypoints within three-dimensional space, and to calculate a trajectory for traveling through such waypoints in a manner that minimizes snap of the aerial vehicle. Where a distance between a pair of the waypoints is sufficiently long, the aerial vehicle inserts intervening waypoints for planning purposes, and programs the aerial vehicle to travel at a maximum speed between the intervening waypoints. Upon detecting an obstacle with a first range using one or more sensors, the aerial vehicle reduces its speed and monitors a second, shorter range using the sensors, and compensates for motion between such readings.

34 Claims, 28 Drawing Sheets

PATH OF WAYPOINTS FOR DRONE IN INDOOR SPACE

(56) References Cited

U.S. PATENT DOCUMENTS

| | | |
|---|---|---|
| 4,865,248 A | 9/1989 | Barth |
| 4,954,962 A | 9/1990 | Evans, Jr. et al. |
| 5,040,116 A | 8/1991 | Evans, Jr. et al. |
| 5,283,739 A | 2/1994 | Summerville et al. |
| 5,371,581 A | 12/1994 | Wangler et al. |
| 5,386,462 A | 1/1995 | Schlamp |
| 5,452,374 A | 9/1995 | Cullen et al. |
| 5,497,236 A | 3/1996 | Wolff et al. |
| 5,731,884 A | 3/1998 | Inoue |
| 5,847,522 A | 12/1998 | Barba |
| 5,901,253 A | 5/1999 | Tretter |
| 5,995,898 A | 11/1999 | Tuttle |
| 6,031,612 A | 2/2000 | Shirley |
| 6,266,577 B1 | 7/2001 | Popp et al. |
| 6,344,796 B1 | 2/2002 | Ogilvie et al. |
| 6,374,155 B1 | 4/2002 | Wallach et al. |
| 6,426,699 B1 | 7/2002 | Porter |
| 6,507,670 B1 | 1/2003 | Moed |
| 6,543,983 B1 | 4/2003 | Felder et al. |
| 6,636,781 B1 | 10/2003 | Shen et al. |
| 6,676,460 B1 | 1/2004 | Motsenbocker |
| 6,690,997 B2 | 2/2004 | Rivalto |
| 6,694,217 B2 | 2/2004 | Bloom |
| 6,705,523 B1 | 3/2004 | Stamm et al. |
| 6,804,607 B1 | 10/2004 | Wood |
| 6,919,803 B2 | 7/2005 | Breed |
| 6,954,290 B1 | 10/2005 | Braudaway et al. |
| 6,961,711 B1 | 11/2005 | Chee |
| 6,965,440 B1 | 11/2005 | Nakagiri et al. |
| 6,970,838 B1 | 11/2005 | Kamath et al. |
| 7,006,952 B1 | 2/2006 | Matsumoto et al. |
| 7,016,536 B1 | 3/2006 | Ling et al. |
| 7,031,519 B2 | 4/2006 | Elmenhurst |
| 7,129,817 B2 | 10/2006 | Yamagishi |
| 7,133,743 B2 | 11/2006 | Tilles et al. |
| 7,145,699 B2 | 12/2006 | Dolan |
| 7,149,611 B2 | 12/2006 | Beck et al. |
| 7,171,879 B2 | 2/2007 | Gass et al. |
| 7,188,513 B2 | 3/2007 | Wilson |
| 7,335,071 B1 | 2/2008 | Motsenbocker |
| 7,337,686 B2 | 3/2008 | Sagi-Dolev |
| 7,337,944 B2 | 3/2008 | Devar |
| 7,339,993 B1 | 3/2008 | Brooks et al. |
| 7,459,880 B1 | 12/2008 | Rosen |
| 7,639,386 B1 | 12/2009 | Siegel et al. |
| 7,668,404 B2 | 2/2010 | Adams et al. |
| 7,673,831 B2 | 3/2010 | Steele et al. |
| 7,685,953 B2 | 3/2010 | Giles |
| 7,693,745 B1 | 4/2010 | Pomerantz et al. |
| 7,894,939 B2 | 2/2011 | Zini et al. |
| 7,925,375 B2 | 4/2011 | Schininger et al. |
| 7,946,526 B2 | 5/2011 | Zimet |
| 7,946,530 B1 | 5/2011 | Talmage, Jr. |
| 7,966,093 B2 | 6/2011 | Zhuk |
| 8,015,023 B1 | 9/2011 | Lee et al. |
| 8,078,317 B2 | 12/2011 | Allinson et al. |
| 8,126,642 B2 | 2/2012 | Trepagnier et al. |
| 8,131,607 B2 | 3/2012 | Park et al. |
| 8,145,351 B2 | 3/2012 | Schininger et al. |
| 8,195,328 B2 | 6/2012 | Mallett et al. |
| 8,286,236 B2 | 10/2012 | Jung et al. |
| 8,412,588 B1 | 4/2013 | Bodell et al. |
| 8,418,959 B2 | 4/2013 | Kang et al. |
| 8,429,754 B2 | 4/2013 | Jung et al. |
| 8,473,189 B2 | 6/2013 | Christoph |
| 8,511,606 B1 | 8/2013 | Utke et al. |
| 8,577,538 B2 | 11/2013 | Lenser et al. |
| 8,599,027 B2 | 12/2013 | Sanchez |
| 8,602,349 B2 | 12/2013 | Petrov |
| 8,639,400 B1 | 1/2014 | Wong |
| 8,736,820 B2 | 5/2014 | Choe et al. |
| 8,752,166 B2 | 6/2014 | Jung et al. |
| 8,791,790 B2 | 7/2014 | Robertson et al. |
| 8,874,301 B1 | 10/2014 | Rao et al. |
| 8,899,903 B1 | 12/2014 | Saad et al. |
| 8,948,914 B2 | 2/2015 | Zini et al. |
| 8,956,100 B2 | 2/2015 | Davi et al. |
| 8,989,053 B1 | 3/2015 | Skaaksrud et al. |
| 9,033,285 B2 | 5/2015 | Iden et al. |
| 9,051,043 B1 | 6/2015 | Peeters et al. |
| 9,079,587 B1 | 7/2015 | Rupp et al. |
| 9,139,310 B1 | 9/2015 | Wang |
| 9,163,909 B2 | 10/2015 | Chengalva |
| 9,193,452 B2 | 11/2015 | Carreker |
| 9,195,959 B1 | 11/2015 | Lopez et al. |
| 9,216,587 B2 | 12/2015 | Ando et al. |
| 9,216,857 B1 | 12/2015 | Kalyan et al. |
| 9,230,236 B2 | 1/2016 | Villamar |
| 9,235,213 B2 | 1/2016 | Villamar |
| 9,244,147 B1 | 1/2016 | Soundararajan et al. |
| 9,256,852 B1 | 2/2016 | Myllymaki |
| 9,261,578 B2 | 2/2016 | Im et al. |
| 9,321,531 B1 | 4/2016 | Takayama et al. |
| 9,336,506 B2 | 5/2016 | Shucker et al. |
| 9,336,635 B2 | 5/2016 | Robertson et al. |
| 9,358,975 B1 | 6/2016 | Watts |
| 9,373,149 B2 | 6/2016 | Abhyanker |
| 9,381,916 B1 | 7/2016 | Zhu et al. |
| 9,397,518 B1 | 7/2016 | Theobald |
| 9,404,761 B2 | 8/2016 | Meuleau |
| 9,409,644 B2 | 8/2016 | Stanek et al. |
| 9,411,337 B1 | 8/2016 | Theobald et al. |
| 9,412,280 B1 | 8/2016 | Zwillinger et al. |
| 9,436,183 B2 | 9/2016 | Thakur et al. |
| 9,436,926 B2 | 9/2016 | Cousins et al. |
| 9,448,559 B2 | 9/2016 | Kojo et al. |
| 9,489,490 B1 | 11/2016 | Theobald |
| 9,510,316 B2 | 11/2016 | Skaaksrud |
| 9,535,421 B1 | 1/2017 | Canoso et al. |
| 9,545,852 B2 | 1/2017 | Streett |
| 9,561,941 B1 | 2/2017 | Watts |
| 9,563,201 B1 | 2/2017 | Tofte et al. |
| 9,568,335 B2 | 2/2017 | Thakur et al. |
| 9,582,950 B2 | 2/2017 | Shimizu et al. |
| 9,600,645 B2 | 3/2017 | Fadell et al. |
| 9,619,776 B1 | 4/2017 | Ford et al. |
| 9,623,553 B1 | 4/2017 | Theobald et al. |
| 9,623,562 B1 | 4/2017 | Watts |
| 9,650,136 B1 | 5/2017 | Haskin et al. |
| 9,652,912 B2 | 5/2017 | Fadell et al. |
| 9,656,805 B1 | 5/2017 | Evans et al. |
| 9,671,791 B1 | 6/2017 | Paczan |
| 9,677,564 B1 | 6/2017 | Woodworth et al. |
| 9,682,481 B2 | 6/2017 | Lutz et al. |
| 9,697,730 B2 | 7/2017 | Thakur et al. |
| 9,718,564 B1 | 8/2017 | Beckman et al. |
| 9,720,414 B1 | 8/2017 | Theobald |
| 9,731,821 B2 | 8/2017 | Hoareau et al. |
| 9,733,646 B1 | 8/2017 | Nusser et al. |
| 9,746,852 B1 | 8/2017 | Watts et al. |
| 9,746,853 B2 | 8/2017 | Scheepjens et al. |
| 9,778,653 B1 | 10/2017 | McClintock et al. |
| 9,786,187 B1 | 10/2017 | Bar-Zeev et al. |
| 9,796,529 B1 | 10/2017 | Hoareau et al. |
| 9,828,092 B1 | 11/2017 | Navot et al. |
| 9,858,604 B2 | 1/2018 | Apsley et al. |
| 9,886,035 B1 | 2/2018 | Watts et al. |
| 9,896,204 B1 | 2/2018 | Willison |
| 9,959,771 B1 | 5/2018 | Carlson |
| 9,959,773 B2 | 5/2018 | Raptopoulos et al. |
| 9,974,612 B2 | 5/2018 | Pinter et al. |
| 10,022,753 B2 | 7/2018 | Chelian et al. |
| 10,022,867 B2 | 7/2018 | Saboo et al. |
| 10,048,697 B1 | 8/2018 | Theobald |
| 10,108,185 B1 | 10/2018 | Theobald |
| 10,137,984 B1 | 11/2018 | Flick |
| 10,558,226 B1 | 2/2020 | Bigdeli |
| 10,649,469 B2 | 5/2020 | Salas-Moreno et al. |
| 10,745,132 B1* | 8/2020 | Kimchi ............... G05D 1/0016 |
| 10,780,988 B2 | 9/2020 | Buchmueller et al. |
| 10,860,115 B1 | 12/2020 | Tran |
| 11,164,149 B1* | 11/2021 | Williams ............... B64U 10/14 |
| 11,619,952 B2 | 4/2023 | Kwon et al. |
| 11,628,932 B2 | 4/2023 | Seung et al. |

(56) References Cited

U.S. PATENT DOCUMENTS

| | | |
|---|---|---|
| 11,649,050 B1 | 5/2023 | Miller |
| 11,726,184 B2 | 8/2023 | Ferreira et al. |
| 11,808,580 B1 | 11/2023 | Ebrahimi Afrouzi et al. |
| D1,008,873 S | 12/2023 | Lin |
| 11,851,162 B1 | 12/2023 | Daube et al. |
| 11,868,146 B2 | 1/2024 | Yasunaga et al. |
| 11,933,613 B2 | 3/2024 | Michini et al. |
| 2001/0045449 A1 | 11/2001 | Shannon |
| 2002/0016726 A1 | 2/2002 | Ross |
| 2002/0035450 A1 | 3/2002 | Thackston |
| 2002/0072979 A1 | 6/2002 | Sinha et al. |
| 2002/0087375 A1 | 7/2002 | Griffin et al. |
| 2002/0107751 A1 | 8/2002 | Rajagopalan et al. |
| 2002/0111914 A1 | 8/2002 | Terada et al. |
| 2002/0116289 A1 | 8/2002 | Yang |
| 2002/0123930 A1 | 9/2002 | Boyd et al. |
| 2002/0156645 A1 | 10/2002 | Hansen |
| 2003/0040980 A1 | 2/2003 | Nakajima et al. |
| 2003/0072031 A1 | 4/2003 | Kuwata et al. |
| 2003/0121968 A1 | 7/2003 | Miller et al. |
| 2003/0141411 A1 | 7/2003 | Pandya et al. |
| 2004/0002898 A1 | 1/2004 | Kuhlmann et al. |
| 2004/0068416 A1 | 4/2004 | Solomon |
| 2004/0112660 A1 | 6/2004 | Johansson et al. |
| 2004/0160335 A1 | 8/2004 | Reitmeier et al. |
| 2004/0162638 A1 | 8/2004 | Solomon |
| 2004/0257199 A1 | 12/2004 | Fitzgibbon et al. |
| 2005/0068178 A1 | 3/2005 | Lee et al. |
| 2005/0093865 A1 | 5/2005 | Jia |
| 2005/0102240 A1 | 5/2005 | Misra et al. |
| 2005/0244060 A1 | 11/2005 | Nagarajan et al. |
| 2005/0285934 A1 | 12/2005 | Carter |
| 2006/0053534 A1 | 3/2006 | Mullen |
| 2006/0118162 A1 | 6/2006 | Saelzer et al. |
| 2006/0136237 A1 | 6/2006 | Spiegel et al. |
| 2006/0287829 A1 | 12/2006 | Pashko-Paschenko |
| 2007/0016496 A1 | 1/2007 | Bar et al. |
| 2007/0073552 A1 | 3/2007 | Hileman |
| 2007/0102565 A1 | 5/2007 | Speer et al. |
| 2007/0150375 A1 | 6/2007 | Yang |
| 2007/0170237 A1 | 7/2007 | Neff |
| 2007/0210953 A1 | 9/2007 | Abraham et al. |
| 2007/0233337 A1 | 10/2007 | Plishner |
| 2007/0244763 A1 | 10/2007 | Williams et al. |
| 2007/0246601 A1 | 10/2007 | Layton |
| 2007/0262195 A1 | 11/2007 | Bulaga et al. |
| 2007/0293978 A1 | 12/2007 | Wurman et al. |
| 2008/0012697 A1 | 1/2008 | Smith et al. |
| 2008/0027591 A1 | 1/2008 | Lenser et al. |
| 2008/0100258 A1 | 5/2008 | Ward |
| 2008/0109246 A1 | 5/2008 | Russell |
| 2008/0111816 A1 | 5/2008 | Abraham et al. |
| 2008/0141921 A1 | 6/2008 | Hinderks |
| 2008/0150679 A1 | 6/2008 | Bloomfield |
| 2008/0154659 A1 | 6/2008 | Bettes et al. |
| 2008/0167817 A1 | 7/2008 | Hessler et al. |
| 2008/0184906 A1 | 8/2008 | Kejha |
| 2008/0189012 A1 | 8/2008 | Kaufmann |
| 2008/0301009 A1 | 12/2008 | Plaster et al. |
| 2009/0027253 A1 | 1/2009 | Tooren et al. |
| 2009/0062974 A1 | 3/2009 | Tamamoto et al. |
| 2009/0063166 A1 | 3/2009 | Palmer |
| 2009/0079388 A1 | 3/2009 | Reddy |
| 2009/0086275 A1 | 4/2009 | Liang et al. |
| 2009/0091435 A1 | 4/2009 | Bolourchi |
| 2009/0106124 A1 | 4/2009 | Yang |
| 2009/0149985 A1 | 6/2009 | Chirnomas |
| 2009/0164379 A1 | 6/2009 | Jung et al. |
| 2009/0165127 A1 | 6/2009 | Jung et al. |
| 2009/0236470 A1 | 9/2009 | Goossen et al. |
| 2009/0254457 A1 | 10/2009 | Folsom |
| 2009/0254482 A1 | 10/2009 | Vadlamani et al. |
| 2009/0299903 A1 | 12/2009 | Hung et al. |
| 2009/0303507 A1 | 12/2009 | Abeloe |
| 2009/0314883 A1 | 12/2009 | Arlton et al. |
| 2010/0007479 A1 | 1/2010 | Smith |
| 2010/0030608 A1 | 2/2010 | Kaminsky et al. |
| 2010/0031351 A1 | 2/2010 | Jung et al. |
| 2010/0088163 A1 | 4/2010 | Davidson et al. |
| 2010/0088175 A1 | 4/2010 | Lundquist |
| 2010/0100269 A1 | 4/2010 | Ekhaguere et al. |
| 2010/0169185 A1 | 7/2010 | Cottingham |
| 2010/0206145 A1 | 8/2010 | Tetelbaum et al. |
| 2010/0287065 A1 | 11/2010 | Alivandi |
| 2010/0299067 A1 | 11/2010 | McCollough et al. |
| 2010/0299222 A1 | 11/2010 | Hamilton et al. |
| 2011/0035149 A1 | 2/2011 | McAndrew et al. |
| 2011/0074570 A1 | 3/2011 | Feldstein et al. |
| 2011/0087350 A1 | 4/2011 | Fogel et al. |
| 2011/0112761 A1 | 5/2011 | Hurley et al. |
| 2011/0153052 A1 | 6/2011 | Pettibone et al. |
| 2011/0166707 A1 | 7/2011 | Romanov et al. |
| 2011/0178711 A1 | 7/2011 | Christoph |
| 2011/0210866 A1 | 9/2011 | David et al. |
| 2011/0227435 A1 | 9/2011 | Maeda |
| 2011/0246331 A1 | 10/2011 | Luther et al. |
| 2011/0253831 A1 | 10/2011 | Cheng |
| 2011/0264311 A1 | 10/2011 | Lee et al. |
| 2011/0282476 A1 | 11/2011 | Hegemier et al. |
| 2011/0301787 A1 | 12/2011 | Chaperon et al. |
| 2011/0313878 A1 | 12/2011 | Norman |
| 2012/0039694 A1 | 2/2012 | Suzanne |
| 2012/0078592 A1 | 3/2012 | Sims |
| 2012/0091260 A1 | 4/2012 | Callou |
| 2012/0109419 A1 | 5/2012 | Mercado |
| 2012/0219397 A1 | 8/2012 | Baker |
| 2012/0221438 A1 | 8/2012 | Cook et al. |
| 2012/0227389 A1 | 9/2012 | Hinderks |
| 2012/0229325 A1 | 9/2012 | Dutruc |
| 2012/0234969 A1 | 9/2012 | Savoye et al. |
| 2012/0235606 A1 | 9/2012 | Takeuchi |
| 2012/0323365 A1 | 12/2012 | Taylor et al. |
| 2013/0006739 A1 | 1/2013 | Horvitz et al. |
| 2013/0073477 A1 | 3/2013 | Grinberg |
| 2013/0081245 A1 | 4/2013 | Vavrina et al. |
| 2013/0093582 A1 | 4/2013 | Walsh et al. |
| 2013/0126611 A1 | 5/2013 | Kangas et al. |
| 2013/0148123 A1 | 6/2013 | Hayashi |
| 2013/0206915 A1 | 8/2013 | Desaulniers |
| 2013/0218446 A1 | 8/2013 | Bradley et al. |
| 2013/0218799 A1 | 8/2013 | Lehmann et al. |
| 2013/0261792 A1 | 10/2013 | Gupta et al. |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2013/0264381 A1 | 10/2013 | Kim et al. |
| 2013/0320133 A1 | 12/2013 | Ratti et al. |
| 2013/0324164 A1 | 12/2013 | Vulcano |
| 2013/0332062 A1 | 12/2013 | Kreitmair-Steck et al. |
| 2014/0010656 A1 | 1/2014 | Nies |
| 2014/0022055 A1 | 1/2014 | Levien et al. |
| 2014/0025230 A1 | 1/2014 | Levien et al. |
| 2014/0030444 A1 | 1/2014 | Swaminathan et al. |
| 2014/0031964 A1 | 1/2014 | Sidhu et al. |
| 2014/0032034 A1 | 1/2014 | Raptopoulos et al. |
| 2014/0040065 A1 | 2/2014 | DuBois |
| 2014/0052661 A1 | 2/2014 | Shakes et al. |
| 2014/0058959 A1 | 2/2014 | Isbjornssund et al. |
| 2014/0081445 A1 | 3/2014 | Villamar |
| 2014/0089073 A1 | 3/2014 | Jacobs et al. |
| 2014/0136282 A1 | 5/2014 | Fedele |
| 2014/0136414 A1 | 5/2014 | Abhyanker |
| 2014/0149244 A1 | 5/2014 | Abhyanker |
| 2014/0156053 A1 | 6/2014 | Mahdavi et al. |
| 2014/0180914 A1 | 6/2014 | Abhyanker |
| 2014/0200697 A1 | 7/2014 | Cheng |
| 2014/0214684 A1 | 7/2014 | Pell |
| 2014/0244433 A1 | 8/2014 | Cruz |
| 2014/0254896 A1 | 9/2014 | Zhou et al. |
| 2014/0271200 A1 | 9/2014 | Sutton et al. |
| 2014/0283104 A1 | 9/2014 | Nilsson |
| 2014/0309813 A1 | 10/2014 | Ricci |
| 2014/0325218 A1 | 10/2014 | Shimizu et al. |

(56) References Cited

U.S. PATENT DOCUMENTS

| | | |
|---|---|---|
| 2014/0330456 A1 | 11/2014 | Morales et al. |
| 2015/0006005 A1 | 1/2015 | Yu et al. |
| 2015/0066178 A1 | 3/2015 | Stava |
| 2015/0069968 A1 | 3/2015 | Pounds |
| 2015/0098819 A1 | 4/2015 | Tourin et al. |
| 2015/0102154 A1 | 4/2015 | Duncan et al. |
| 2015/0112837 A1 | 4/2015 | O'Dea |
| 2015/0112885 A1 | 4/2015 | Fadell et al. |
| 2015/0120094 A1 | 4/2015 | Kimchi et al. |
| 2015/0120602 A1 | 4/2015 | Huffman et al. |
| 2015/0127712 A1 | 5/2015 | Fadell et al. |
| 2015/0129716 A1 | 5/2015 | Yoffe |
| 2015/0153175 A1 | 6/2015 | Skaaksrud |
| 2015/0154545 A1 | 6/2015 | Skaaksrud et al. |
| 2015/0158599 A1 | 6/2015 | Sisko |
| 2015/0175276 A1 | 6/2015 | Koster |
| 2015/0183528 A1 | 7/2015 | Walsh et al. |
| 2015/0185034 A1 | 7/2015 | Abhyanker |
| 2015/0191255 A1 | 7/2015 | Zolich et al. |
| 2015/0193971 A1 | 7/2015 | Dryanovski et al. |
| 2015/0202770 A1 | 7/2015 | Patron et al. |
| 2015/0227882 A1 | 8/2015 | Bhatt |
| 2015/0246727 A1 | 9/2015 | Masticola et al. |
| 2015/0253777 A1 | 9/2015 | Binney et al. |
| 2015/0254611 A1 | 9/2015 | Perez |
| 2015/0259078 A1 | 9/2015 | Filipovic et al. |
| 2015/0286216 A1 | 10/2015 | Miwa |
| 2015/0314881 A1 | 11/2015 | Tsaliah et al. |
| 2015/0317597 A1 | 11/2015 | Shucker et al. |
| 2015/0332206 A1 | 11/2015 | Trew et al. |
| 2015/0367850 A1 | 12/2015 | Clarke et al. |
| 2015/0370251 A1 | 12/2015 | Siegel et al. |
| 2016/0001877 A1 | 1/2016 | Paulos |
| 2016/0009413 A1 | 1/2016 | Lee et al. |
| 2016/0019495 A1 | 1/2016 | Kolchin |
| 2016/0033966 A1 | 2/2016 | Farris et al. |
| 2016/0051110 A1 | 2/2016 | Cao et al. |
| 2016/0058181 A1 | 3/2016 | Han et al. |
| 2016/0068267 A1 | 3/2016 | Liu et al. |
| 2016/0070265 A1 | 3/2016 | Liu et al. |
| 2016/0085238 A1 | 3/2016 | Hayes |
| 2016/0104099 A1 | 4/2016 | Villamar |
| 2016/0104113 A1 | 4/2016 | Gorlin |
| 2016/0107750 A1 | 4/2016 | Yates |
| 2016/0114488 A1 | 4/2016 | Medina et al. |
| 2016/0117931 A1 | 4/2016 | Chan et al. |
| 2016/0125746 A1 | 5/2016 | Kunzi et al. |
| 2016/0129592 A1 | 5/2016 | Saboo et al. |
| 2016/0130015 A1 | 5/2016 | Caubel et al. |
| 2016/0132059 A1 | 5/2016 | Mason et al. |
| 2016/0144734 A1 | 5/2016 | Wang et al. |
| 2016/0144982 A1 | 5/2016 | Sugumaran |
| 2016/0180618 A1 | 6/2016 | Ho et al. |
| 2016/0196755 A1 | 7/2016 | Navot et al. |
| 2016/0196756 A1 | 7/2016 | Prakash et al. |
| 2016/0200438 A1 | 7/2016 | Bokeno et al. |
| 2016/0207627 A1 | 7/2016 | Hoareau et al. |
| 2016/0214717 A1 | 7/2016 | Silva |
| 2016/0214728 A1 | 7/2016 | Rossi et al. |
| 2016/0221671 A1 | 8/2016 | Fisher et al. |
| 2016/0235236 A1 | 8/2016 | Byers et al. |
| 2016/0236778 A1 | 8/2016 | Takayama et al. |
| 2016/0239789 A1 | 8/2016 | Hanks |
| 2016/0239803 A1 | 8/2016 | Borley et al. |
| 2016/0257401 A1 | 9/2016 | Buchmueller et al. |
| 2016/0258775 A1 | 9/2016 | Santilli et al. |
| 2016/0266578 A1 | 9/2016 | Douglas et al. |
| 2016/0282126 A1 | 9/2016 | Watts et al. |
| 2016/0299233 A1 | 10/2016 | Levien et al. |
| 2016/0321503 A1 | 11/2016 | Zhou |
| 2016/0334229 A1 | 11/2016 | Ross et al. |
| 2016/0340021 A1 | 11/2016 | Zhang et al. |
| 2016/0364660 A1 | 12/2016 | Brown |
| 2016/0364679 A1 | 12/2016 | Cao |
| 2016/0364823 A1 | 12/2016 | Cao |
| 2016/0364989 A1 | 12/2016 | Speasl et al. |
| 2016/0371984 A1 * | 12/2016 | Macfarlane .......... G06V 20/176 |
| 2017/0011333 A1 | 1/2017 | Greiner et al. |
| 2017/0011340 A1 | 1/2017 | Gabbai |
| 2017/0032315 A1 | 2/2017 | Gupta et al. |
| 2017/0087999 A1 | 3/2017 | Miller et al. |
| 2017/0096222 A1 | 4/2017 | Spinelli et al. |
| 2017/0098378 A1 | 4/2017 | Soundararajan et al. |
| 2017/0100837 A1 | 4/2017 | Zevenbergen et al. |
| 2017/0101017 A1 | 4/2017 | Streett |
| 2017/0113352 A1 | 4/2017 | Lutz et al. |
| 2017/0147975 A1 | 5/2017 | Natarajan et al. |
| 2017/0152060 A1 | 6/2017 | Morisawa |
| 2017/0154347 A1 | 6/2017 | Bateman |
| 2017/0164319 A1 | 6/2017 | Skaaksrud et al. |
| 2017/0167881 A1 | 6/2017 | Rander et al. |
| 2017/0193442 A1 | 7/2017 | Ekkel et al. |
| 2017/0199522 A1 | 7/2017 | Li et al. |
| 2017/0255896 A1 | 9/2017 | Dyke |
| 2017/0286905 A1 | 10/2017 | Richardson et al. |
| 2017/0300855 A1 | 10/2017 | Lund et al. |
| 2017/0305526 A1 | 10/2017 | Thomassey |
| 2017/0308098 A1 | 10/2017 | Yu et al. |
| 2017/0316379 A1 | 11/2017 | Lepek et al. |
| 2017/0330145 A1 | 11/2017 | Studnicka et al. |
| 2017/0345245 A1 | 11/2017 | Torresani et al. |
| 2017/0372256 A1 | 12/2017 | Kantor et al. |
| 2018/0024554 A1 | 1/2018 | Brady et al. |
| 2018/0088586 A1 | 3/2018 | Hance et al. |
| 2018/0127211 A1 | 5/2018 | Jarvis et al. |
| 2018/0137454 A1 | 5/2018 | Kulkarni et al. |
| 2018/0203464 A1 | 7/2018 | Yu et al. |
| 2018/0257775 A1 | 9/2018 | Baek et al. |
| 2019/0051192 A1 | 2/2019 | Schick et al. |
| 2019/0135403 A1 | 5/2019 | Perry et al. |
| 2019/0161190 A1 | 5/2019 | Gil et al. |
| 2019/0172358 A1 | 6/2019 | Zhou et al. |
| 2020/0272144 A1 | 8/2020 | Yang et al. |
| 2020/0284883 A1 | 9/2020 | Ferreira et al. |
| 2020/0324898 A1 | 10/2020 | Youmans et al. |
| 2020/0369384 A1 | 11/2020 | Kelly |
| 2021/0089055 A1 | 3/2021 | Tran |
| 2021/0094686 A1 | 4/2021 | Metzner et al. |
| 2022/0009647 A1 | 1/2022 | Johannesson et al. |
| 2022/0144424 A1 | 5/2022 | Metzner et al. |
| 2022/0162001 A1 * | 5/2022 | Gherardi .............. B65G 1/1373 |
| 2022/0163980 A1 | 5/2022 | Beer et al. |
| 2023/0244249 A1 | 8/2023 | Smith et al. |
| 2023/0298268 A1 | 9/2023 | Oleynikova et al. |

FOREIGN PATENT DOCUMENTS

| | | | |
|---|---|---|---|
| CN | 203039518 U | 7/2013 | |
| CN | 103365297 A * | 10/2013 | ............ G05D 1/10 |
| CN | 104760704 A | 7/2015 | |
| CN | 109118826 A * | 1/2019 | ............ B64D 31/04 |
| DE | 102011086497 A1 | 5/2013 | |
| EP | 3415436 A1 | 12/2018 | |
| FR | 2692064 A1 | 12/1993 | |
| GB | 2455374 A | 6/2009 | |
| JP | S48088255 U | 10/1973 | |
| JP | S56048952 | 11/1981 | |
| JP | H0712088 A | 1/1995 | |
| JP | 2004126800 A | 4/2004 | |
| JP | 2009297449 A | 12/2009 | |
| JP | 2010095246 A | 4/2010 | |
| JP | 2011211025 A | 10/2011 | |
| JP | 2012037204 A | 2/2012 | |
| WO | 2007052246 A1 | 5/2007 | |
| WO | 2008147484 A2 | 12/2008 | |
| WO | 2008147484 A3 | 2/2009 | |
| WO | 2009153588 A1 | 12/2009 | |
| WO | 2010070717 A1 | 6/2010 | |
| WO | 2012012752 A2 | 1/2012 | |
| WO | 2012012752 A9 | 6/2012 | |
| WO | 2013140085 A1 | 9/2013 | |
| WO | 2013148123 A1 | 10/2013 | |
| WO | 2014064431 A2 | 5/2014 | |
| WO | 2014068982 A1 | 5/2014 | |

(56) References Cited

FOREIGN PATENT DOCUMENTS

| WO | 2014080409 A1 | 5/2014 |
| WO | 2014064431 A3 | 7/2014 |
| WO | 2017064202 A1 | 4/2017 |
| WO | 2017186137 A1 | 11/2017 |
| WO | 2018136753 A1 | 7/2018 |
| WO | 2018156991 A1 | 8/2018 |

OTHER PUBLICATIONS

Bullock et al., "Analysis of the Use of Digital Road Maps in Vehicle Navigation," 1994, IEEE, p. 494-501 (Year: 1994).

DHL Trend Research, "Self-Driving Vehicles in Logistics," Dec. 2014, Markus Kuckelhaus et al. (downloaded from http://www.dhl.com/content/dam/downloads/g0/about_us/logistics_insights/dhl_self_driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.

DHL Trend Research, "Unmanned Aerial Vehicles in Logistics: A DHL perspective on implications and use cases for the logistics industry," 2014, Markus Kuckelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

Hawas et al., "Infrastructureless Inter-Vehicular Real-Time Route Guidance," 2008, IEEE, p. 1213-1219 (Year: 2008).

Kais, Mikael et al., "An Intelligent architecture for automated transportation in our cities", 2001 European Control Conference (ECC), Porto, Portugal, Sep. 4-7, 2001, pp. 277-282 (Year: 2001).

Kladis et al., "Event-Based Energy Optimum Route Planning in the Context of Unmanned Aerial Vehicles for Multi-Objective Exploration Missions," 2009, IEEE, p. 1281-1286 (Year: 2009).

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

Mike Murphy, "Google wants to deliver packages from self-driving trucks," published Feb. 9, 2016, URL: https://qz.com/613277/google-wants-to-deliver-packages-from-self-driving-trucks/, 4 pages.

Nanohawk Aeraccess: "Unmanned Aerial Vehicle—Aeraccess—Nanohawk—Webarchive Jun. 16, 2019", Jun. 16, 2019 (Jun. 16, 2019), pp. 1-3, XP055759013, URL: https://web.archive.org/web/20190616235755/http://www.aeraccess-group.com/product/indoor/nanohawk [Retrieved from the Internet: Dec. 10, 2020]; the whole document.

Navaravong et al., "Formation Reconfiguration for Mobile Robots with Network Connectivity Constraints," 2012, IEEE, p. 18-24 (Year: 2012).

Parent, Michel et al., "Intelligent Transportation in Cities with CTS", The IEEE 5th International Conference on Intelligent Transportation Systems, Sep. 3-6, 2002, Singapore, pp. 826-830 (Year: 2002).

Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 pages.

Smith, Randall C., and Peter Cheeseman, "On the Representation and Estimation of Spatial Uncertainty," The Int'l Journal of Robotics Research, vol. 5, No. 4 (Winter 1986), Copyright 1986 Massachusetts Institute of Technology, 14 pages. URL: https://web.archive.org/web/20160804001046/https://www.starship.xyz/, download date: Aug. 4, 2016, 21 pages.

Andrew Amato, "Parrot Announces New Bobop Drone", Dronelife.com, May 12, 2014; http://dronelife.com/2014/05/12/parrot-announces-new-bebop-drone/, accessed Dec. 21, 2016.

Ivan Barajas, "Parrot Unveils New Drone and Controller," May 14, 2014; https://blog.newegg.com/parrot-unveils-drone-controller-oculus-compatible/, accessed Dec. 21, 2016.

Microchip Technology Inc. AT42QT1010 Data Sheet. Copyright © 2017 Microchip Technology Inc. 30 pages.

MicroPilot home page, https://www.micropilot.com/; archived on Jan. 3, 2013 by Internet Archive, http://web.archive.org/web/2013103180733/http://www.micropilot.com/?, accessed May 2, 2016.

Norman Chan, "Hands-On with Parrot's Bebop Drone Quadcopter", tested.com, May 12, 2014; http://www.tested.com/tech/robots/461148-parrots-bebop-drone-what-you-should-know/, accessed Dec. 22, 2016.

rhelicopterfun.com, "Parrot AF Drone Quadcopter Review", http://www.rchelicopterfun.com/parrot-ar-drone.html; archived on Mar. 27, 2012 by Internet Archive, http://web.archive.org/web/20120327140509/http://www.rchelicopterfun.com/parrot-ar-drone.html, accessed Apr. 27, 2016.

Wang, David. Application Report: FDC1004: Basics of Capacitive Sensing and Applications. SNOA927A—Dec. 2014—Revised Jun. 2021. Copyright © 2021 Texas Instruments Incorporated. 12 pages.

Wikipedia, "Apollo Abort Modes", https://en.wikipedia.org/wiki/Apollo_abort_modes; archived by Internet Archive on Aug. 16, 2012, https://web.archive.org/web/20120816115115/https://en.wikipedia.org/wiki/Apollo_abort_modes; accessed Jul. 9, 2019 (Year: 2012).

Wikipedia, "Space Shuttle Abort Modes," https://en.wikipedia.org/wiki/Space_Shuttle_abort_modes; archived by Internet Archive on Aug. 15, 2012, https://web.archive.org/web/20120815031221/https://en.wikipedia.org/wiki/Space_Shuttle_abort_modes; accessed Jul. 9, 2019 (Year: 2012).

Elizondo-Leal, J. C., et al., "The Exact Euclidean Distance Transform: A New Algorithm for Universal Path Planning." www.intechopen.com, International Journal of Advanced Robotic Systems 10, No. 6 (2013): 266, www.researchgate.net, URL: https://www.researchgate.net/publication/274622763_The_Exact_Euclidean_Distance_Transform_A_New_Algorithm_for_Universal_Path_Planning.

Faro, "GeoSLAM ZEB Horizon RT Mobile Scanner," www.faro.com, FARO Technologies, Inc., Copyright 2024 Faro URL: https://www.faro.com/en/Products/Hardware/GeoSLAM-ZEB-Horizon-RT (Year 2024).

Faro, "GeoSLAM ZEB Horizon RT Mobile Scanner: Features—Sensor Features, " www.faro.com, FARO Technologies, Inc., Copyright 2024 Faro URL: https://www.faro.com/en/Products/Hardware/GeoSLAM-ZEB-Horizon-RT (Year 2024).

Faro, "GeoSLAM ZEB Horizon RT Mobile Scanner: Value—Capture Data Faster—Aerial Vehicle / Scanner Carried by Human While Walking, " www.faro.com, FARO Technologies, Inc., Copyright 2024 Faro URL: https://www.faro.com/en/Products/Hardware/GeoSLAM-ZEB-Horizon-RT (Year 2024).

Faro, "GeoSLAM ZEB Horizon RT Mobile Scanner: Value—Complement Other Forms of Data Capture—Justification for Combining Scanner Method Data With Other Art, " www.faro.com, FARO Technologies, Inc., Copyright 2024 Faro URL: https://www.faro.com/en/Products/Hardware/GeoSLAM-ZEB-Horizon-RT (Year 2024).

Faro, "GeoSLAM ZEB Horizon RT Mobile Scanner: Versatility—UAV Mount—Initial Walking UAV with Scanner, " www.faro.com, FARO Technologies, Inc., Copyright 2024 Faro URL: https://www.faro.com/en/Products/Hardware/GeoSLAM-ZEB-Horizon-RT (Year 2024).

Jung, J.W., et al., "Expanded Douglas-Peucker Polygonal Approximation and Opposite Angle-Based Exact Cell Decomposition for Path Planning With Curvilinear Obstacles." Applied Sciences 9, No. 4 (2019): 638, www.mdpi.com, Copyright 1996-2024 MDPI (Basel, Switzerland), URL: https://www.mdpi.com/2076-3417/9/4/638 (Year: 2019).

Sanchez-Ibáñez, J. R., et al., "Path Planning for Autonomous Mobile Robots: A Review," www.mdpi.com, Copyright 1996-2024 MDPI (Basel, Switzerland), URL: https://www.mdpi.com/1424-8220/21/23/7898 (Year: 2022).

\* cited by examiner

PATH OF WAYPOINTS FOR DRONE IN INDOOR SPACE $$f(t) = \begin{cases} \sum_{i=0}^{6} c_0^i \cdot (t - T_0)^i & t \in [T_0, T_1] \\ \vdots \\ \sum_{i=0}^{6} c_{m-1}^i \cdot (t - T_{m-1})^i & t \in [T_{m-1}, T_m] \end{cases}$$

WHERE $m \geq 2$ and $T_j$ = TIME AT WAYPOINT j

FIG. 1B

DISTANCE BETWEEN WAYPOINTS B AND C
PERMITS UAV TO REACH MAXIMUM SPEED

INSERT INTERVENING WAYPOINTS $I_1, I_2$
AT MINIMUM ACCELERATION/DECELERATION DISTANCES

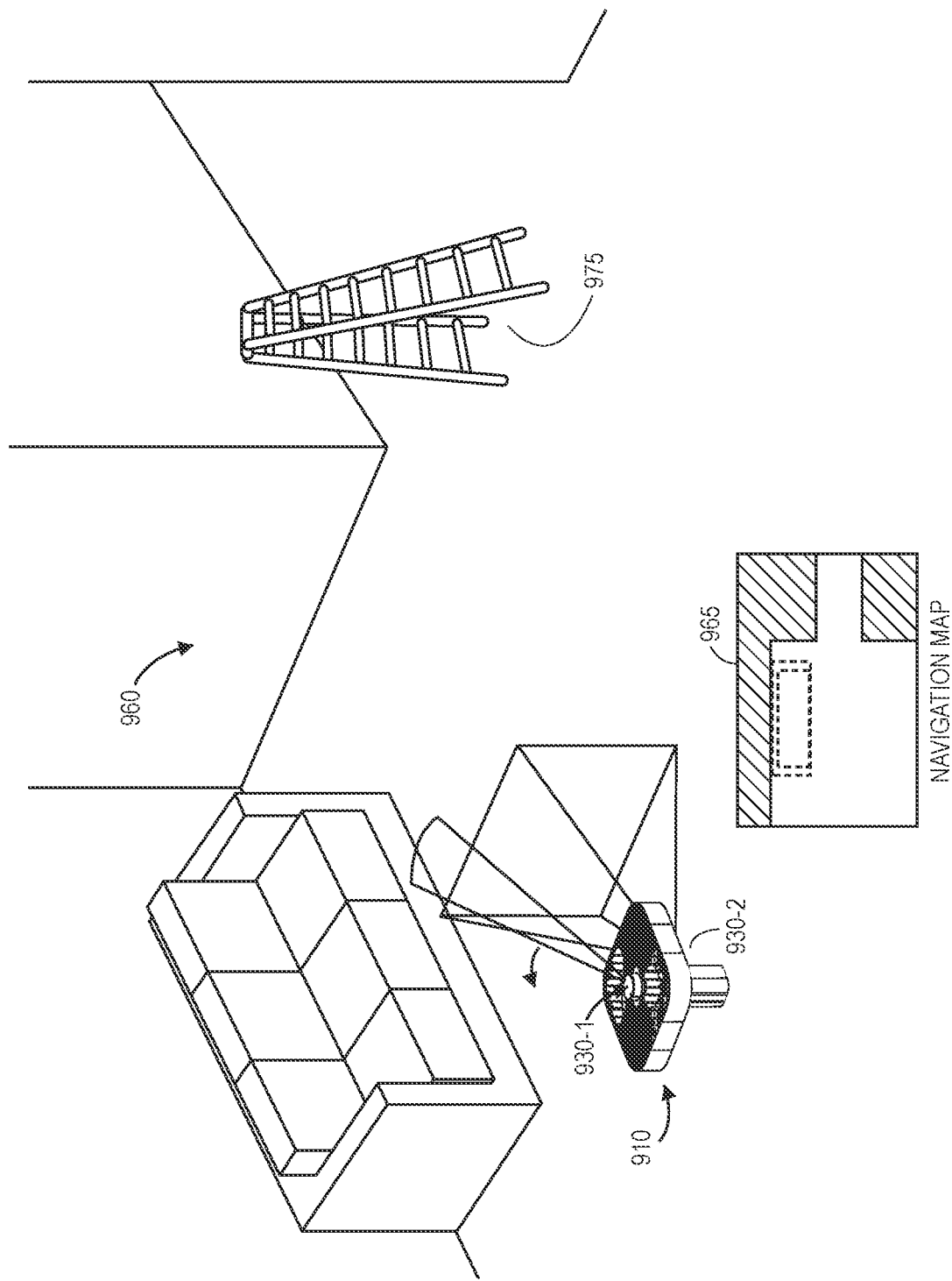

INDOOR NAVIGATION AND OBSTACLE AVOIDANCE FOR UNMANNED AERIAL VEHICLES

BACKGROUND

As compared to outdoor operations, operating an unmanned aerial vehicle, or drone, within indoor spaces presents a unique set of challenges for the unmanned aerial vehicle, and creates unique risks for contents of the indoor spaces. For example, an unmanned aerial vehicle that operates outdoors may typically climb above any encountered hazards by increasing altitude, in order to elevate above ground-based or airborne obstacles, which may include humans or other animals, or other stationary or moving objects. An unmanned aerial vehicle that operates indoors, however, is commonly constrained by ceilings at eight to ten foot elevations, or approximately one to five feet above the heights of most humans.

An unmanned aerial vehicle operating outdoors may capture data regarding its positions and orientations using one or more onboard sensors and interpret the data to generate commands or instructions for operating motors or control surfaces to avoid such obstacles. Because obstacles that are encountered in outdoor areas, such as structures, plant life, or others, are often separated by comparatively large distances, and because outdoor areas typically include sufficiently large spaces for operating unmanned aerial vehicles, an unmanned aerial vehicle is typically able to make wide, smooth changes in course or altitude without risking contact with any obstacles, even where the unmanned aerial vehicle is operating at or near its maximum speeds. Conversely, because indoor spaces are commonly constrained by narrow hallways or other passageways, and feature limited operating areas between floors and ceilings, an unmanned aerial vehicle that operates indoors must often make tight turns or changes in altitude, or travel well below its maximum speeds, in order to avoid contacting walls, ceilings, floors or other structural features.

For these reasons, and others, navigation systems and sensors provided aboard unmanned aerial vehicles operating in indoor spaces have small margins of error, and must capture and process data rapidly to ensure that changes in course, speed or altitude are timely and appropriately made.

BRIEF DESCRIPTION OF THE DRAWINGS

FIGS. 1A through 1H are views of aspects of one system in accordance with embodiments of the present disclosure.

FIGS. 9A through 9G are views of aspects of one system in accordance with embodiments of the present disclosure.

DETAILED DESCRIPTION

Figure 1A:
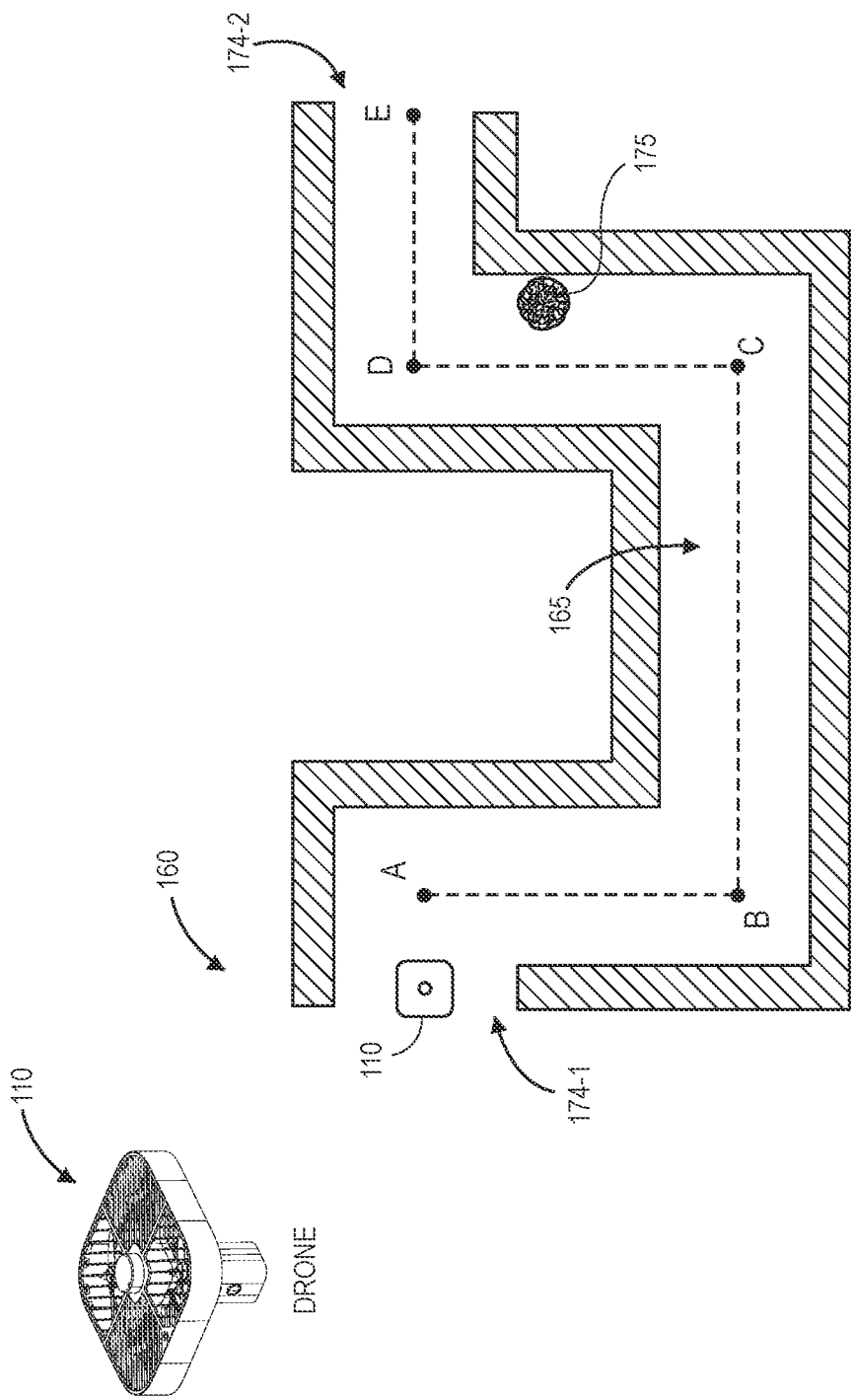

As is set forth in greater detail below, the present disclosure is directed to systems and methods for indoor navigation and obstacle avoidance by unmanned aerial vehicles. The present disclosure describes, inter alia, unmanned aerial vehicles that are configured to calculate trajectories for traveling in a manner that minimizes snap, and for modifying such trajectories, as necessary, to maximize a speed of an unmanned aerial vehicle while traveling along a trajectory, or to minimize a risk that the unmanned aerial vehicle will contact one or more objects. An unmanned aerial vehicle may calculate a trajectory at any time prior to, during or following operations, such as when the unmanned aerial vehicle is at or over a waypoint, when the unmanned aerial vehicle has potentially detected an obstacle, or when the unmanned aerial vehicle has determined that a braking maneuver is necessary, among others. A trajectory may include sets of points in three-dimensional space.

In accordance with one or more preferred implementations, a trajectory may also include, for each defined point in three-dimensional space forming part of the trajectory, a time value indicating a time at which the trajectory passes through that point (e.g. a time at which a drone following that trajectory should pass through that point). Thus, a trajectory may be characterized as defining points in four-dimensional space-time.

In accordance with one or more preferred implementations, a trajectory may also include, for each defined point in three-dimensional space forming part of the trajectory, a yaw value indicating a yaw angle at that point of the trajectory.

In accordance with one or more preferred implementations, a trajectory is calculated using, or is defined by, one or more equations (e.g., a set of polynomial equations), and points along the trajectory can be calculated using the one or more equations. In accordance with one or more preferred implementations, one or more trajectory equations can be used to generate, at each time t along a trajectory, x, y, and z values indicating a position in three-dimensional space. In accordance with one or more preferred implementations, the one or more trajectory equations or x, y, and z values generated based thereon can be used to generate velocity information for any time t (e.g., indicating speed and direction).

In accordance with one or more preferred implementations, one or more trajectory equations can be used to generate, at each time t along a trajectory, a yaw value indicating a yaw angle. In accordance with one or more preferred implementations, the one or more trajectory equations or yaw values generated based thereon can be used to generate yaw velocity information for any time t (e.g., indicating speed and direction).

An unmanned aerial vehicle may generate and execute any number of commands or instructions (which may be executed by a control system or another component of the unmanned aerial vehicle), in order to cause the unmanned aerial vehicle to remain on a desired course, at a desired speed, or at a desired altitude in accordance with the trajectory.

The systems and methods of the present disclosure are further directed to unmanned aerial vehicles that continuously or repeatedly monitor for objects within predetermined ranges of their respective directions of travel using one or more range sensors. Upon determining that an object is detected within a predetermined range, an unmanned aerial vehicle may immediately slow, e.g., by one or more "braking" maneuvers, to decelerate or otherwise reduce a speed of the unmanned aerial vehicle, and continue to monitor for objects within a shorter, predetermined range using the one or more range sensors. Such a braking maneuver may include, for example, reducing a rotational speed or adjusting an operation of one or more rotors or engines. Ranges or distances to objects that are determined based on information or data captured by such sensors may be modified to account for travel of the unmanned aerial vehicle, in order to rapidly and efficiently assess whether such objects pose a risk of collision with the unmanned aerial vehicle. A speed at which to operate an unmanned aerial vehicle may be selected based on a state of the unmanned aerial vehicle, as determined based on such information or data, and the unmanned aerial vehicle may be configured to execute an emergency braking maneuver or take other action where the risk of collision is sufficiently high. Such an emergency braking maneuver may include, for example, operating one or more rotors or engines to cease thrust or to effect thrust in a direction opposite to a current direction of motion, such as to sharply reduce a speed of the unmanned aerial vehicle, or to bring the unmanned aerial vehicle to a stop.

The systems and methods of the present disclosure are also directed to unmanned aerial vehicles that are further configured to capture information or data from one or more range sensors, and to construct local maps of ranges from such information or data. The local maps may include a plurality of cells or other sectors, e.g., in a grid. One or more such cells may be determined to be obstructed where a calculated number of points, returns or detections received from such cells exceeds a predetermined threshold, and where a confidence level in the calculated number is sufficiently high. Additionally, upon determining that a cell may be obstructed, the number of points, returns or detections received from the cell may be compared to numbers of points, returns or detections received from neighboring cells (e.g., one or more adjacent cells). Where one or more of the numbers from neighboring cells is sufficiently high, a determination that the cell is obstructed may be confirmed.

Referring to FIGS. 1A through 1H, views of aspects of one system in accordance with embodiments of the present disclosure are shown. As is shown in FIG. 1A, a drone 110, e.g., an unmanned aerial vehicle, is located within a facility 160, which may be any partially or entirely enclosed space. The facility 160 may be a home, an office, or any other facility. As is further shown in FIG. 1A, the facility 160 includes a passageway 165 (e.g., one or more halls, corridors or other space) for accommodating ground-based or airborne travel by humans, machines or other entities within the facility 160. The passageway 165 includes an entrance 174-1 and an exit 174-2, as well as a potted plant 175 or another obstacle within the passageway 165. Alternatively, or additionally, the facility 160 may include any number of rooms or other passageways (not shown), any of which may be provided to accommodate ground-based or airborne travel thereon or therein.

The drone 110 may be configured for travel within the facility 160, such as by way of the passageway 165. The drone 110 may include one or more motors, rotors, propellers, control surfaces or other features for causing the drone 110 to travel on any course, at any speed or at any altitude. The drone 110 may also include one or more onboard sensors, e.g., range sensors such as time-of-flight sensors or LIDAR (viz., light detection and ranging) sensors, imaging devices (e.g., digital cameras), microphones, or other sensors configured to capture information or data regarding temperatures, humidities, pressures, atmospheric conditions or other attributes of spaces of the facility 160, such as the passageway 165. The drone 110 may further include any number of computer processors, transceivers or other components that may be in communication with any number of computer systems (not shown) over a network that may include the Internet in whole or in part, or one or more of such networks. In some other embodiments, the facility 160 may include any number of other drones or other vehicles (not shown), e.g., two or more of such vehicles, which may be located in any number of spaces within the facility 160, or outside of the facility 160.

As is shown in FIG. 1A, the drone 110 may be programmed with data (e.g., spatial point data) representing a series of waypoints (or spatial points), which may be represented in global or local coordinates, e.g., Cartesian coordinates. For example, the drone 110 may be programmed with coordinates representing a location of a waypoint A at or near the entrance 174-1 to the passageway 165, as well as coordinates representing locations of waypoints B, C and D at or near corners within the passageway 165, and coordinates representing a location of a waypoint E at or near the exit 174-2 from the passageway 165. Alternatively, or additionally, the drone 110 may be programmed with coordinates representing locations on segments of a path extending between consecutive pairs of the waypoints, viz., between the waypoint A and the waypoint B, between the waypoint B and the waypoint C, between the waypoint C and the waypoint D, and between the waypoint D and the waypoint E.

The coordinates of the waypoints A, B, C, D and E or coordinates of segments of a path between such waypoints may be programmed or represented in a map, e.g., an environment map of the facility 160 as a whole or an environment map of the passageway 165 in particular. For example, the environment map may also identify locations of boundaries such as walls, ceilings or floors within the facility 160, as well as locations of various utilities, portals, systems, appliances, fixtures or other aspects of the facility 160. For example, the drone 110 may also be programmed with coordinates of the potted plant 175 or any other obstacles (not shown) within the passageway 165. In some embodiments, map data may have been generated at least in part by the drone 110, or by one or more other autonomous vehicles, during one or more prior or concurrent missions throughout the facility 160, e.g., based on a simultaneous localization and mapping, or "SLAM," algorithm. The drone 110 may further select any courses, speeds and/or altitudes for traveling within the facility 160 on any basis.

In some implementations of the present disclosure, a drone may be configured to calculate a trajectory that minimizes snap (or jounce), e.g., a fourth derivative of position, or a second derivative of acceleration, which may represent a rate of change of jerk with respect to time. Calculating a trajectory that minimizes snap enables the drone to travel through a plurality of waypoints in an efficient manner with limited yaw, pitch or roll. For example, as is shown in FIG. 1B, a trajectory equation $f(t)$ for the drone 110 may be formulated as piecewise polynomial functions of orders from zero to six, through a plurality of m waypoints (or spatial points), viz., from a waypoint 0 to a waypoint m, or:

$$f(t) = \begin{cases} \sum_{i=0}^{6} c_0^i \cdot (t - T_0)^i & t \in [T_0, T_1] \\ \quad \cdots \\ \sum_{i=0}^{6} c_{m-1}^i \cdot (t - T_{m-1})^i & t \in [T_{m-1}, T_m] \end{cases}$$

where m is greater than or equal to two, and times $T_j$ are times at which the drone 110 is located at a waypoint j between 0 and m.

The function $f(t)$ defines a trajectory in terms of positions in three-dimensional space and a yaw value, e.g., values of x, y, z, and $\psi$. Each of the values of the coefficients $c_0 \ldots c_{m-1}$ may be solved by minimizing a fourth derivative of the function $f(t)$. In accordance with one or more preferred implementations, a function $f(t)$ may be utilized which defines a trajectory in terms of positions in three-dimensional space and a yaw value, e.g., values of x, y, z, and $\psi$.

A trajectory calculated according to the trajectory equation of FIG. 1B may cause a pose, a velocity and an acceleration of the drone 110 to be smooth and trackable, and with minimized pitch or roll. Where the drone 110 travels along such a trajectory, and with snap minimized, localization or mapping determinations made by the drone 110 during flight are of higher quality, and the drone 110 conserves onboard electrical power, which is consumed to a greater extent during accelerations or decelerations.

Once a trajectory is calculated according to the equation of FIG. 1B, and the drone 110 is programmed to travel on the trajectory, a control system or another component of the drone 110 may generate and execute one or more commands or instructions to cause motors, control surfaces or other systems of the drone 110 to operate in order to maintain the drone 110 on the trajectory at each of such positions. In some implementations, commands or instructions may be generated and executed at any rate or frequency, such as ten times per second, or a frequency of ten Hertz (10 Hz).

In some implementations, a trajectory may be calculated between two or more waypoints for the drone 110 by a navigation module (or a path planning module, a path learning module, or any other module). Inputs to the navigation module may include a path of a plurality of waypoints, or a map including one or more of the waypoints, as well as a current position or pose, velocity and acceleration of the drone 110, physical constraints of the drone 110, e.g., maximum velocities or accelerations of the drone 110, and continuity constraints of the drone 110, e.g., such that the trajectory is continuous at each waypoint. Outputs received from the navigation module may include a trajectory that passes through all of the waypoints, as well as one or more commands or instructions to be executed to cause the drone 110 to travel along the trajectory. The trajectory may be calculated with goals of smoothness (e.g., to avoid jittering motion during flight), safety (e.g., to minimize drift), feasibility (e.g., to ensure that the drone 110 may travel along the trajectory subject to its physical constraints) and timeliness (e.g., to ensure that the trajectory may be calculated promptly and with little to no latency).

In some implementations, a trajectory may be calculated for travel by the drone 110 through a next waypoint, or through a next two waypoints, rather than through all of the waypoints through which the drone 110 is required to travel. The trajectory may be calculated and recalculated or updated as the drone 110 passes through each of the waypoints, thereby conserving processing power and resources in real time, and enabling the drone 110 to make adjustments, as necessary. Alternatively, a trajectory may be calculated initially for traveling through all of the waypoints, and adjusted only as necessary. Additionally, and preferably, the trajectory may be calculated for travel by the drone 110 between a second waypoint, and a second-to-last waypoint, e.g., when the drone 110 is airborne, and not for travel by the drone 110 between a first waypoint and the second waypoint, e.g., when the drone 110 is taking off, or between the second-to-last waypoint and the last waypoint, e.g., when the drone is 110 is landing. In some implementations, a trajectory may also be calculated upon detecting an obstacle, upon executing a braking maneuver, or at any other time.

Figure 1C:
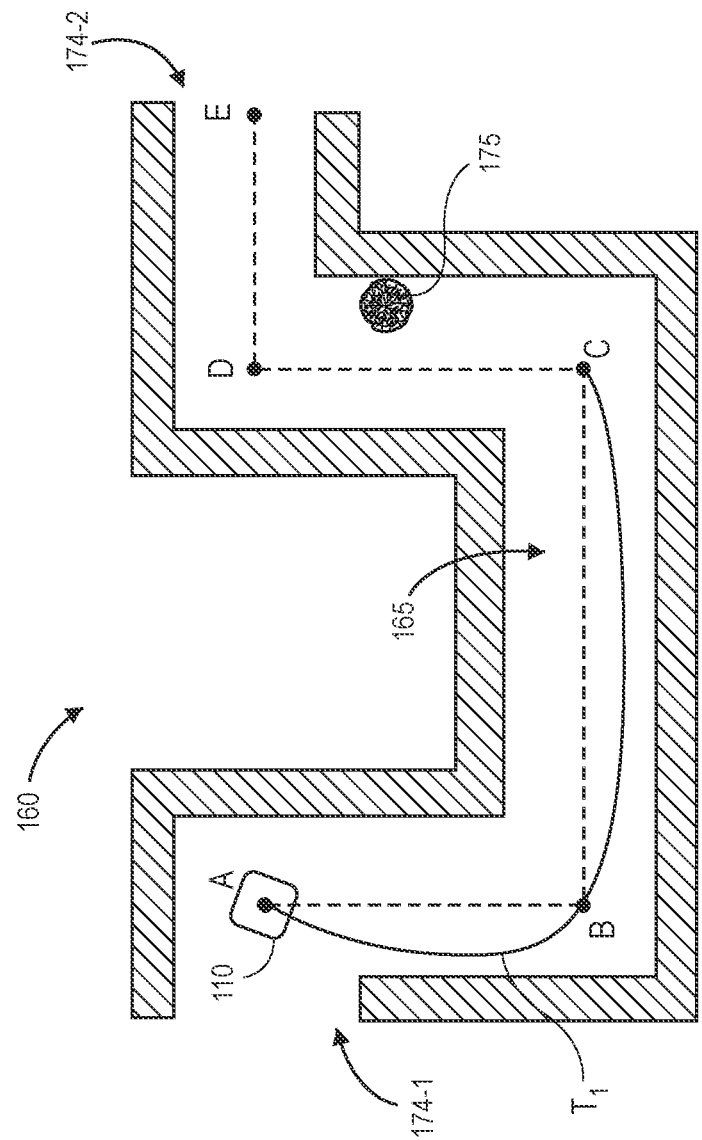

As is shown in FIG. 1C, while at the waypoint A, the drone 110 calculates an initial trajectory for traveling through the waypoint B to the waypoint C, e.g., in accordance with the drone trajectory equation of FIG. 1B, or in any other manner. The drone 110 may further generate and execute a set of commands or instructions for causing the drone 110 to travel along the trajectory, as well as sets of commands or instructions for capturing information or data regarding distances to portions of the passageway 165 or any other objects within a vicinity of the drone 110 using one or more onboard sensors, such as LIDAR sensors, time-of-flight sensors, microphones or cameras, that are aligned at any angle with respect to an orientation or configuration of the drone 110. The commands or instructions may be generated and executed at any rate or frequency, such as ten times per second, or a frequency of ten Hertz (10 Hz).

In accordance with one or more preferred implementations, a plurality of trajectory equations are calculated to define a trajectory from a first waypoint to a third waypoint through a second waypoint, and the trajectory equations are then utilized to generate a plurality of intermediate trajectory points (x, y, z) at various times t along the trajectory. In accordance with one or more preferred implementations, these calculated intermediate trajectory points are sent, at appropriate times, as setpoints to a navigation controller or module or another controller or module of a drone to attempt to effect travel of the drone along the trajectory. It will be appreciated that the result is that the drone will approximate the trajectory as it travels to the calculated points sent as setpoints for navigation.

Figure 1D:
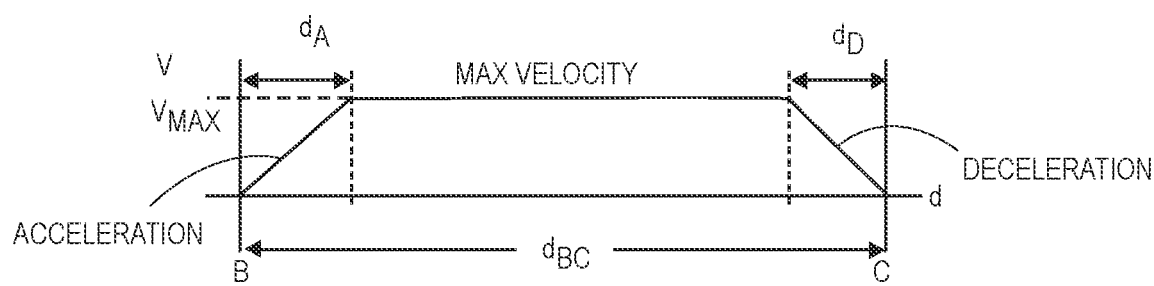
Figure 1D:
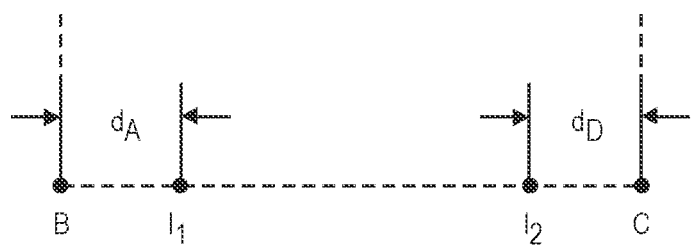

As is shown in FIG. 1D, the drone 110 may determine whether distances between any pair of the waypoints A, B, C, D and E, e.g., a distance between the waypoint B and the waypoint C, or the distance $d_{BC}$, is sufficiently long to enable the drone 110 to reach a maximum speed between such waypoints. For example, as is shown in FIG. 1D, where the drone 110 is limited by a maximum acceleration or another physical constraint, the drone 110 may require a minimum distance $d_A$ to accelerate from a velocity of zero to a maximum velocity, or $V_{MAX}$. Similarly, where the drone 110 is limited by a maximum deceleration or another physical constraint, the drone 110 may require a minimum distance $d_D$ to decelerate from the maximum velocity, or $V_{MAX}$, to a velocity of zero. Thus, where the distance between the waypoint B and the waypoint C, or $d_{BC}$, is not less than a sum of the minimum distance $d_A$ and the minimum distance $d_D$, the drone 110 is physically capable of reaching its maximum speed, or $V_{MAX}$, when traveling between the waypoint B and the waypoint C.

Figure 1E:
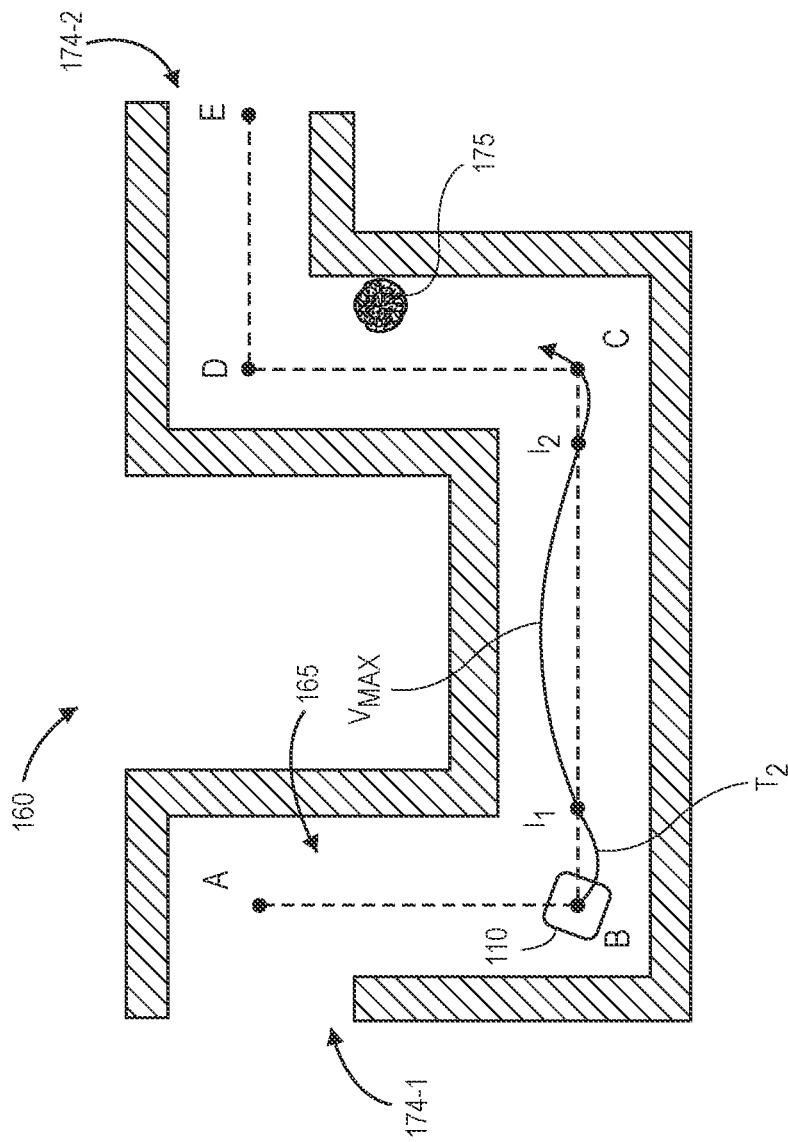

Therefore, as is shown in FIG. 1D, a first intervening waypoint $I_1$ and a second intervening waypoint $I_2$ may be generated on a line between the waypoint B and the waypoint C at the distance $d_A$ and the distance $d_D$ from the waypoint B and waypoint C, respectively. As is shown in FIG. 1E, the drone 110 recalculates a trajectory from the waypoint B to the waypoint C, through the first intervening waypoint $I_1$ and the second intervening waypoint $I_2$, e.g., according to the trajectory equation of FIG. 1B. The trajectory may be generated to minimize snap of the drone 110 when traveling through the passageway 165, and through each of the waypoints B and C. Additionally, the trajectory may further contemplate having the drone 110 travel between the first intervening waypoint $I_1$ and the second intervening waypoint $I_2$ at the maximum speed, or $V_{MAX}$.

Figure 1F:
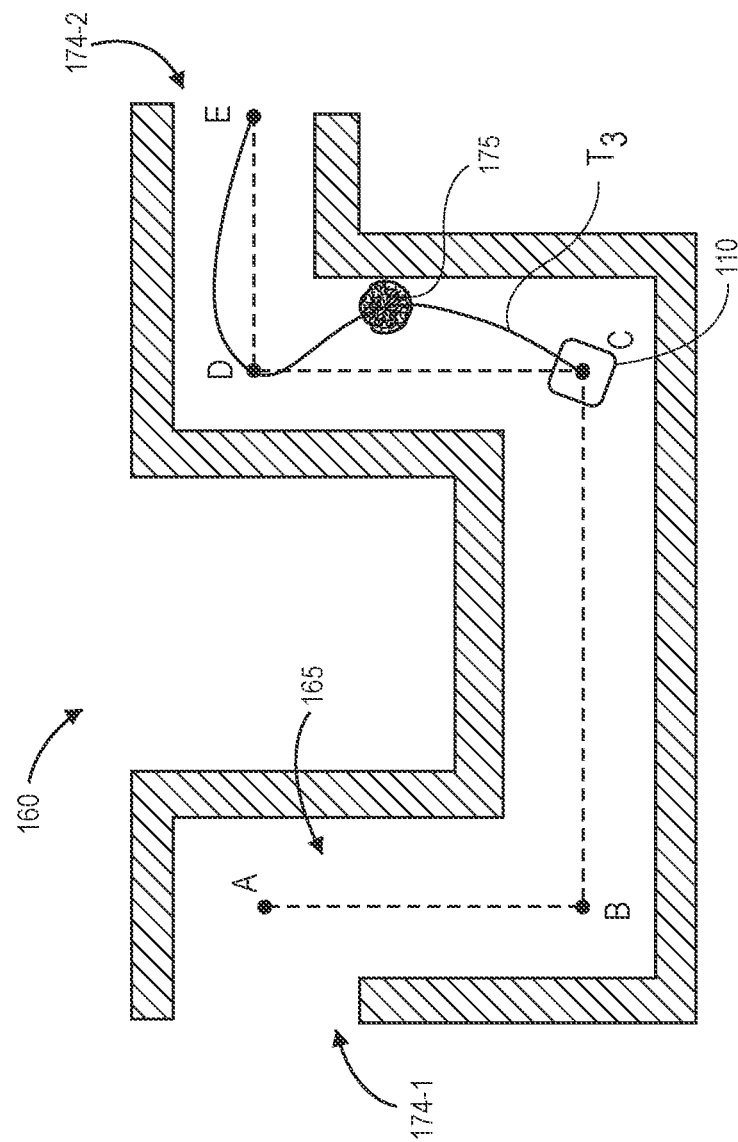

As is shown in FIG. 1F, upon arriving at the waypoint C, the drone 110 calculates a trajectory for traveling from the waypoint C through the waypoint D to the waypoint E, e.g., in accordance with the drone trajectory equation of FIG. 1B, or in any other manner. The drone 110 may further generate a set of commands for causing the drone 110 to capture information or data using one or more onboard sensors while traveling along the trajectory. Additionally, the drone 110 may compare the trajectory calculated to positions of one or more obstacles, e.g., the potted plant 175, that may be detected in any manner, in order to determine whether traveling on the trajectory would subject the drone 110 to a risk of collision with any of such obstacles.

Figure 1G:
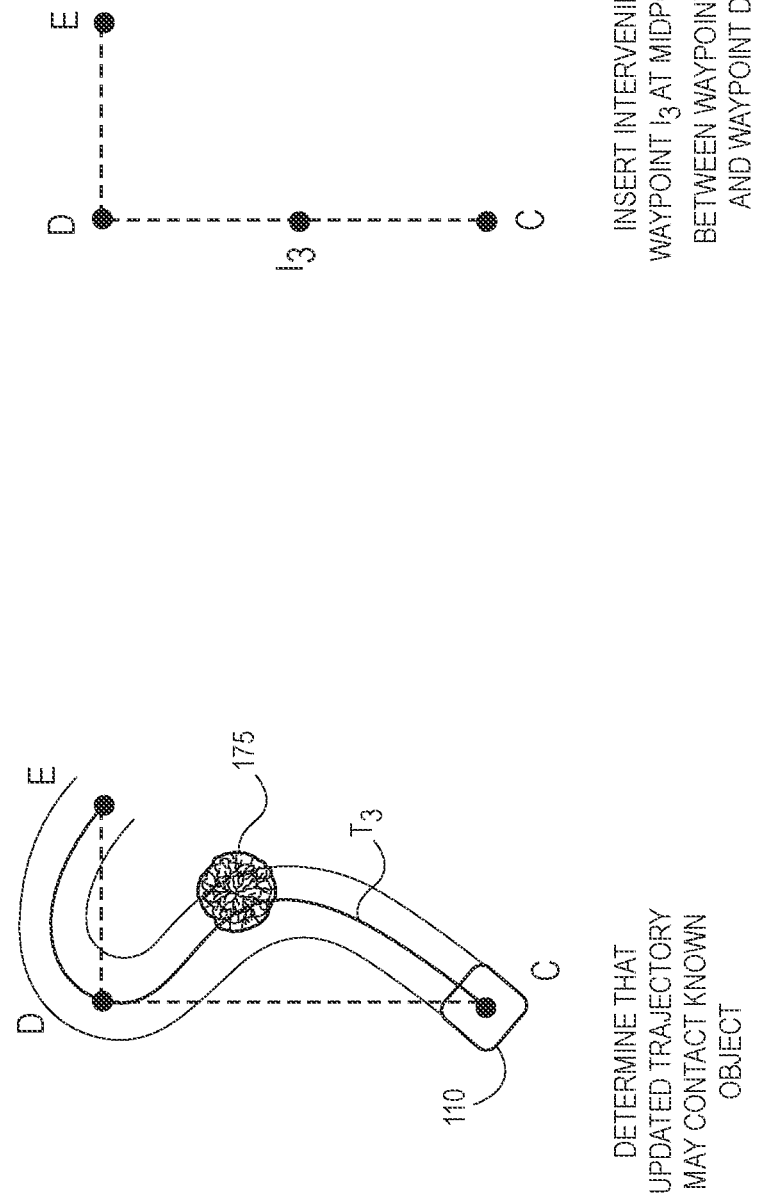

As is shown FIG. 1G, the drone 110 may determine that the trajectory calculated as shown in FIG. 1F would cause the drone 110 to travel into, over or unacceptably close to the potted plant 175. Therefore, the drone 110 may insert an intervening waypoint $I_3$ between the waypoint C and the waypoint D, e.g., at a midpoint along a segment of the path between the waypoint C and the waypoint D, and recalculate a trajectory that passes through the intervening waypoint $I_3$.

Figure 1H:
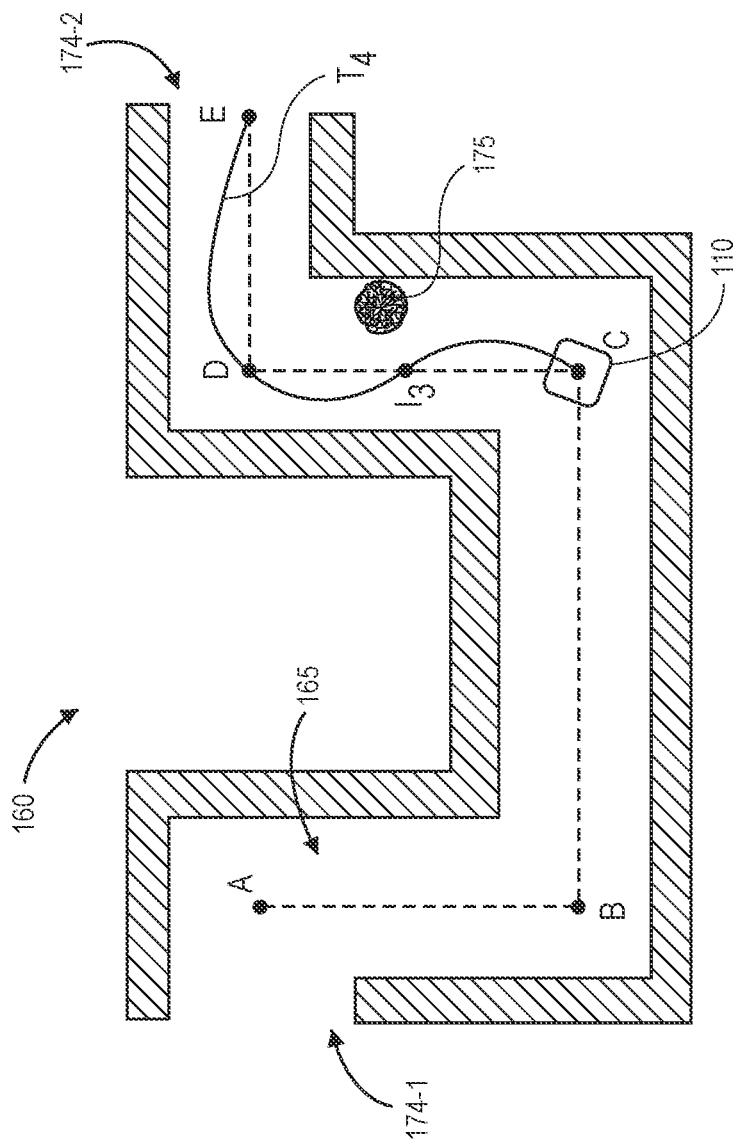

For example, as is shown in FIG. 1H, the drone 110 calculates a trajectory at the waypoint C that would cause the drone 110 to travel through the intervening waypoint $I_3$ and the waypoint D to the waypoint E, e.g., in accordance with the drone trajectory equation of FIG. 1B, or in any other manner. The drone 110 may further generate a set of commands for causing the drone 110 to capture information or data using one or more onboard sensors while traveling along the trajectory. In some implementations, the trajectory including the intervening waypoint 13 may be calculated at any time, e.g., upon determining that a trajectory without the intervening waypoint $I_3$ would cause the drone 110 to travel into, over or unacceptably close to the potted plant 175, or at any other time.

Additionally, in some implementations, an intervening waypoint may be inserted between a pair of waypoints in a path, as necessary, in order to ensure that the drone 110 may achieve or maintain a desired yaw angle while traveling along the path. For example, in some implementations, where a calculated trajectory calls for a change in yaw of the drone 110 between a pair of waypoints, e.g., a rotation from a first yaw angle to a second yaw angle, an estimated time for achieving the desired change in yaw may be calculated based on a maximum yaw velocity of the drone 110, and compared to an estimated time required to translate between the pair of waypoints according to a calculated trajectory. Where an estimated time for achieving the change in yaw is less than an estimated time required to translate between the pair of waypoints, then the calculated trajectory is sufficient to achieve both the desired translation from a first waypoint of the pair to a second waypoint of the pair, and also the desired change in yaw, and commands or instructions for traveling along the trajectory may be generated and executed by the drone 110. Where the estimated time for achieving the change in yaw is greater than the estimated time required to translate between the pair of waypoints according to the calculated trajectory, however, an intervening waypoint may be inserted between the pair of waypoints, and a new trajectory for traveling along a path between the three waypoints may be calculated, such as is shown in FIGS. 1G and 1H.

Alternatively, in some implementations, a "safety corridor" may be established on segments of a path extending between any pair of waypoints, viz., the waypoints A, B, C, D and E. The safety corridor may be defined with respect to a straight-line segment of a path between any pair of the waypoints, and may have a width or another dimension on either side of the straight-line segment that is defined arbitrarily, defined with respect to one or more dimensions of the drone 110, or defined on any other basis. For example, the safety corridor may be defined with respect to the passageway 165, such as to be narrower than a width of the passageway 165, e.g., by a safety margin, with respect to any walls, floors or ceilings of the passageway 165. Where a trajectory calculated in accordance with implementations of the present disclosure would cause the drone 110 to breach or otherwise pass outside of a safety corridor so defined, an intervening waypoint may be inserted between the waypoints of the pair, and another trajectory that would cause the drone 110 to travel through the intervening waypoint may be calculated, such as is shown in FIGS. 1G and 1H for the intervening waypoint $I_3$.

The systems and methods of the present disclosure are directed to the indoor navigation and obstacle avoidance by aerial vehicles (e.g., unmanned aerial vehicles, or drones). The aerial vehicles of the present disclosure may be of any type or form, and may include but need not be limited to low-power drones that may be configured for efficient path planning, adaptive speed modification, and obstacle avoidance techniques during operations within indoor spaces.

In some implementations, an unmanned aerial vehicle may be configured to calculate or plan trajectories that rely on maximum speed capacities of the unmanned aerial vehicle. For example, where an unmanned aerial vehicle is programmed or configured to travel through each of a plurality of waypoints (or spatial points), the unmanned aerial vehicle may calculate a trajectory as a set of piecewise polynomial functions of orders from zero to six, through a plurality of m waypoints, viz., from a waypoint 0 to a waypoint m, that represent positions of the unmanned aerial vehicle in three-dimensional space and minimize snap for the unmanned aerial vehicle. The unmanned aerial vehicle may adjust its speed according to a calculated risk of collision with any obstacles, and make smooth transitions in speed, while traveling through the various waypoints, with minimized yaw, pitch or roll.

In some implementations, an unmanned aerial vehicle may determine whether a trajectory would cause the unmanned aerial vehicle to come into contact with one or more known obstacles while traveling between waypoints. If the unmanned aerial vehicle determines that the trajectory would cause the unmanned aerial vehicle to come into contact with or pass unacceptably close to an obstacle between a pair of waypoints, the unmanned aerial vehicle may insert an additional waypoint (e.g., an intervening waypoint at a midpoint between the pair of waypoints), and recalculate a trajectory that causes the unmanned aerial vehicle to pass through the additional waypoint. If the recalculated trajectory would cause the unmanned aerial vehicle to pass the obstacle at a safe distance, the unmanned aerial vehicle may proceed along the recalculated trajectory.

In some implementations, an unmanned aerial vehicle may determine whether a distance between any of a pair of waypoints is sufficiently long to enable the unmanned aerial vehicle to accelerate to a maximum speed upon departing from one of the waypoints and to decelerate from the maximum speed prior to arriving at another of the waypoints. If the unmanned aerial vehicle may both accelerate to and decelerate from a maximum speed between a pair of waypoints, the trajectory may be calculated to include a first intervening waypoint located at a minimum acceleration distance from one of the waypoints of the pair and a second intervening waypoint located at a minimum deceleration distance from another of the waypoints of the pair. The unmanned aerial vehicle may thus travel at the maximum speed between the first intervening waypoint and the second intervening waypoint.

In some implementations, an unmanned aerial vehicle may be outfitted or equipped with one or more modules, e.g., hardware components or software applications to be executed by one or more hardware components. Such modules may include an obstacle detection module that may assess relative positions of obstacles in a given environment, using temporal information to fuse data received from range sensors provided aboard the unmanned aerial vehicle, e.g., a rotating two-dimensional LIDAR sensor and time-of-flight sensors provided in fixed orientations with respect to a fuselage or other component of the unmanned aerial vehicle. Additionally, a range map, a point cloud or another representation may be subject to pixelization to determine whether any obstacles are present, and to minimize computation resources and processing power.

Additionally, in some implementations, an unmanned aerial vehicle may be configured to determine a state of risk that the unmanned aerial vehicle may collide with one or more objects, and to select a speed of the unmanned aerial vehicle based on the state of risk. For example, where the unmanned aerial vehicle does not detect any obstacles within a first predetermined range in a direction of travel of the unmanned aerial vehicle (or on a heading of the unmanned aerial vehicle), the unmanned aerial vehicle may travel at a maximum speed, or at any other safe speed, along the direction of travel, consistent with a state of low or insignificant risk. Alternatively, where the unmanned aerial vehicle detects one or more obstacles within the first predetermined range in the direction of travel, the unmanned aerial vehicle may execute an immediate braking maneuver, and may slow to a predetermined speed that may be a fraction of the maximum speed, consistent with a state of high or significant risk. For example, in some implementations, in order to immediately brake, an unmanned aerial vehicle may insert an intervening waypoint that is directly behind a position of the unmanned aerial vehicle, and calculate a trajectory that would cause the unmanned aerial vehicle to attempt to return to the intervening waypoint, e.g., by operating one or more motors or control surfaces, and to effectively brake as a result.

The unmanned aerial vehicle may recalculate a trajectory for the unmanned aerial vehicle at the reduced speed, and continue to determine whether any obstacles are present along the trajectory of the unmanned aerial vehicle within a second predetermined range that may be shorter than the first predetermined range, subject to any adjustments compensating for the motion of the unmanned aerial vehicle along the direction of travel. If an obstacle is present within the second predetermined range, the unmanned aerial vehicle may execute an emergency maneuver, e.g., to immediately brake or to otherwise avoid the obstacle, such as by inserting an intervening waypoint immediately behind the unmanned aerial vehicle. If no obstacles are detected within the second predetermined range, then the unmanned aerial vehicle may continue to proceed at the predetermined reduced speed before accelerating to the maximum speed again upon confirming that the unmanned aerial vehicle is at a state of acceptable risk.

In accordance with some embodiments of the present disclosure, an unmanned aerial vehicle (e.g., a drone) may be programmed or configured to generate one or more environment maps of spaces within a facility using images or other data captured by one or more onboard sensors. Such sensors may include digital cameras (e.g., visual or depth cameras) or other imaging devices, which may be aligned with fields of view or axes of orientation extending in any direction, e.g., forward, aft, port, starboard, up, down, or in any other direction. For example, the imaging devices may have fields of view or axes of orientation that are aligned along or parallel to yaw, pitch or roll axes of an unmanned aerial vehicle, e.g., principal axes of the unmanned aerial vehicle, or at any other angle. In some embodiments, an unmanned aerial vehicle may include one or more depth cameras or range sensors, such as LIDAR sensors or time-of-flight sensors, that are aligned at any angle with respect to an orientation or configuration of an unmanned aerial vehicle. For example, the unmanned aerial vehicle may include depth cameras or range sensors with fields of view or orientations pointing vertically upward or downward, as well as depth cameras or range sensors having fields of view or orientations that vary with respect to an orientation or configuration of the unmanned aerial vehicle. In some embodiments, an unmanned aerial vehicle may include one or more imaging devices such as depth cameras or range sensors (e.g., LIDAR sensors or other time-of-flight sensors) that are configured to determine ranges based on any number of pixels of data, e.g., grids of four pixels by four pixels, or eight pixels by eight pixels, or the like. In some embodiments, an unmanned aerial vehicle may include one or more imaging devices such as depth cameras or range sensors that are configured to determine ranges based on single pixels of data, e.g., a single-pixel LIDAR sensor or other sensor. Moreover, the unmanned aerial vehicle may include one or more depth cameras, range sensors or other systems that are aligned with fixed orientations, or with variable orientations (e.g., rotating or shifting orientations).

The unmanned aerial vehicles of the present disclosure may be outfitted with one or more processors, components, transceivers, sensors or other systems for engaging in communications with aspects of a facility (e.g., appliances, lighting, environmental or other systems), as well as any persons within the facility. For example, an unmanned aerial vehicle may include any number of transceivers for communicating with aspects of the Internet or one or more other networks, including but not limited to any wired or wireless routers within a facility, or any other computer devices therein, as well as any number of sensors or readers for communicating via any wired or wireless systems or protocols, including but not limited to wireless fidelity ("Wi-Fi"), Bluetooth, radio frequency identification (or "RFID"), near-field communication (or "NFC") readers, or any other type of systems or protocols. For example, the unmanned aerial vehicles may further include any number of audio or video sensors, including but not limited to one or more imaging devices (e.g., digital cameras) and/or microphones, or any other type of sensors, embedded or incorporated therein.

Additionally, an unmanned aerial vehicle may further include any number of sensors, such as imaging devices (e.g., cameras configured to capture visual or depth data), temperature sensors, magnetometers, Wi-Fi receivers, Bluetooth receivers, or others, and may be programmed or configured to travel throughout one or more spaces of a facility and to capture data using such sensors. Based on the captured data, an environment map of such spaces or the facility may be generated. The environment map may identify or depict one or more boundaries (e.g., walls, ceilings, floors) or other aspects of such spaces, as well as the respective dimensions of such spaces, or the respective surfaces or textures of such boundaries. In some embodiments, an unmanned aerial vehicle may autonomously travel throughout one or more spaces of a facility in order to capture data using one or more sensors, and such data may be utilized in generating an environment map of the spaces of the facility. In some other embodiments, an unmanned aerial vehicle may be transported (e.g., carried) or escorted by a human actor throughout such spaces, and may capture data using one or more sensors as the unmanned aerial vehicle is transported or escorted throughout such spaces. Data captured as the unmanned aerial vehicle is escorted may be utilized in generating an environment map of the spaces of the facility. Additionally, in some embodiments, the unmanned aerial vehicle may selectively operate one or more propulsion motors as the unmanned aerial vehicle is transported or otherwise escorted throughout such spaces, in order to maintain altitude and/or tilt control. Furthermore, in some embodiments, data captured by the unmanned aerial vehicle as the unmanned aerial vehicle travels throughout the spaces of the facility may be adjusted to account for presence of one or more body parts of a human actor that is transporting or otherwise escorting the unmanned aerial vehicle through the facility.

In accordance with some embodiments of the present disclosure, an unmanned aerial vehicle may be configured to operate along with one or more stations, e.g., base components, charging docks (or charging stations or docking stations), or other intermediary devices. Such stations may have openings, cavities or spaces configured to accommodate one or more portions of an unmanned aerial vehicle, and may include one or more surfaces that are aligned to come into contact with corresponding surfaces of the unmanned aerial vehicle, thereby enabling electrical power, information or data to be conveyed between the unmanned aerial vehicle and such stations. In some embodiments, a base component, a charging dock, or another intermediary device may include an opening, a cavity or another space that is sized and shaped to receive or accommodate a specific portion of an unmanned aerial vehicle, e.g., a fuselage of the unmanned aerial vehicle, and to enable the unmanned aerial vehicle to be aligned in one of a plurality of alignments or orientations with respect to the base component, the charging dock or intermediary device.

Moreover, aerial vehicles of the present disclosure may be configured for use or operation within facilities of any kind. As used herein, the term "facility" shall refer to any building, region, structure or other space (e.g., covered or uncovered), such as a home of any type, kind, shape or form, including but not limited to a house, an apartment, a condominium, a dormitory, a barracks, or any other defined or undefined structure having one or more living spaces. A facility may also be a business-related structure such as a building, an office, a shopping center, a restaurant, a post office, a grocery store, a department store, a materials handling facility, or any other defined or undefined structure having one or more commercial areas. A facility may also be any other type of facility including but not limited to stadiums, ballfields, transportation centers or financial institutions (e.g., banks). In some embodiments, the facility may be or include an island or a space station.

Figure 2:
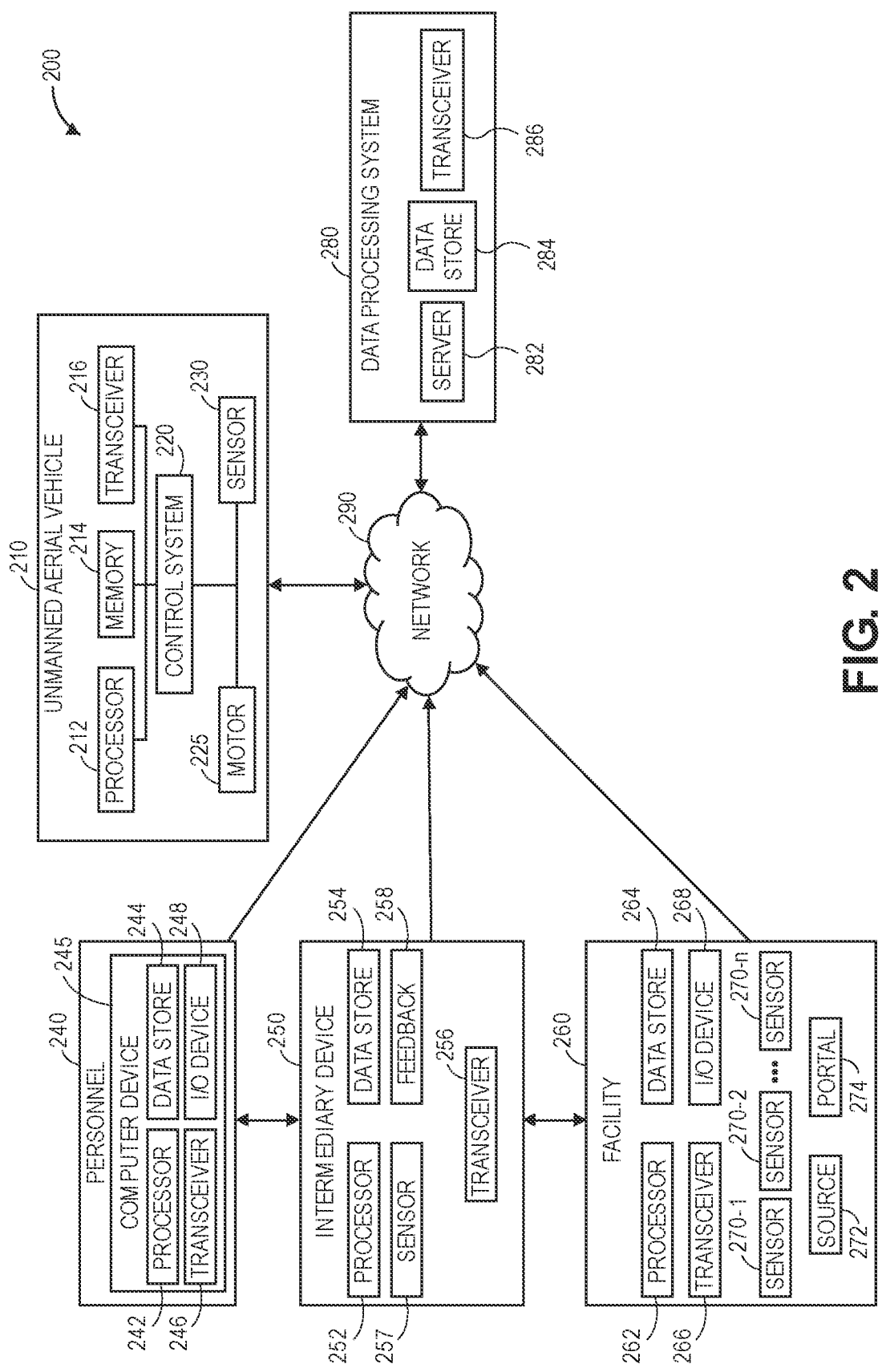
FIG. 2 is a block diagram of one system in accordance with embodiments of the present disclosure.

Referring to FIG. 2, a block diagram of components of one system including an unmanned aerial vehicle 210 in accordance with embodiments of the present disclosure is shown. The system 200 includes the unmanned aerial vehicle 210, personnel 240, an intermediary device 250, a facility 260 and a data processing system 280 that are connected to one another across a network 290, which may include the Internet in whole or in part. Except where otherwise noted, reference numerals preceded by the number "2" shown in FIG. 2 refer to elements that are similar to elements having reference numerals preceded by the number "1" shown in FIGS. 1A through 1H.

The unmanned aerial vehicle 210 may be an aerial vehicle (e.g., a drone), that may be programmed or configured to autonomously perform one or more operations within spaces of a facility. As is shown in FIG. 2, the unmanned aerial vehicle 210 includes a processor 212, a memory 214 and a transceiver 216. The unmanned aerial vehicle 210 further includes a control system 220, one or more motors 225, and one or more sensors 230.

The processor 212 may be configured to perform any type or form of computing function associated with the operation of the unmanned aerial vehicle 210. For example, the processor 212 may be configured to execute any other algorithms or techniques (e.g., machine learning systems or techniques) associated with one or more applications, purposes or functions, such as navigation, monitoring or collision avoidance, or to select at least one of a course, a speed or an altitude for the safe operation of the unmanned aerial vehicle 210. The processor 212 may be configured to control any aspects of the operation of the unmanned aerial vehicle 210 and any computer-based components thereon, including but not limited to the motors 225 or the sensors 230. For example, the processor 212 may control the operation of one or more control systems or modules, such as the control system 220, for generating instructions for conducting operations of one or more of the motors 225 or the sensors 230. Such control systems or modules may be associated with one or more other computing devices or machines, and may communicate with the data processing system 280 or one or more other computer devices over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the unmanned aerial vehicle 210 further includes one or more memory or storage components 214 (such as databases or data stores) for storing any type of information or data, e.g., instructions for operating the unmanned aerial vehicle 210, or information or data captured during operations of the unmanned aerial vehicle 210. The memory 214 may be configured to store executable instructions, imaging data, paths or routes, control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the unmanned aerial vehicle 210 to communicate through one or more wired or wireless means, e.g., wired technologies such as Universal Serial Bus (or "USB") or fiber optic cable, or standard wireless protocols or standards such as Bluetooth or any Wi-Fi protocol, over the network 290 or directly. The transceiver 216 may further include or be in communication with one or more input/output (or "I/O") interfaces, and may be configured to allow information or data to be exchanged between one or more of the components of the unmanned aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the control system 220, or the motors 225 or sensors 230. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the USB standard. In some other embodiments, functions of the transceiver 216 may be split into two or more separate components, or integrated with the processor 212.

The control system 220 may include one or more electronic speed controls, power supplies, navigation systems and/or payload engagement controllers for controlling the operation of the unmanned aerial vehicle 210 and for engaging with or releasing items, as desired. For example, the control system 220 may be configured to cause or control the operation of one or more of the motors 225, e.g., to cause one or more of the motors 225 to operate at desired speeds, in order to guide the unmanned aerial vehicle 210 along a desired course, at a desired speed, or at a desired altitude, as appropriate. The control system 220 may further control any other aspects of the unmanned aerial vehicle 210, including but not limited to the operation of one or more steering or braking systems, or one or more control surfaces such as wings, rudders, flaperons, elevons, elevators, ailerons, flaps, brakes or slats, within desired ranges. In some embodiments, the control system 220 may be integrated with one or more of the processor 212, the memory 214 and/or the transceiver 216.

The motors 225 may be any type or form of motor (e.g., electric, gasoline-powered or any other type of motor) capable of generating sufficient rotational speeds of one or more propellers or other components to provide thrust and/or lift forces to the unmanned aerial vehicle 210 and any payload engaged thereby. In some embodiments, one or more of the motors 225 may be a brushless direct current ("DC") multi-phase motor such as an outrunner brushless motor or an inrunner brushless motor.

The unmanned aerial vehicle 210 may include any number of such motors 225 of any kind. For example, one or more of the motors 225 may be aligned or configured to operate with different capacities or ratings, or at different speeds, or coupled to any number of wheels or propellers having different sizes and shapes. Additionally, one or more of the motors 225 may be an electric motor, e.g., a brushless DC multi-phase motor, and one or more of the motors 225 may be a gasoline-powered motor.

The unmanned aerial vehicle 210 may also include any number of sensors 230 or other components or other features for capturing data within a vicinity of the unmanned aerial vehicle 210, including but not limited to one or more imaging devices (e.g., digital cameras), Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude sensors, depth gauges, accelerometers, or sound sensors (e.g., microphones, piezoelectric sensors, vibration sensors or other transducers for detecting and recording acoustic energy from one or more directions).

Although the block diagram of FIG. 2 includes a single box corresponding to a motor 225 and a single box corresponding to a sensor 230, those of ordinary skill in the pertinent arts will recognize that the unmanned aerial vehicle 210 may include any number of motors 225 or sensors 230 in accordance with the present disclosure.

The personnel 240 (or operators, or users, or other persons) may be any individual or entity associated with the facility 260. For example, the personnel 240 may be any individual or entity having a permanent or temporary right of occupation, possession or ownership of all or any portion of the facility 260, including but not limited to a resident, a tenant, an employee, or a contractor, or any other individual designated by an owner, a resident, a tenant, an employee or a contractor of the facility 260. The personnel 240 may utilize any number of computing devices 245 (e.g., a smartphone, a tablet computer, a laptop computer, a desktop computer, or computing devices provided in wristwatches, televisions, set-top boxes, automobiles or any other appliances or machines), or any other machines. As is shown in FIG. 2, the computer device 245 may include one or more processors 242, data stores (e.g., databases) 244, transceivers 246 (e.g., transmitters and/or receivers) and I/O devices 248 (e.g., keyboards, keypads, mice, styluses, touchscreens, RFID readers, or other devices).

The intermediary device 250 includes one or more processors 252, data stores 254, transceivers 256, sensors 257 and/or feedback devices 258. The transceivers 256 may be configured to receive or transmit electrical power to or from the unmanned aerial vehicle 210, or to receive or transmit information or data to or from the unmanned aerial vehicle 210, the personnel 240, the facility 260 and/or the data processing system 280, or any other computing device over the network 290.

Moreover, in some embodiments, the intermediary device 250 may be configured to receive and/or interpret signals received from any systems or sensors within or without the facility 260, and to determine, with one or more measures of a level of confidence (e.g., a confidence score), whether a predetermined event or condition has occurred or is present within the one or more spaces. In some embodiments, the intermediary device 250 may transmit one or more sets of instructions to such systems or sensors, or to establish one or more settings or conditions of such systems or sensors. Any of the applications or functions described herein as being executed or performed by the data processing system 280 herein may be executed or performed by the intermediary device in accordance with embodiments of the present disclosure.

Additionally, the intermediary device 250 may further include any type of power source for providing electrical power, e.g., alternating current ("AC") or DC power, or other forms of power in support of one or more electrical loads. Such power sources may include, for example, one or more batteries or other power cells, e.g., dry cell or wet cell batteries such as lead-acid batteries, lithium ion batteries, nickel cadmium batteries or nickel metal hydride batteries, or any other type, size or form of batteries, and may each have any cell voltages, peak load currents, charge times, specific energies, internal resistances or cycle lives, or other power ratings. The intermediary device 250 may also include any type, size or form of other power source, e.g., other than a battery, including but not limited to one or more fuel cells or solar cells.

The intermediary device 250 may be or include any computer-related machine that is configured to control the operation of one or more aspects of the facility 260 on behalf of the personnel 240. For example, the intermediary device 250 may be configured to control the capture of information or data within the facility 260 by one or more sensors 270-1, 270-2 . . . 270-n, or to grant or restrict access to the facility 260 by operating (e.g., locking, unlocking, opening, closing) one or more of the portals 274. Alternatively, the intermediary device 250 may be configured to activate any other systems that may be associated with the facility 260 (e.g., lighting and/or environmental systems). In this regard, the intermediary device 250 may receive information, data and/or instructions from one or more of the personnel 240, e.g., by way of the computer device 245, in the form of a direct inter-device connection or over the network 290. In some embodiments, the intermediary device 250 may be a general purpose computer device or system, or a special purpose computer device or system, provided within or in association with the facility 260, and configured to execute one or more applications or functions associated with operations occurring within the facility 260.

In some embodiments, the intermediary device 250 may be a charging station, e.g., a system including a set of one or more contacts for transferring electrical power to the unmanned aerial vehicle 210 or any other component, or for receiving electrical power from the unmanned aerial vehicle 210 or any other component, via a corresponding set of one or more contacts provided on one or more portions of the unmanned aerial vehicle 210. In some embodiments, the intermediary device 250 may be a docking station, e.g., a system including one or more physical or structural features for engaging with or providing support to the unmanned aerial vehicle 210 or any other component, such as to maintain the unmanned aerial vehicle 210 in a specific location, position or orientation. In some embodiments, the intermediary device 250 may be a charging dock, e.g., a system having one or more features of a charging station and/or a docking station as described herein. In some embodiments, the intermediary device 250 may be a smart speaker, a personal assistant device, a home security system component, or any other like machine associated with the facility 260. Alternatively, or additionally, in some embodiments, the intermediary device 250 may include any number or set of features of a charging station, a docking station, a charging dock, a smart speaker, a personal assistant device, a home security system component, or any other machine or component.

The sensors 257 may be any type or form of sensors having any components or features for determining one or more attributes of the intermediary device 250 and/or the facility 260, including extrinsic information or data or intrinsic information or data. Such sensors 257 may be installed in the same common unit as the one or more processors 252, data stores 254, transceivers 256 and/or feedback devices 258, or in one or more units provided in association with (and in communication with) such components, subject to functional or spacing limitations or constraints.

In some embodiments, the sensors 257 may include one or more thermometers, barometers, hygrometers, anemometers, current sensors, voltage sensors, resistance sensors or any other type or form of sensor. In some other embodiments, the sensors 257 may include one or more air monitoring sensors (e.g., oxygen, ozone, hydrogen, carbon monoxide or carbon dioxide sensors), acoustic sensors (e.g., microphones, piezoelectric sensors, vibration sensors), infrared sensors, ozone monitors, pH sensors, magnetic anomaly detectors, metal detectors, radiation sensors (e.g., Geiger counters, neutron detectors, alpha detectors) or the like, as well as one or more imaging devices (e.g., digital cameras). In some embodiments, information or data captured by one or more of the sensors 257 may be used to authenticate one or more individuals or entities at the facility 260, including but not limited to the personnel 240, or any other individual or entity.

The intermediary device 250 may further include one or more feedback devices 258. The feedback devices 258 may be any component configured for returning feedback to the personnel 240, or to any other individuals or entities in or around the facility 260. Such feedback devices 258 may be installed in the same common unit as the one or more processors 252, data stores 254 and/or transceivers 256, or in one or more units provided in association with (and in communication with) such components, subject to functional or spacing limitations or constraints.

In some embodiments, the feedback devices 258 may include one or more individually addressable lighting elements (e.g., LED lights) that may be automatically controlled or configured to emit light in any frequency, intensity or hue. In some other embodiments, the feedback devices 258 may include one or more audio speakers or other physical components that may be automatically controlled or configured to transmit audible messages, signals or sounds. In some other embodiments, the feedback devices 258 may include one or more haptic vibrating elements, e.g., any physical component that may be automatically controlled or configured to generate tactile vibrations of any frequency or intensity.

The facility 260 may be any building, region, structure or other space (e.g., covered or uncovered) to which the automated control of access may be desired, or from within which secure communications may be desired. For example, as is discussed above, the facility 260 may be a home or a business-related structure of any type, kind, shape or form, or any other type of facility. The facility 260 may further include a networked computer infrastructure, including one or more processors 262, data stores (e.g., databases) 264, transceivers 266 (e.g., transmitters and/or receivers) and I/O devices 268 (e.g., keyboards, keypads, mice, styluses, touchscreens, RFID readers, or other devices).

The facility 260 further includes the sensors 270-1, 270-2 . . . 270-n, one or more sources 272 of wireless energy, and one or more portals 274. The sensors 270-1, 270-2 . . . 270-n may take the form of one or more of the sensors 257 described above, and, like such sensors 257, may be any operational and/or environmental sensors having any components or features for determining one or more attributes of the facility 260, including extrinsic information or data or intrinsic information or data. The sensors 270-1, 270-2 . . . 270-n may further include one or more sensors that are associated with security functions at the facility 260, including one or more door sensors, window sensors, motion sensors, security cameras, or others.

In some embodiments, the I/O devices 268 may be configured to receive and provide information to the personnel 240 or to any other individuals or entities at the facility 260, and may include, but are not limited to, a display, (e.g., a touch-screen display), a scanner, a keypad, a biometric scanner, an audio transducer, one or more speakers, one or more imaging devices such as a video camera, and any other types of input or output devices that may support interaction between the intermediary device 250, the facility 260 and/or the various personnel 240. For example, in one embodiment, the I/O devices 268 may include a touchscreen display and/or a keypad for receiving inputs. In various embodiments, the I/O devices 268 may have capabilities for directly receiving such signals from the personnel 240 or the intermediary device 250 that provides a signal or an instruction to operate one or more of the portals 274.

The sources 272 may be any components within or associated with the facility 260 that are configured to transmit wireless energy in any type or form. For example, one or more of the sources 272 may include a current-carrying conductor of any kind, which may generate and radiate a magnetic field according to Ampere's Law. The sources 272 may further include any device or system that is configured to communicate according to one or more wireless protocols or standards, such as any Wi-Fi or Bluetooth protocol or standard.

The portals 274 may include one or more doors, windows or other access points, as well as any electrometrical components for automatically operating such doors or other access points. Such portals 274 may be used to obtain access to the facility 260, e.g., an external door, or to obtain access to one or more specific spaces within the facility 260, e.g., an internal door, such as one or more rooms within the facility 260. The portals 274 may further include any other systems associated with other openings to the facility 260, such as windows.

The portals 274 may be operated under the control of the unmanned aerial vehicle 210, the processors 262 and/or the intermediary device 250 or, alternatively, the computer device 245 of the personnel 240. For example, each of the portals 274 may be in communication with the one or more processors 262 and/or the intermediary device 250, e.g., Bluetooth® or Wi-Fi, and may transmit or receive one or more signals or instructions associated with their respective operations. Alternatively, any of the portals 274 may be operated based at least in part on manual or automatic inputs provided by the personnel 240 or another authorized individual at the facility 260, e.g., by way of the I/O devices 268. In some embodiments, one or more of the portals 274 may include an electromechanical operating and/or locking mechanism which is designed to automatically open or close a portal, or to lock or unlock the portal, in response to signals or instructions from an authorized device using a wired or wireless protocol. Such instructions may include a password or another authenticator (e.g., a cryptographic key). Additionally, the portals 274 may be associated with the one or more sensors 270-1, 270-2 . . . 270-n, or may include one or more sensors, and may be configured to capture information or data regarding successful or unsuccessful attempts at operation thereof, or any other events occurring at the facility 260.

The data processing system 280 includes one or more physical computer servers 282 having one or more computer processors, one or more data stores (e.g., databases) 284, and any number of transceivers 286 associated therewith, as well as provided for any specific or general purpose. In some embodiments, the data processing system 280 of FIG. 2 may be independently provided for the exclusive purpose of receiving, analyzing or storing information or data received from the unmanned aerial vehicle 210 or, alternatively, provided in connection with one or more physical or virtual services configured to receive, analyze or store such information or data, as well as one or more other functions. In some other embodiments, the data processing system 280 may be associated with an electronic marketplace, a fulfillment center, a warehouse, a bricks-and-mortar retail establishment, or any other like facilities. Such facilities may be adapted to receive, store, process and/or distribute items, and may include any number of stations for receiving, storing and distributing items to customers, including but not limited to one or more receiving stations, storage areas and/or distribution stations, which may further include any number of associated servers, data stores, processors or like computer components. Alternatively, or additionally, in some embodiments, the data processing system 280 may be associated with any number of public or private authorities, such as police, fire or security personnel.

The servers 282 may be connected to or otherwise communicate with the data stores 284 and the transceivers 286, and may receive, analyze or store any type of information or data, e.g., imaging data, acoustic signals, environmental conditions, operational characteristics, or positions, or any other information or data, for any purpose. The servers 282 and/or the data stores 284 may also connect to or otherwise communicate with the network 290, through the sending and receiving of digital data. In some embodiments, the data processing system 280 may be provided in a physical location, e.g., in association with the facility 260. In other such embodiments, the data processing system 280 may be provided in one or more alternate or virtual locations, e.g., in a "cloud"-based environment. In still other embodiments, the data processing system 280 may be provided onboard one or more vehicles, including but not limited to the unmanned aerial vehicle 210.

Each of the transceivers 216, 246, 256, 266, 286 or other communications devices, systems or components may be configured to communicate through one or more wired or wireless means, e.g., wired technologies such as Universal Serial Bus (or "USB") or fiber optic cable, or wireless standards or protocols such as Bluetooth® or any Wi-Fi protocol, over the network 290 or directly. The transceivers 216, 246, 256, 266, 286 may further include or be in communication with one or more I/O interfaces, network interfaces or devices, and may be configured to allow information or data to be exchanged between one another, or to or from one or more other computer devices or systems via the network 290.

The transceivers 216, 246, 256, 266, 286 may perform any necessary protocol, timing or other data transformations in order to convert data signals from a first format suitable for use by one component into a second format suitable for use by another component. For example, in some embodiments, the transceivers 216, 246, 256, 266, 286 may be configured to communicate according to one or more protocols traditionally associated with discrete components, e.g., within specific frequency spectra, including but not limited to radio frequency signals typically within ranges of approximately three hundred to four hundred megahertz, or MHz, as well as radio frequency signals typically within ranges of approximately three hundred to five hundred megahertz, or MHz.

In some embodiments, the transceivers 216, 246, 256, 266, 286 may be configured to transmit or receive Bluetooth® signals sent within an industrial, scientific and medical (ISM) radio frequency range of approximately 2.400 to approximately 2.500 gigahertz (GHz), with a center frequency of approximately 2.450 GHz. Such signals are typically sent within a particular range of approximately 2.402 to approximately 2.480 GHz, and have a maximum transmission rate on Bluetooth® networks of 3 megabits per second (or 3 Mbps) or more, with a maximum transmission range of 10 to 100 meters or more, and at powers of approximately one milliwatt (mW), or 0.001 watts (W). The transceivers 216, 246, 256, 266, 286 may operate according to a frequency-hopping spread spectrum (FHSS) method, e.g., by switching carriers across multiple frequency channels and transmitting communications in small segments, and in respective time slots. In some embodiments, such communications may be transmitted at approximately 1,600 times per second across 79 different subfrequencies at bandwidths of 0.001 GHz, or one megahertz (MHz) across the 2.402 to 2.480 GHz range.

In some embodiments, the transceivers 216, 246, 256, 266, 286 may be configured to transmit or receive Ultra-Wide Band (or "UWB") signals over one or more broad spectrums within any radio frequency range. In some embodiments, the UWB signals may be transmitted and/or received over a range of approximately three to eleven gigahertz (GHz), or over a range of approximately four to six gigahertz (GHz), with a center frequency of approximately five gigahertz (GHz). Alternatively, the UWB signals may be transmitted over any frequency range, and with any center frequency. Additionally, the UWB signals may consist of billions of pluses transmitted across such frequency spectrums, and at various power levels or power densities.

In some embodiments, the transceivers 216, 246, 256, 266, 286 may be configured to transmit or receive RFID signals at low frequency (LF), medium frequency (MF) or high frequency (HF) levels (e.g., approximately 3 kilohertz to 30 megahertz, or 3 kHz-30 MHz) and transfer relatively small-sized sets or packets of data over short ranges (e.g., between one and one hundred centimeters, or 1-100 cm). In some other embodiments, the transceivers 216, 246, 256, 266, 286 may be configured to transmit or receive RFID signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

Alternatively, the transceivers 216, 246, 256, 266, 286 may be configured to communicate within customized frequency spectra, or at dynamic frequencies, in accordance with the present disclosure. For example, in some embodiments, one or more of the transceivers 216, 246, 256, 266, 286 may be configured to communicate according to a proprietary standard or protocol, or within a proprietary frequency spectrum.

In some embodiments, the transceivers 216, 246, 256, 266, 286 may include support for devices attached through various types of peripheral buses, e.g., variants of the PCI standard or the USB standard. In some other embodiments, functions of the transceivers 216, 246, 256, 266, 286 may be split into two or more separate components, or incorporated directly into one or more processors or other components.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein. Any combination of networks or communications protocols may be utilized in accordance with the systems and methods of the present disclosure. For example, the various components described herein may be configured to communicate via an open or standard protocol such as Wi-Fi. Alternatively, such components may be configured to communicate with one another directly outside of a centralized network, such as the network 290, e.g., by a wireless protocol such as Bluetooth, in which two or more of such components may be paired with one another.

The computers, servers, devices and the like described herein have the necessary electronics, software, memory, storage, databases, firmware, logic/state machines, microprocessors, communication links, displays or other visual or audio user interfaces, printing devices, and any other I/O devices to provide any of the functions or services described herein and/or achieve the results described herein. Also, those of ordinary skill in the pertinent arts will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The unmanned aerial vehicle 210, the personnel 240, the intermediary device 250, the facility 260 and/or the data processing system 280 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages, online marketplace messages, telephone calls or the like. For example, the unmanned aerial vehicle 210, the computer device 245, the intermediary device 250, the facility 260 and/or the data processing system 280 may be adapted to transmit information or data in the form of synchronous or asynchronous messages between or among themselves, or between or among any other computer device in real time or in near-real time, or in one or more offline processes, via the network 290. Those of ordinary skill in the pertinent arts would recognize that the unmanned aerial vehicle 210, the computer device 245, the intermediary device 250, the facility 260 and/or the data processing system 280 may operate any of a number of computing devices that are capable of communicating over the network, including but not limited to set-top boxes, personal digital assistants, digital media players, web pads, laptop computers, desktop computers, laptop computers, tablet computers, smartphones, smart speakers, wrist watches, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processors 212, the computer device 245, the intermediary device 250, the facility 260 and/or the data processing system 280, or any other computers or control systems, and having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3A:
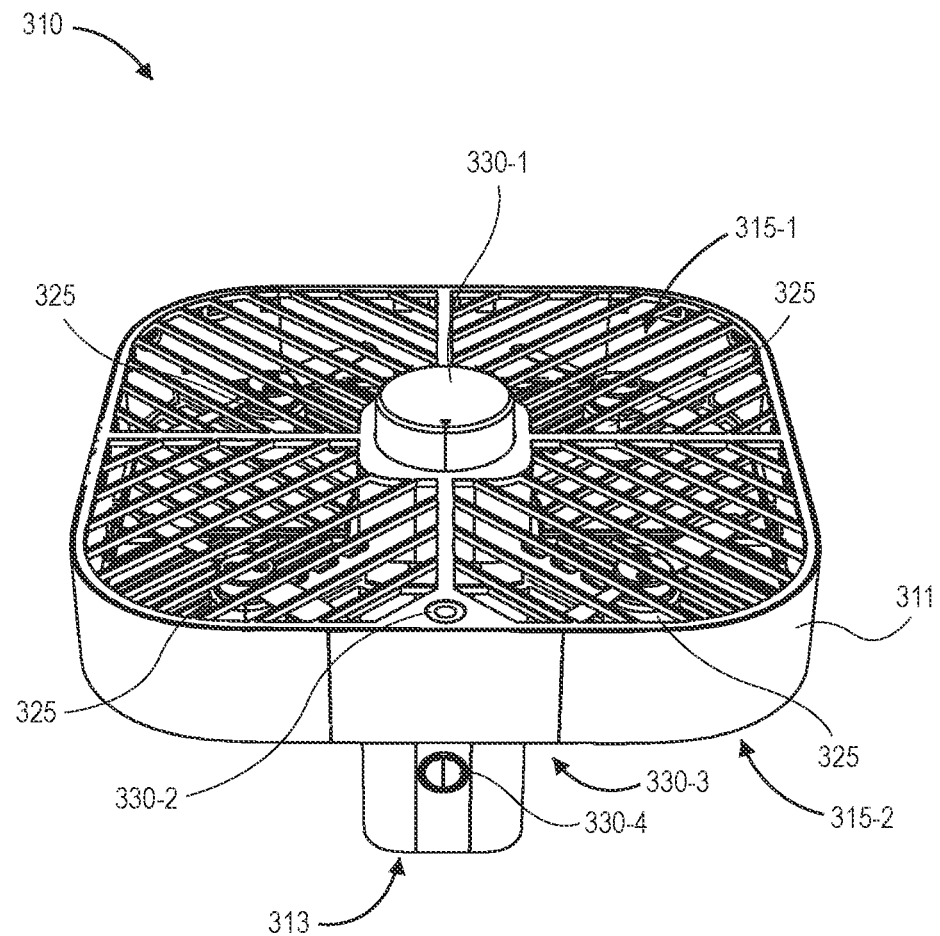
FIGS. 3A through 3C are views of aspects of one system in accordance with embodiments of the present disclosure.
Figure 3B:
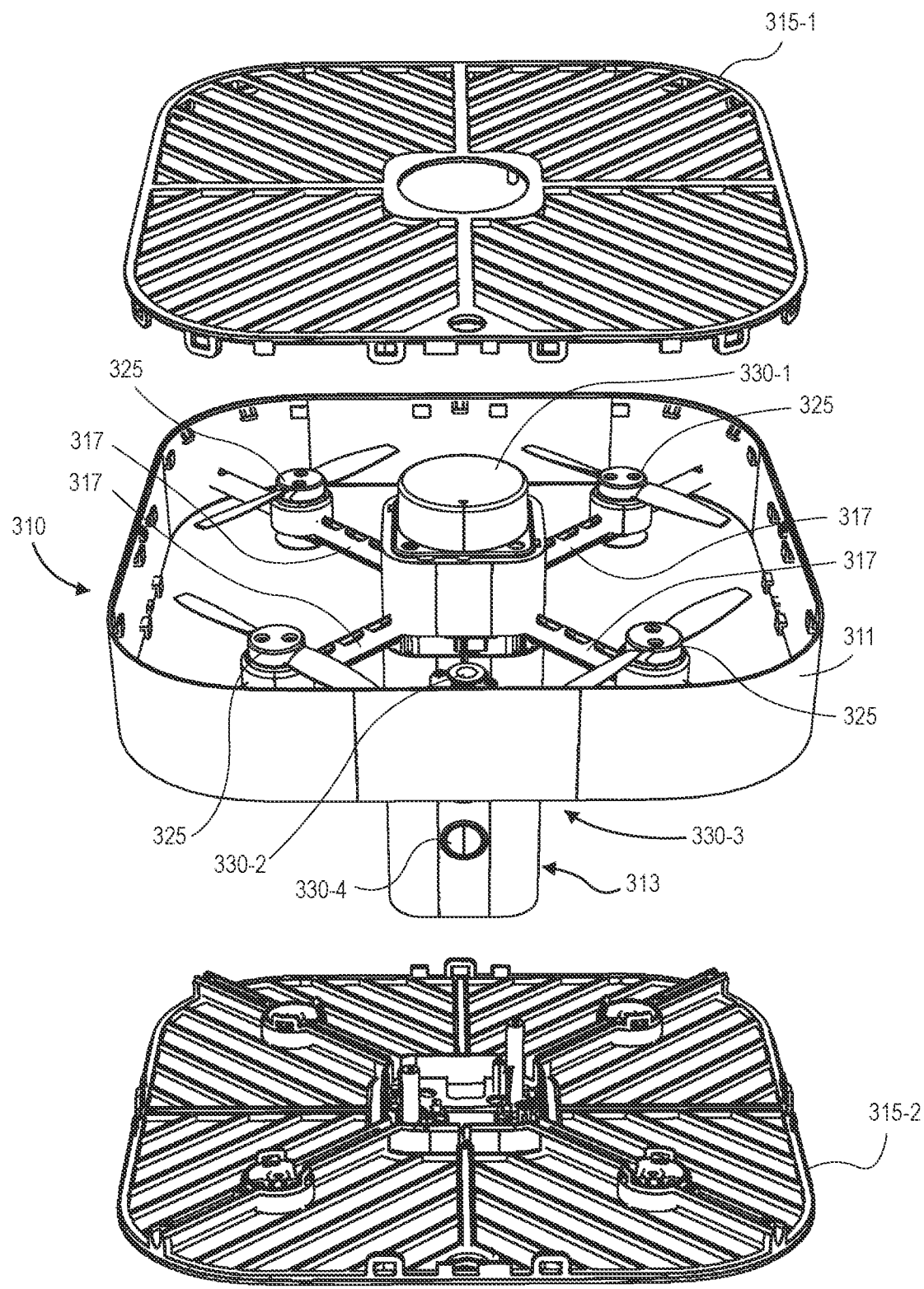
Figure 3C:
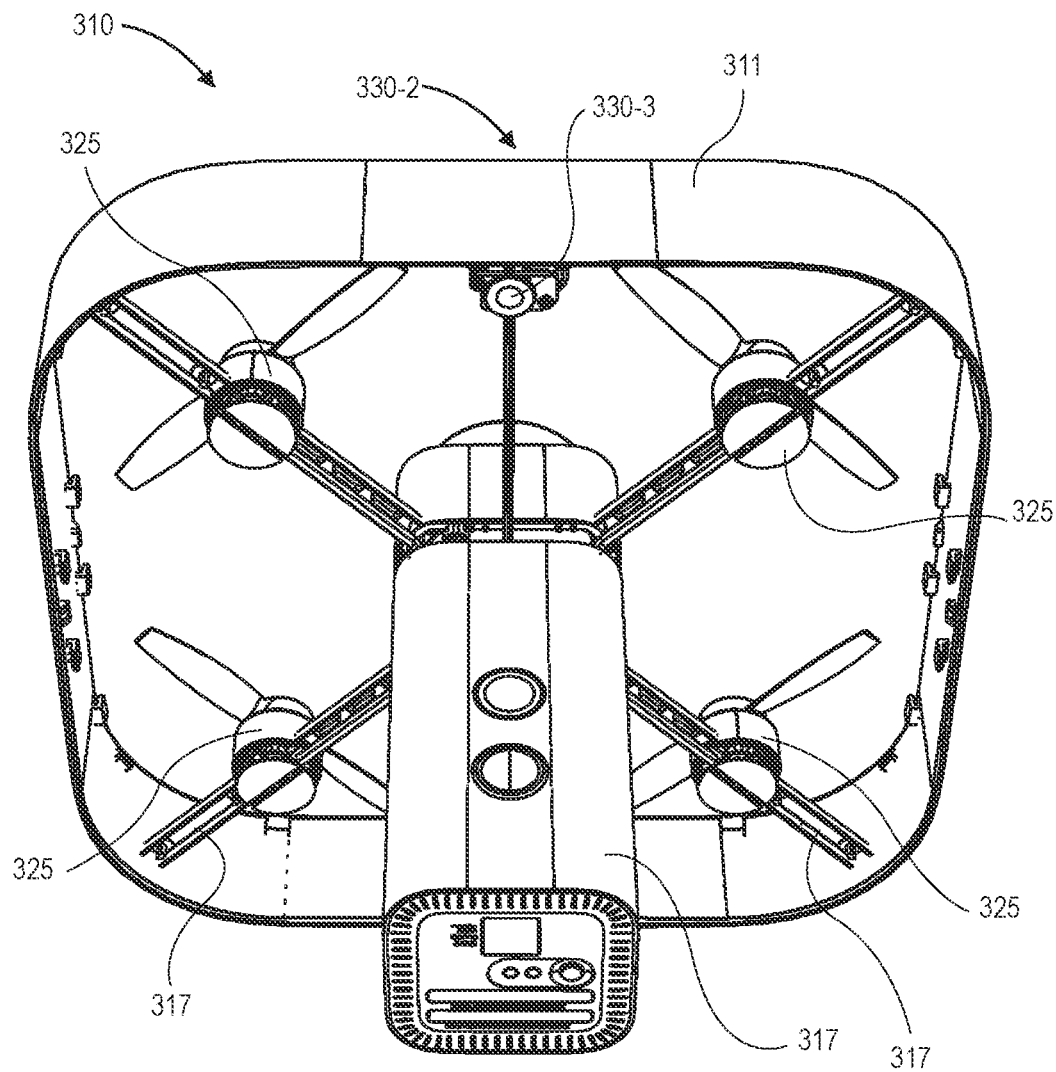

Referring to FIGS. 3A through 3C, views of aspects of one system (e.g., an unmanned aerial vehicle 310) in accordance with embodiments of the present disclosure are shown. Except where otherwise noted, reference numerals preceded by the number "3" shown in FIGS. 3A through 3C indicate components or features that are similar to components or features having reference numerals preceded by the number "2" shown in FIG. 2 or by the number "1" shown in FIGS. 1A through 1H.

FIG. 3A is a top perspective view of the aerial vehicle 310 with a top cover 315-1 and a bottom cover 315-2 mounted thereto. FIG. 3B is an exploded view of the top perspective view of the aerial vehicle 310 with the covers 315-1, 315-2 detached from the aerial vehicle 310. FIG. 3C is a bottom view of the aerial vehicle 310 with the covers 315-1, 315-2 removed therefrom.

As is shown in FIG. 3A, the aerial vehicle 310 includes a frame 311, a fuselage 313, and the pair of covers 315-1, 315-2. The frame 311 is defined by a plurality of sides (e.g., four sides) and has a common height. For example, as is shown in FIG. 3A, the frame 311 has a substantially square cross-section, e.g., a cross-section in the shape of a square with rounded corners or edges, or a squircle, with a constant height.

The fuselage 313 comprises a housing or chamber having a shape that is also defined by a plurality of sides (e.g., four sides) and a common height. For example, as is shown in FIG. 3A, the fuselage 313 also has a substantially square cross-section, e.g., a cross-section in the shape of a square with rounded corners or edges, or a squircle, with a constant height.

As is also shown in FIG. 3A, a height of the fuselage 313 is greater than a height of the frame 311. As is further shown in FIG. 3A, a length or width of the frame 311 is greater than a length or width of the fuselage 313. Alternatively, in some embodiments, the frame 311 and the fuselage 313 may have cross-sections of any other sizes or shapes, e.g., rectangles other than squares, triangles, or any other polygons, or circles or any other curvilinear shapes. In some embodiments, the frame 311 and the fuselage 313 may have the same or similar shapes, such as is shown in FIG. 3A, where each of the four sides of the frame 311 is parallel to at least one of the sides of the fuselage 313. In some other embodiments, however, the frame 311 and the fuselage 313 may have different or dissimilar shapes.

The frame 311 and the fuselage 313 are mounted to one another in a manner that causes a geometric center or centroid of a cross-section of the frame 311 to be aligned along a common axis with a geometric center or centroid of a cross-section of the fuselage 313. As is shown in FIG. 3A, the aerial vehicle 310 further includes a time-of-flight sensor module 330-1 provided at an upper end of the fuselage 313, at least partially above the frame 311, as well as a time-of-flight sensor module 330-2 provided at an upper edge of the fuselage 313, and a time-of-flight sensor module 330-3 provided at a lower edge of the fuselage 313.

The time-of-flight sensor module 330-1 may comprise an illuminator or other light source (e.g., a modulated light source) that is configured to transmit light along axes or directions that are normal to, and extend radially outward from, the axis along which the geometric center or centroid of the frame 311 and the geometric center or centroid of the fuselage 313 are coaligned. The time-of-flight sensor module 330-1 is further configured to capture reflections of the light off one or more surfaces. Reflected light captured by the time-of-flight sensor module 330-1 may be interpreted to generate a depth image or range profile of distances between the time-of-flight sensor module 330-1, and the one or more surfaces, several times per second.

In some embodiments, the time-of-flight sensor module 330-1 may be configured to rotate an illuminator, or the axis or the direction along which the time-of-flight sensor module 330-1 transmits light, about the axis along with the geometric center or centroid of the frame 311 and the geometric center or centroid of the fuselage 313 are coaligned. By rotating the illuminator or the transmissions of light about the axis along with the geometric center or centroid of the frame 311, and the geometric center or centroid of the fuselage 313 are coaligned, the time-of-flight sensor module 330-1 may be used to generate depth images, range profiles or other sets of distances covering three hundred sixty degrees around the aerial vehicle 310.

The time-of-flight sensors 330-2, 330-3 also include illuminators or other light sources (e.g., modulated light sources) that are configured to transmit light along axes that are parallel to the axis along which the geometric center or centroid of the frame 311 and the geometric center or centroid of the fuselage 313 are coaligned, and in opposite directions, e.g., up and down, with respect to the orientation of the aerial vehicle 310 as shown in FIG. 3A. The time-of-flight sensor modules 330-2, 330-3 are further configured to capture reflections of the light transmitted thereby off one or more surfaces above or below the aerial vehicle 310, and to interpret such reflections in order to generate depth images, range profiles or other sets of distances between the time-of-flight sensor modules 330-2, 330-3, and the one or more surfaces, several times per second.

The aerial vehicle 310 includes a visual camera 330-4 or other imaging device embedded or installed within the housing or chamber defined by the fuselage 313. The visual camera 330-4 has a lens and an image sensor defining a field of view extending normal to one of the sides of the fuselage 313. Alternatively, the aerial vehicle may include any number of the visual cameras 330-4, which may be provided on the same side of the fuselage 313, or on different sides of the fuselage 313. In some embodiments, the aerial vehicle 310 may include at least one visual camera 330-4 provided on each of the sides of the fuselage 313, thereby covering three hundred sixty degrees around the aerial vehicle 310. Alternatively, in some other embodiments, one or more visual cameras 330-4 may be mounted in association with the frame 311 or in any other location on the aerial vehicle 310. The housing or chamber defined by the fuselage 313 may further include any number of other components therein, including but not limited to processors, control systems, memory components, batteries or other power sources, transceivers, circuitry, or other sensors.

As is shown in FIGS. 3A and 3B, the aerial vehicle 310 further includes the top cover 315-1 and the bottom cover 315-2, which are mounted to upper and lower edges of the frame 311, respectively. The cross-sections of the covers 315-1, 315-2 have substantially the same size and shape as the frame 311, and may be joined to the upper and lower edges of the frame 311 in any manner. The covers 315-1, 315-2 may include grill-like or grated structures or features such as bars or other extensions that are distributed within planes of the covers and inhibit objects from entering into a cavity defined by the frame 311 from above or below the aerial vehicle 310. The covers 315-1, 315-2 may be aligned or provided in any manner. For example, as is shown in FIG. 3B, each of the covers 315-1, 315-2 includes four primary bars extending radially outward from a geometric center or centroid of the covers, or from the axis along which the geometric center or centroid of the frame 311 and the geometric center or centroid of the fuselage 313 are coaligned. The four primary bars are separated by approximately ninety degrees within planes defined by the respective covers 315-1, 315-2, and thereby divide such covers 315-1, 315-2 into quadrants of substantially equal area and shape.

As is also shown in FIG. 3B, the covers 315-1, 315-2 also feature secondary bars within each of the quadrants defined by the primary bars. Although secondary bars shown in FIG. 3B are aligned at forty-five degree angles with respect to the primary bars, the secondary bars of the covers 315-1, 315-2 may be aligned at any angle with respect to the primary bars, including parallel, perpendicular, or any other angle, in accordance with the present disclosure. As is further shown in FIG. 3B, the covers 315-1, 315-2 further include holes or other openings that enable light to be transmitted above or below the aerial vehicle 310 through such holes by the time-of-flight sensor modules 330-2, 330-3, and enable reflections of such light to be received through such holes by the time-of-flight sensor modules 330-2, 330-3.

As is also shown in FIGS. 3B and 3C, the aerial vehicle 310 further includes a plurality of struts 317 that join the frame 311 and the fuselage 313. For example, as is shown in FIG. 3B, each of the struts 317 includes a proximal end joined to an external surface of one of the rounded corners of the fuselage 313 and a distal end joined to an interior surface of one of the rounded corners of the frame 311. As is shown in FIGS. 3B and 3C, each of the struts 317 is of approximately equal length, and maintains the geometric center or centroid of the frame 311 in coalignment with the geometric center or centroid of the fuselage 313.

As is further shown in FIGS. 3B and 3C, the aerial vehicle 310 further includes a plurality of propulsion motors 325 that are provided within a cavity or volume defined by interior surfaces of the frame 311, exterior surfaces of the fuselage 313, and the covers 315-1, 315-2. The propulsion motors 325 may be any type or form of motors or prime movers that are configured to rotate propellers at desired speed within the cavity or volume, thereby providing forces of lift or thrust to the aerial vehicle 310.

In accordance with embodiments of the present disclosure, the top cover 315-1 and the bottom cover 315-2 may be mounted to the upper and lower edges of the frame 311 in any manner, such as by clips, screws, bolts, snap-fit connections, or any other features. Alternatively, or additionally, the covers 315-1, 315-2 may be mounted to the fuselage 313, the struts 317, the propulsion motors 325, the time-of-flight sensor modules 330-1, 330-2, 330-3 or any other portion of the aerial vehicle 310 in any manner. Moreover, as is further shown in FIGS. 3A and 3B, the top cover 315-1 includes a substantially circular hole (or bore, or other opening) at a geometric center or centroid, thereby enabling the top cover 315-1 to be placed over and coupled to an upper edge of the frame 311, with the hole or other opening encircled around or surrounding a circumference of the time-of-flight sensor module 330-1.

As is further shown in FIGS. 3B and 3C, the propulsion motors 325 includes housings or other features that are mounted to the struts 317, at locations between the proximal ends of the struts 317 joined to the rounded corners of the fuselage 313 and the distal ends of the struts 317 joined to the rounded corners of the frame 311. The propulsion motors 325 may be any type or form of motor, including but not limited to electric, gasoline-powered or other types of motors, that are capable of generating sufficient rotational speeds of one or more propellers or other components and providing thrust and/or lift forces to the aerial vehicle 310. In some embodiments, one or more of the propulsion motors 325 may be a brushless direct current ("DC") multi-phase motor such as an outrunner brushless motor or an inrunner brushless motor. In some embodiments, one or more of the propulsion motors 325 may be a brushed DC motor.

Furthermore, the frame 311, the fuselage 313, the covers 315-1, 315-2 and the struts 317, or external portions of housings of the propulsion motors 325, or any other components of the aerial vehicle 310, may be formed as single pieces, or as two or more pieces, that may be joined together or combined to form such components. For example, as is shown in FIG. 3B, the struts 317 may be substantially hollow or open channels that are closed or defined at least in part when the bottom cover 315-2 is mated with an upper portion of the fuselage 313. As is also shown in FIG. 3B, in some embodiments, the bottom cover 315-2 forms a portion of the housings of each of the propulsion motors 325. In some other embodiments, however, the struts 317 may be closed channels that extend between the fuselage 313 and the housings of the propulsion motors 325 or the frame 311

In some embodiments, the top cover 315-1, the bottom cover 315-2 and one or more portions of the fuselage 313 may be mated together in a manner that defines a cavity or volume that includes the propulsion motors 325 and any rotating propellers therein. For example, as is shown in FIG. 3B, the top cover 315-1 and the bottom cover 315-2 may be configured for mounting to an upper portion of the fuselage 313, thereby defining the cavity or the volume within which the propulsion motors 325 may operate to rotate one or more propellers. A lower portion of the fuselage 313 including the visual camera 330-4 and any number of other components therein, e.g., processors, control systems, memory components, batteries or other power sources, transceivers, circuitry, or other sensors, may be mounted to an underside of the bottom cover 315-2. Alternatively, in some embodiments, the fuselage 313 may be formed as a single, integral unit. In such embodiments, the bottom cover 315-2 may include a substantially square hole (or bore, or other opening) at a geometric center or centroid, thereby enabling the bottom cover 315-2 to be placed over the fuselage 313, such that the fuselage 313 is inserted through the hole, prior to coupling the bottom cover 315-2 to a lower edge of the frame 311.

The unmanned aerial vehicles of the present disclosure may be formed from materials of any type or form. For example, in some embodiments, one or more of the frame 311, the fuselage 313, the covers 315-1, 315-2 and the struts 317, or external portions of housings of the propulsion motors 325, may be formed from one or more polycarbonates, or from one or more styrenes, e.g., polystyrenes or acrylonitrile butadiene styrenes (or "ABS"), or blends thereof, including but not limited to blends of polycarbonates and ABS. Alternatively, or additionally, one or more of the frame 311, the fuselage 313, the covers 315-1, 315-2 and the struts 317, or external portions of housings of the propulsion motors 325, may be formed from any other lightweight, durable materials such as plastics (e.g., thermosetting plastics such as epoxy or phenolic resins, polyurethanes or polyesters, as well as polyethylenes, polypropylenes or polyvinyl chlorides, and also recycled plastics), wood (e.g., woods with sufficient strength properties such as ash), metals (e.g., lightweight metals such as aluminum, or metals of heavier weights including alloys of steel), composites (e.g., carbon fiber), rubbers, or any other combinations of materials.

Figure 4A:
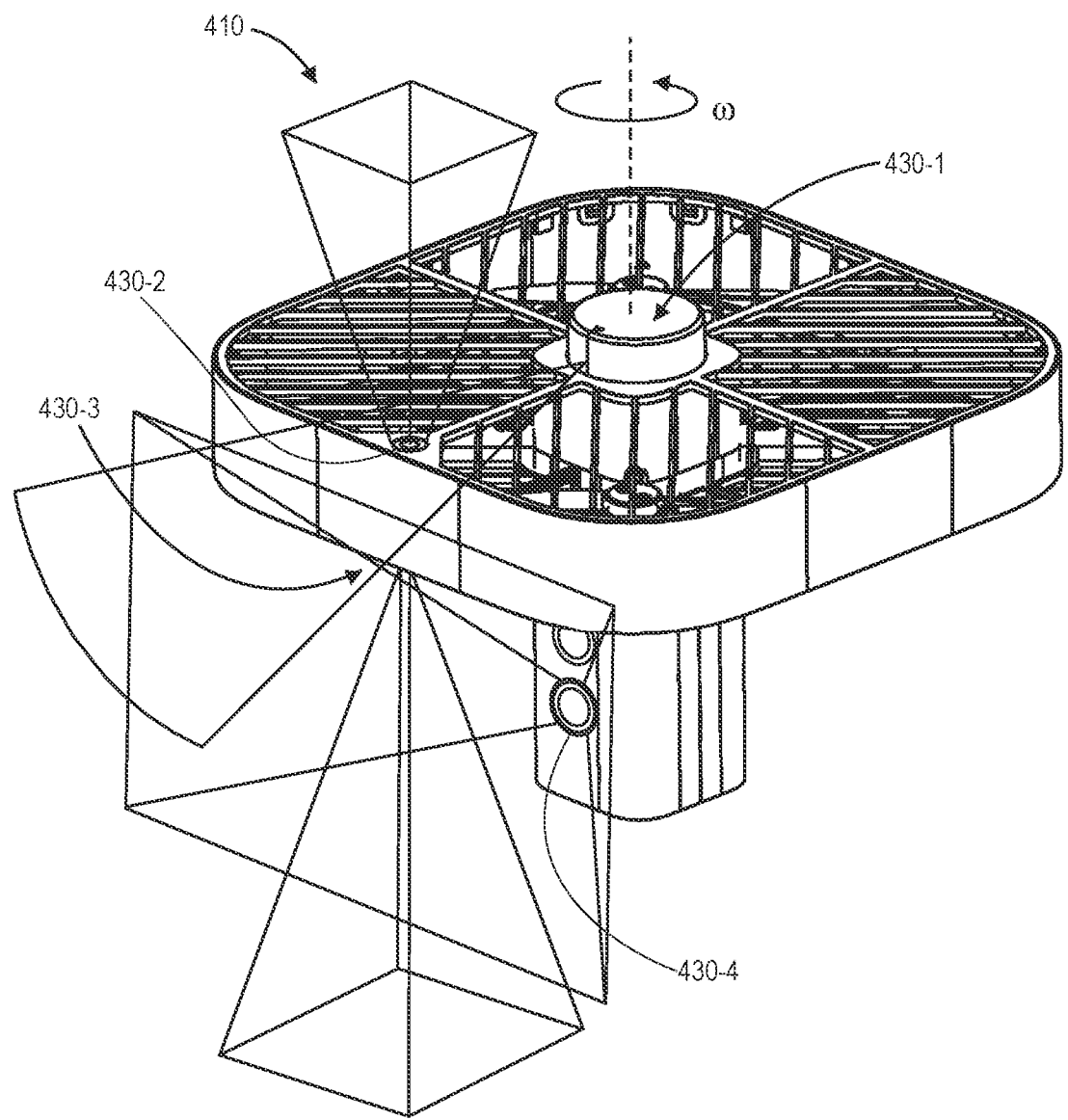
FIGS. 4A through 4C are views of aspects of one system in accordance with embodiments of the present disclosure.
Figure 4B:
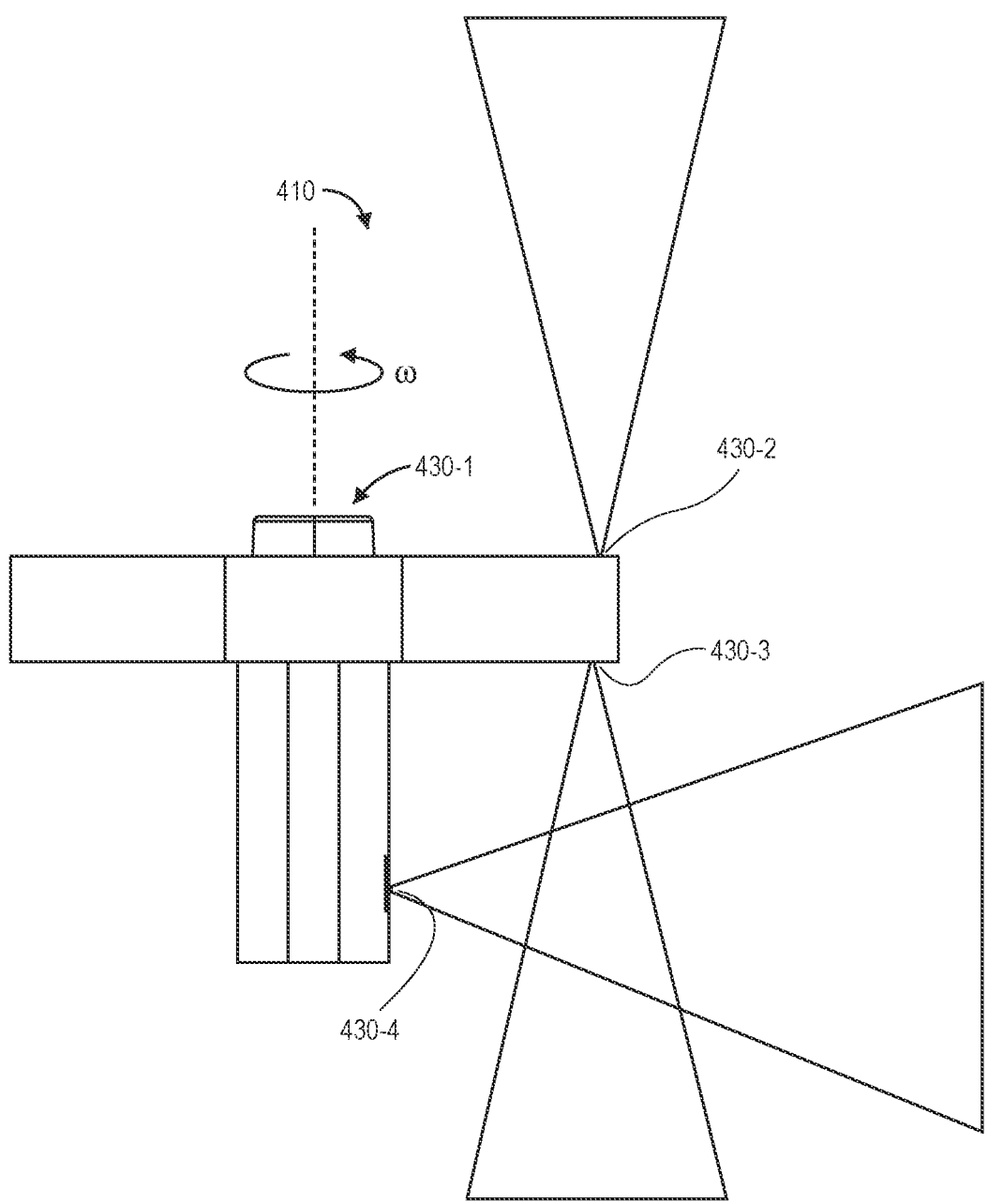
Figure 4C:
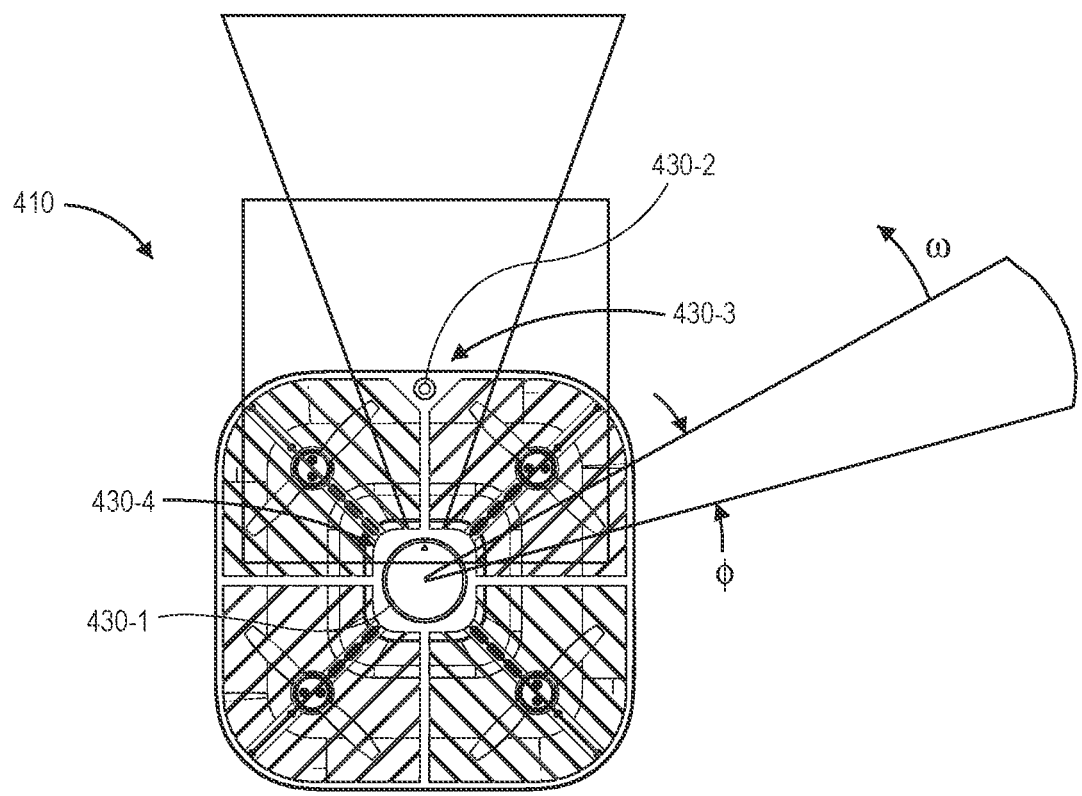

Aerial vehicles of the present disclosure may be operated in any manner to capture information or data, e.g., distances or ranges to surfaces of objects above, below or around the aerial vehicles, as well as images of their surroundings, or any other information or data. Referring to FIGS. 4A through 4C, views of aspects of one system (e.g., an aerial vehicle 410) in accordance with embodiments of the present disclosure are shown. Except where otherwise noted, reference numerals preceded by the number "4" shown in FIGS. 4A through 4C indicate components or features that are similar to components or features having reference numerals preceded by the number "3" shown in FIGS. 3A through 3C, by the number "2" shown in FIG. 2 or by the number "1" shown in FIGS. 1A through 1H.

As is shown in FIGS. 4A through 4C, the aerial vehicle 410 includes range sensors (or other imaging devices) 430-1, 430-2, 430-3, 430-4. One or more of the range sensors 430-1, 430-2, 430-3, 430-4 may be a time-of-flight sensor, a LIDAR sensor, an imaging device, or any other type or form of sensors.

The range sensor 430-1 extends above the aerial vehicle 410 and is configured to transmit light on axes or directions that may rotate at any angular velocity $\omega$, such as ten revolutions per second, relative to the fuselage 413. The range sensors 430-2, 430-3 are configured to transmit light in fixed axes or directions above and below the aerial vehicle 410, respectively. The range sensor 430-4 extends radially outward from the fuselage 413, and is configured to transmit light on a fixed axis or direction relative to the fuselage 413. In some implementations, one or more of the range sensors 430-1, 430-2, 430-3, 430-4 may be or include additional sensors or components. Alternatively, one or more of the range sensors 430-1, 430-2, 430-3, 430-4 may be replaced by other sensors or components.

In some implementations, fields of view of the range sensors 430-2, 430-3, 430-4 may define any angles with respect to their axes of orientation. For example, in some implementations, the fields of view may extend from the respective range sensors 430-2, 430-3, 430-4 at angles of twenty to thirty degrees on either side of their respective axes of orientation. The range sensors 430-2, 430-3, 430-4 may thus define image planes in the shapes of squares having sides of approximately sixteen centimeters (16 cm) each at a distance of twenty centimeters (20 cm) from the respective sensors, or sides of approximately twenty-eight centimeters (28 cm) each at a distance of thirty-five centimeters (35 cm) from the respective sensors. Alternatively, the sensors 430-2, 430-3, 430-4 may define fields of view having any other angles, and with any other dimensions, in accordance with implementations of the present disclosure.

Reflections of light captured by the range sensors 430-1, 430-2, 430-3, 430-4 may be interpreted to construct depth images, range profiles or other sets of distances between the range sensors 430-1, 430-2, 430-3, 430-4 and one or more surfaces above, below or around the aerial vehicle 410, or forward of the aerial vehicle 410, several times per second.

Thus, as is shown in FIGS. 4A through 4C, the aerial vehicle 410 may be operated to travel in any direction and on any course, at any speed, and at any altitude, and may capture imaging data, e.g., reflections of light or visual images, regarding its surroundings. In some embodiments, the aerial vehicle 410 may include any other type or form of sensors, including but not limited to Wi-Fi or Bluetooth receivers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude sensors, depth gauges, accelerometers, or sound sensors, and may capture any type or form of information or data as the aerial vehicle 410 travels on any course, at any speed, and at any altitude.

Figure 5:
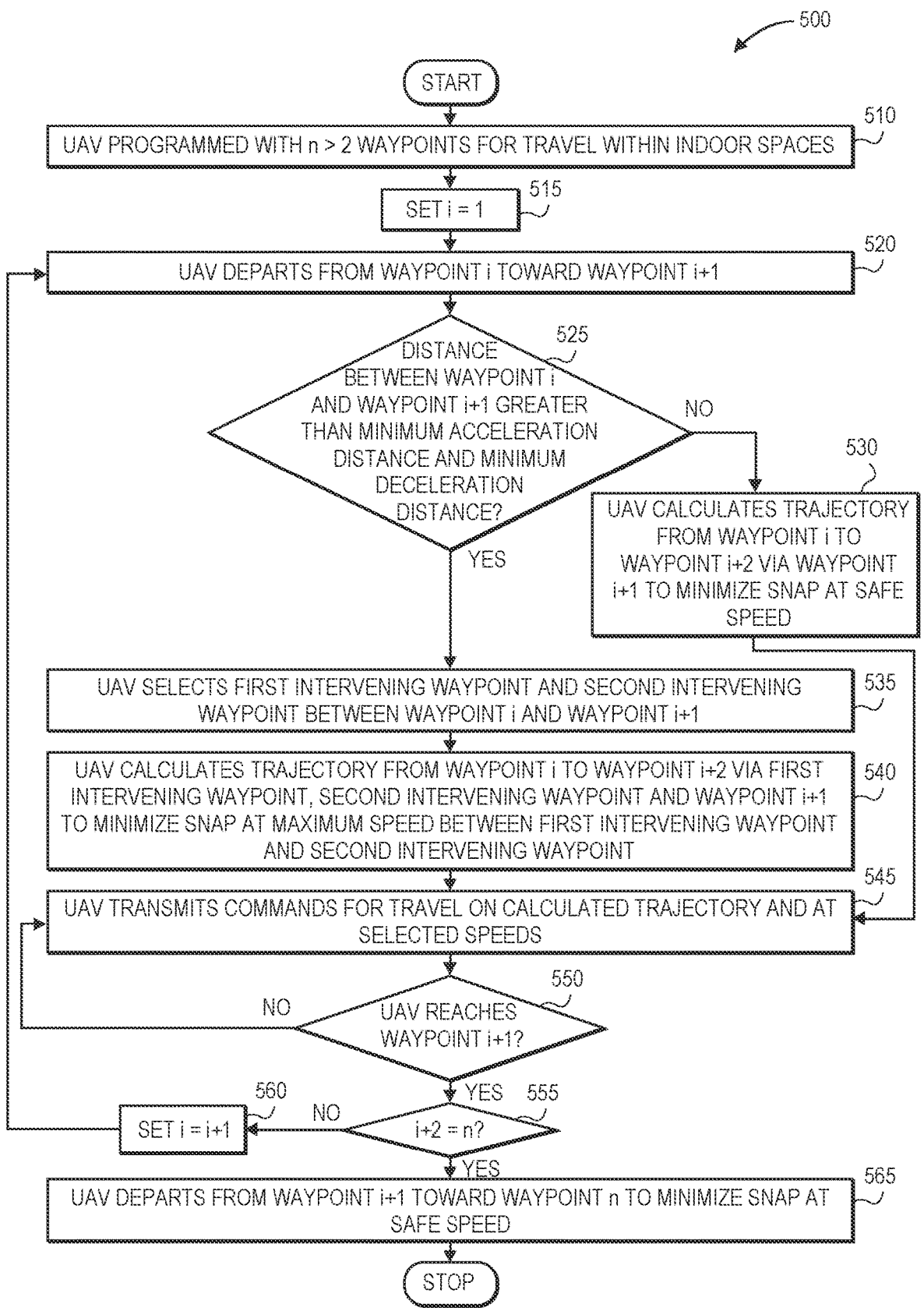
FIG. 5 is a flow chart of one process in accordance with embodiments of the present disclosure.

As is discussed above, an unmanned aerial vehicle may be programmed or configured to calculate a trajectory for traveling between various waypoints (or spatial points) within indoor spaces, and to minimize snap of the aerial vehicle along the trajectory. Referring to FIG. 5, a flow chart 500 of one process in accordance with embodiments of the present disclosure is shown.

At box 510, an unmanned aerial vehicle (or "UAV") is programmed with n waypoints for travel within one or more indoor spaces, where a value of n is greater than two. The n waypoints may be represented in any manner, e.g., by waypoint data or spatial point data including one or more sets of coordinates in three-dimensional space, and may be associated with any mission to be executed by unmanned aerial vehicles within the indoor spaces in general, or by the unmanned aerial vehicle in particular.

At box 515, a value of a step variable i is set equal to one, or i=1. At box 520, the unmanned aerial vehicle departs from waypoint i toward waypoint i+1. For example, the unmanned aerial vehicle may execute any number of commands for operating one or more motors, control surfaces or other systems to cause the unmanned aerial vehicle to depart from a position in three-dimensional space corresponding to the waypoint i, on a desired course, at a desired speed or at desired altitude, toward the waypoint i+1.

At box 525, whether a distance between the waypoint i and the waypoint i+1 is greater than a sum of a minimum acceleration distance for the unmanned aerial vehicle and a minimum deceleration distance for the unmanned aerial vehicle is determined.

If the distance between the waypoint i and the waypoint i+1 is not greater than the sum of a minimum acceleration distance for the unmanned aerial vehicle and a maximum deceleration distance, then the process advances to box 530, where the unmanned aerial vehicle calculates a trajectory from the waypoint i to the waypoint i+2 through the waypoint i+1 to minimize snap at a safe speed. Because there is insufficient distance for the unmanned aerial vehicle to safely accelerate from a velocity of zero at the waypoint i to a maximum velocity of the unmanned aerial vehicle and to decelerate from the maximum velocity to a velocity of zero at the waypoint i+1, the unmanned aerial vehicle may calculate a trajectory that calls for travel at a safe speed, or one or more safe speeds, between the waypoint i and the waypoint i+1, beginning from a velocity of zero at the waypoint i and ending at a velocity of zero at the waypoint i+1.

If the distance between the waypoint i and the waypoint i+1 is greater than the sum of a minimum acceleration distance for the unmanned aerial vehicle and a maximum deceleration distance, then the process advances to box 535, where the unmanned aerial vehicle selects a first intervening waypoint and a second intervening waypoint between the waypoint i and the waypoint i+1. In some implementations, the first intervening waypoint may be located at the minimum acceleration distance from the waypoint i, and the second intervening waypoint may be located at the minimum deceleration distance from the waypoint i+1. Therefore, the unmanned aerial vehicle may safely accelerate from a velocity of zero at the waypoint i to a maximum velocity at the first intervening waypoint, and may safely decelerate from the maximum velocity at the second intervening waypoint to a velocity of zero at the waypoint i+1, subject to any physical constraints.

At box 540, the unmanned aerial vehicle calculates a trajectory from the waypoint i to the waypoint i+2 via the first intervening waypoint, the second intervening waypoint and the waypoint i+1 to minimize snap of the unmanned aerial vehicle, at a maximum speed from the first intervening waypoint to the second intervening waypoint.

At box 545, the unmanned aerial vehicle transmits one or more commands for causing the unmanned aerial vehicle to travel on the calculated trajectory, e.g., the trajectory calculated at box 535 or the trajectory calculated at box 540, and at one or more selected speeds. In some implementations, the unmanned aerial vehicle may generate commands or instructions at any rate or frequency, e.g., ten times per second, or at ten Hertz (10 Hz), and execute such commands or instructions to operate one or more motors or control surfaces accordingly.

At box 550, whether the unmanned aerial vehicle has reached the waypoint i+1 is determined. If the unmanned aerial vehicle has yet to reach the waypoint i+1, then the process returns to box 545, where the unmanned aerial vehicle continues to transmit one or more commands for traveling on the calculated trajectory.

If the unmanned aerial vehicle has reached the waypoint i+1, then the process advances to box 555, where whether a sum of the step variable i and 2 equals the number n, or whether i+2=n. For example, if i+2=n, then only two waypoints remain for the unmanned aerial vehicle to travel within the indoor spaces. If the sum of the step variable i and 2 does not equal the number n, meaning that the unmanned aerial vehicle must travel through more than two waypoints to complete its travel within the indoor spaces, then the process advances to box 560, where the value of the step variable i is set equal to i+1, or i=i+1, before returning to box 520, where the unmanned aerial vehicle departs from waypoint i toward waypoint i+1.

If the sum of the step variable i and 2 equals the number n, then the process advances to box 565, where the unmanned aerial vehicle departs from waypoint i+1 toward waypoint n, and the process ends.

Figure 6:
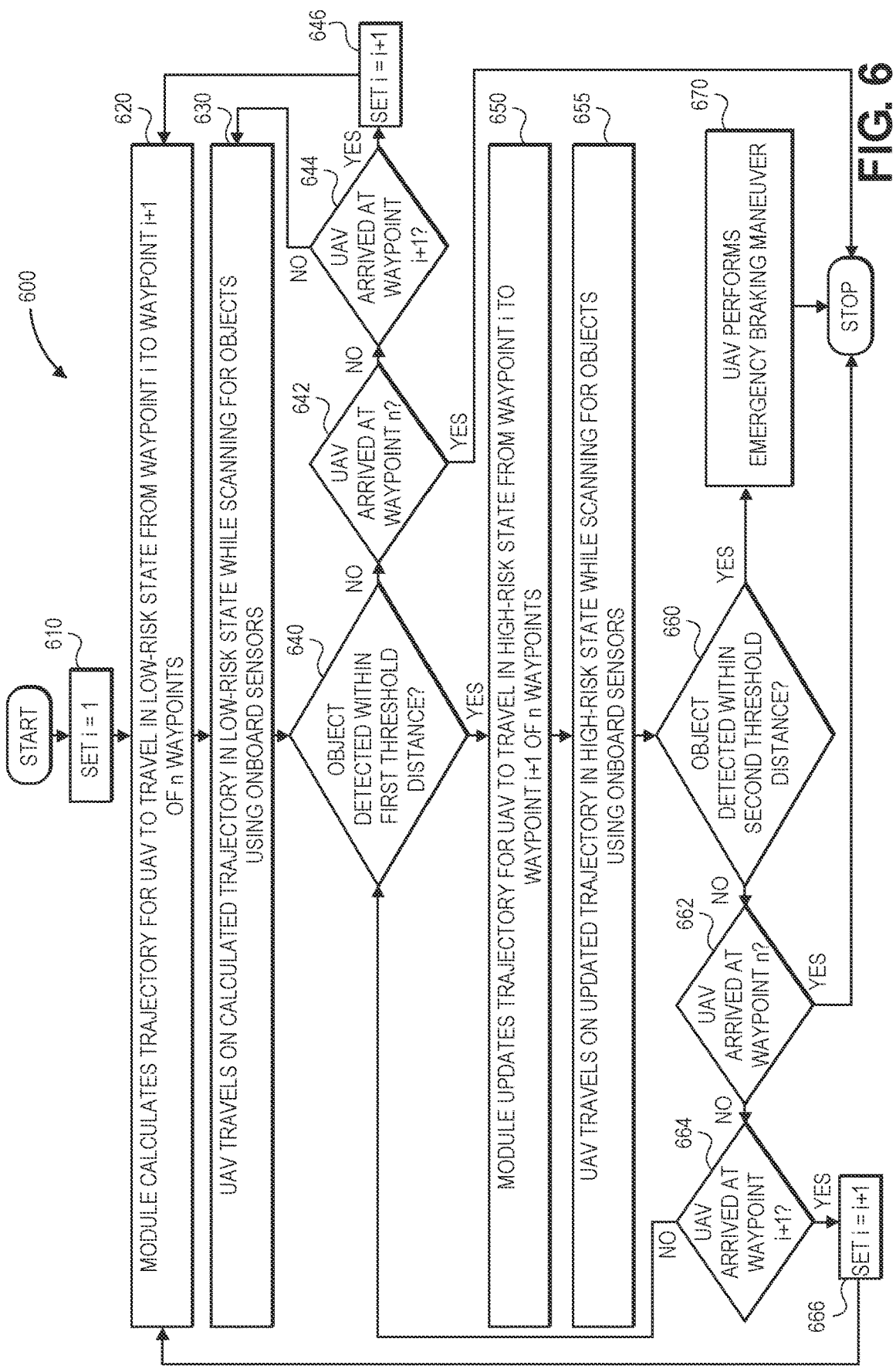
FIG. 6 is a flow chart of one process in accordance with embodiments of the present disclosure.

As is discussed above, an unmanned aerial vehicle traveling on a trajectory may modify its speed, and recalculate a trajectory as necessary, based on a level of risk that the unmanned aerial vehicle will contact one or more obstacles. Referring to FIG. 6, a flow chart 600 of one process in accordance with embodiments of the present disclosure is shown.

At box 610, a value of a step variable i is set equal to one, or i=1. At box 620, a module provided aboard an unmanned aerial vehicle (or "UAV") calculates a trajectory for the unmanned aerial vehicle to travel in a low-risk state from a waypoint i to a waypoint i+1 of n waypoints (or spatial points). The trajectory may be calculated according to one or more formulas for minimizing snap of the unmanned aerial vehicle, e.g., the drone trajectory equation of FIG. 1B, or any other formulas. For example, the module may consider a path including the n waypoints, as well as a current pose, velocity or acceleration of the unmanned aerial vehicle, or any constraints on the unmanned aerial vehicle, and may generate a trajectory passing through each of the n waypoints, or a subset of the n waypoints, along with commands to be executed at various times to cause the unmanned aerial vehicle to travel along the trajectory, which is preferably smooth and safe, and calculated in a feasible and timely manner.

The low-risk state may be one of a plurality of states of the unmanned aerial vehicle that are defined as functional limits on a safe speed of the unmanned aerial vehicle. For example, in some implementations, where sensors provided aboard the unmanned aerial vehicle (e.g., time-of-flight sensors, LIDAR sensors, cameras or other imaging devices) have not detected any obstacles within a predetermined distance or range, the unmanned aerial vehicle may be deemed to be at a low risk of coming into contact with any obstacles. In the low-risk state, the unmanned aerial vehicle may be permitted to travel at or near a maximum speed, which may be defined subject to any constraints on the unmanned aerial vehicle. In some other implementations, where the sensors detect one or more obstacles within the predetermined distance or range, the unmanned aerial vehicle may be deemed to be at a high risk of coming into contact with any of the obstacles. In the high-risk state, the unmanned aerial vehicle may then be permitted to travel at a substantially lower speed, which may be a fraction of the maximum speed, in order to provide the unmanned aerial vehicle with sufficient time to take adequate actions in response to detections of such obstacles. In the high-risk state, the unmanned aerial vehicle may also begin searching for obstacles within another predetermined distance or range, which may be shorter than the predetermined distance or range by which the one or more obstacles were originally detected. Furthermore, where the sensors determine that a collision with one or more of the obstacles is likely or imminent, the unmanned aerial vehicle may automatically execute one or more braking evolutions, in the imminent-collision state.

At box 630, the unmanned aerial vehicle travels on the trajectory calculated at box 620 in the low-risk state while scanning for objects using one or more onboard sensors. For example, the unmanned aerial vehicle may generate commands or instructions at any rate or frequency, e.g., ten times per second, or at ten Hertz (10 Hz), and execute such commands or instructions for operating motors, control surfaces or other components to cause the unmanned aerial vehicle to remain on the trajectory accordingly. Referring again to FIGS. 4A through 4C, the unmanned aerial vehicle may be equipped with one or more range sensors that are configured to calculate distances to objects above or below the unmanned aerial vehicle, forward of the unmanned aerial vehicle in a direction of travel (or on a heading), e.g., within a detection area or detection zone in a shape of a sector having an arc subtended by an angle on either side of the direction of travel, or in any direction around the unmanned aerial vehicle with respect to the direction of travel. The onboard sensors may include LIDAR sensors, time-of-flight sensors, imaging devices, or any other sensors.

At box 640, whether the unmanned aerial vehicle has detected any objects within a first threshold distance is determined. The unmanned aerial vehicle may detect an object based on points, returns or detections received from one or more time-of-flight sensors or LIDAR sensors while traveling on the trajectory calculated at box 620, and may process the points, returns or detections to determine whether such points, returns or detections are of sufficiently high confidence, or are otherwise reliable indications of an object within the first threshold distance, which may be approximately one meter (1 m), or one hundred centimeters (100 cm), or any other distance.

In some implementations, the unmanned aerial vehicle may construct a local map having a grid of a plurality of cells, and may count numbers of points, returns or detections received from one or more sensors in each of such cells during a scan by one or more of the sensors. If the points, returns or detections in a cell exceed a threshold and are both of sufficiently high confidence, and also consistent with points, returns or detections in neighboring cells, the cell may be deemed to be obstructed, or non-empty. If such points, returns or detections do not exceed the threshold, are not of sufficiently high confidence, or are inconsistent with points, returns or detections in any neighboring cells, the cell may be deemed to be unobstructed, or empty. The points, returns or detections may be processed to determine whether the unmanned aerial vehicle has detected any objects at any rate or frequency, e.g., ten hertz (10 Hz), or ten times per second, or at any other rate or frequency. Moreover, where multiple sensors capture information or data representing distances to any surrounding objects, the information or data may be time-stamped, and synchronized based on such time stamps, such that information or data captured using multiple sensors may be collectively processed to determine whether such sensors have detected any objects. Furthermore, multiple scans at different times (e.g., consecutive scans) may also be collectively processed to determine whether such sensors have detected any objects.

In some implementations, a range sensor (e.g., a LIDAR sensor, or a time-of-flight sensor) may continuously or repeatedly estimate a position of the unmanned aerial vehicle, and establish a map (e.g., an environment map) of an indoor space in which the unmanned aerial vehicle travels. For example, where a pitch or a roll of the unmanned aerial vehicle is non-zero, polar coordinates representing returns received by a range sensor may be converted, as necessary, to Cartesian coordinates in a horizontal plane using an estimated pitch or roll angle, which may be determined by one or more onboard sensors (e.g., inertial measurement unit sensors). Distances from positions of the unmanned aerial vehicle to objects may be calculated based on such returns, as necessary, and a two-dimensional local map of an environment that includes the distances from various positions of the unmanned aerial vehicle may be constructed accordingly.

If the unmanned aerial vehicle does not detect any objects within the first threshold distance, then the process advances to box 642, where whether the unmanned aerial vehicle has arrived at the final waypoint, viz., waypoint n, is determined. If the unmanned aerial vehicle has arrived at the final waypoint, then the process ends. If the unmanned aerial vehicle has not arrived at the final waypoint, then the process advances to box 644, where whether the unmanned aerial vehicle has arrived at the waypoint i+1, viz., a next waypoint, is determined. If the unmanned aerial vehicle has not arrived at the waypoint i+1, then the process returns to box 630, where the unmanned aerial vehicle executes one or more commands for causing the unmanned aerial vehicle to travel on the trajectory calculated at box 620 in the low-risk state, and to scan for objects using one or more onboard sensors. If the unmanned aerial vehicle has arrived at the waypoint i+1, then the process advances to box 646, where the value of the step variable i is incremented by one, or is set to equal i+1, before returning to box 620, where the module calculates a trajectory for the unmanned aerial vehicle to travel in a low-risk state from the waypoint i to a next waypoint of the n waypoints, viz., waypoint i+1.

If the unmanned aerial vehicle detects one or more objects within the first threshold distance, then the process advances to box 650, where the module updates the trajectory for the unmanned aerial vehicle to travel in a high-risk state to the waypoint i+1. For example, the high-risk state may have a maximum velocity that is significantly less than the maximum velocity of the unmanned aerial vehicle subject to the physical constraints, e.g., a fraction of the maximum speed. In some implementations, where the unmanned aerial vehicle has a maximum speed of one meter per second (1 m/s) in the low-risk state, the unmanned aerial vehicle may have a maximum speed of approximately 0.3 to 0.5 meters per second (0.3-0.5 m/s) in the high-risk state. Alternatively, the unmanned aerial vehicle may be programmed or configured with any other maximum speeds in the low-risk state, the high-risk state, or any other state.

Moreover, where the maximum speed available to the unmanned aerial vehicle is reduced upon transitioning to the high-risk state, a new trajectory for traveling through the waypoint i+1 may be calculated accordingly.

At box 655, the unmanned aerial vehicle travels on the updated trajectory calculated at box 650 and in the high-risk state while scanning for one or more objects using the onboard sensors.

At box 660, whether the unmanned aerial vehicle has detected any objects within a second threshold distance, which may be shorter than the first threshold distance, is determined. For example, where the first threshold distance is approximately one meter (1 m), or one hundred centimeters (100 cm), the second threshold distance may be approximately 0.3 meters (0.3 m), or thirty centimeters (30 cm). Alternatively, the first threshold distance and the second threshold distance may have any lengths in accordance with implementations of the present disclosure.

In some implementations, the unmanned aerial vehicle may compensate for any motion of the unmanned aerial vehicle between a detection of an object within the first threshold distance at box 640, and any subsequent scans to determine whether any objects are present within the second threshold distance at box 655. For example, a latency distance may be calculated based on a speed of the unmanned aerial vehicle, a position of the unmanned aerial vehicle at a time when the object was detected within the first threshold distance at box 640, and a time at which a scan to determine whether any objects are present within the second threshold distance at box 655 is conducted. A position of the unmanned aerial vehicle in the future may be calculated or estimated based on the latency distance.

If the unmanned aerial vehicle does not detect any objects within the second threshold distance, then the process advances to box 662, where whether the unmanned aerial vehicle has arrived at the final waypoint, viz., waypoint n, is determined. If the unmanned aerial vehicle has arrived at the final waypoint, then the process ends. If the unmanned aerial vehicle has not arrived at the final waypoint, then the process advances to box 664, where whether the unmanned aerial vehicle has arrived at the waypoint i+1, viz., a next waypoint, is determined. If the unmanned aerial vehicle has not arrived at the waypoint i+1, then the process returns to box 640, where whether the unmanned aerial vehicle has detected any objects within the first threshold distance is determined. If the unmanned aerial vehicle has arrived at the waypoint i+1, then the process advances to box 666, where the value of the step variable i is incremented by one, or is set to equal i+1, before returning to box 620, where the module calculates a trajectory for the unmanned aerial vehicle to travel in a low-risk state from the waypoint i to a next waypoint of the n waypoints, viz., waypoint i+1.

If the unmanned aerial vehicle detects one or more objects within the second threshold distance, thereby indicating that a collision with one or more obstacles is likely or imminent, then the process advances to box 670, where the unmanned aerial vehicle executes commands for performing an emergency braking maneuver, and the process ends. For example, in some implementations, the unmanned aerial vehicle may insert an intervening waypoint immediately behind the unmanned aerial vehicle and calculate a new trajectory that calls for traveling through the intervening waypoint. Alternatively, the unmanned aerial vehicle may be programmed or configured with any other commands or instructions for responding to a detection of an object within the second threshold distance, e.g., returning to the waypoint i−1, changing course to turn away from the object, or taking any other actions.

Figure 7A:
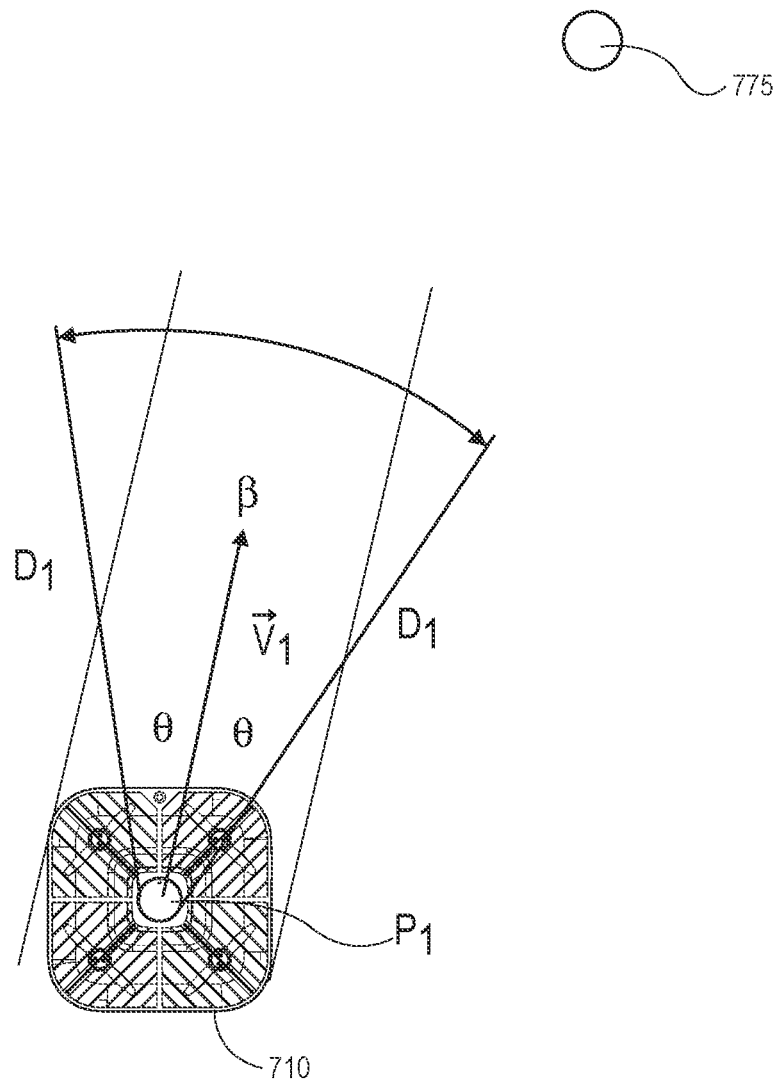
FIGS. 7A through 7C are views of aspects of one system in accordance with embodiments of the present disclosure.
Figure 7B:
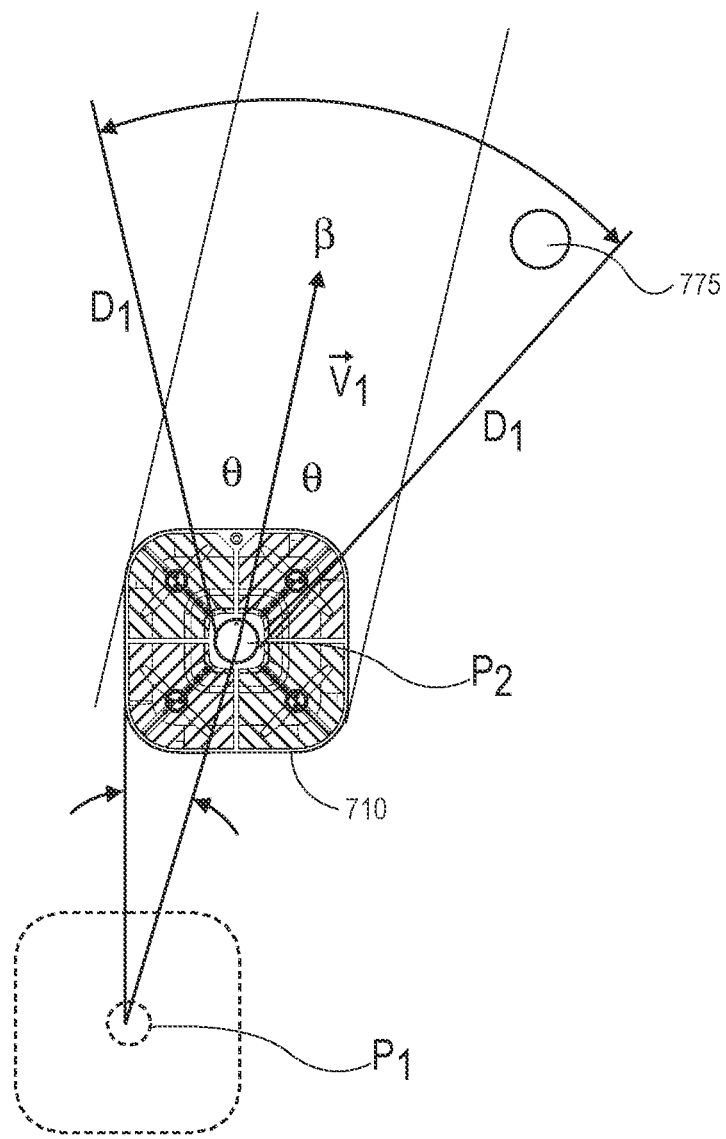
Figure 7C:
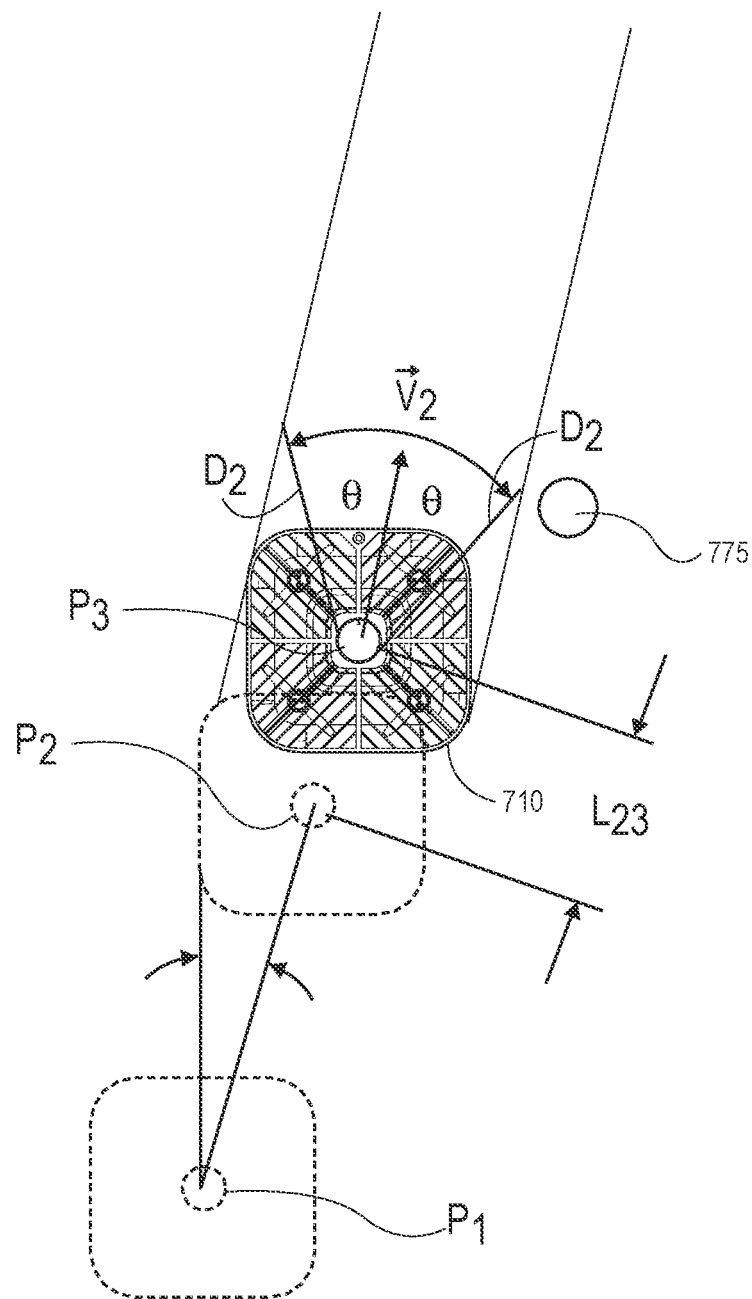

Referring to FIGS. 7A through 7C, views of aspects of one system in accordance with embodiments of the present disclosure are shown. Except where otherwise noted, reference numerals preceded by the number "7" shown in FIGS. 7A through 7C indicate components or features that are similar to components or features having reference numerals preceded by the number "4" shown in FIGS. 4A through 4C, by the number "3" shown in FIGS. 3A through 3C, by the number "2" shown in FIG. 2 or by the number "1" shown in FIGS. 1A through 1H.

As is shown in FIG. 7A, an unmanned aerial vehicle 710 is located at a position $P_1$, and is traveling in a direction β and at a speed $V_1$. The position $P_1$, the direction β or the speed $V_1$ may be determined in any manner, such as using one or more localization or mapping modules provided aboard the unmanned aerial vehicle 710.

The unmanned aerial vehicle 710 includes one or more range sensors, e.g., time-of-flight sensors, LIDAR sensors, imaging devices, or others. The unmanned aerial vehicle 710 may capture information or data using such sensors, and continuously or repeatedly determine whether any objects are within a predetermined range (or distance) $D_1$ forward of the unmanned aerial vehicle 710, e.g., within a sector having an arc subtended by an angle θ on either side of the direction β, e.g., a detection area or a detection zone. The angle θ may have any value and may be selected on any basis, e.g., a field of view of any of such sensors. In some implementations, the angle θ may have a value of approximately twenty to thirty degrees (25° to 30°). In some implementations, a value of the angle θ may be defined based on the predetermined range $D_1$, as well as a maximum width of the unmanned aerial vehicle 710 subject to the direction β, in order to ensure that any objects forward of the unmanned aerial vehicle 710 that may come into contact with the unmanned aerial vehicle 710 while traveling in the direction β and at the speed $V_1$ are detected by such sensors. As is shown in FIG. 7A, an obstacle 775 located forward of the unmanned aerial vehicle 710 and beyond the predetermined range $D_1$ is not detected by any of such sensors, with the unmanned aerial vehicle 710 in the position $P_1$.

As is shown in FIG. 7B, the unmanned aerial vehicle 710 is located at a position $P_2$, and continues to travel in the direction β and at the speed $V_1$. As is further shown in FIG. 7B, the unmanned aerial vehicle 710 detects the obstacle 775 within the predetermined range $D_1$ forward of the unmanned aerial vehicle 710, e.g., within a sector having an arc defined by the angle θ on either side of the direction β, such as a detection area or a detection zone, using one or more of the sensors. The obstacle 775 may be identified upon determining that a portion of a field of view of such sensors is obstructed in any number of consecutive scans, e.g., two or more, with a sufficiently high degree of confidence, or on any other basis. A location of the obstacle 775 may be estimated or determined based on the position $P_2$ and the detection of the obstacle 775, or in any other manner.

As is shown in FIG. 7C, upon determining that the obstacle 775 is detected within the predetermined range $D_1$, the unmanned aerial vehicle 710 may immediately reduce its speed to a speed $V_2$, e.g., by executing one or more braking maneuvers, and begin capturing information or data using the one or more range sensors to continuously or repeatedly determine whether any objects are within a predetermined range (or distance) $D_2$ forward of the unmanned aerial vehicle 710, e.g., within a sector having an arc defined by the angle θ on either side of the direction β, such as a detection area or a detection zone. The predetermined range $D_2$ may be substantially shorter than the predetermined range $D_1$ by which the obstacle 775 was detected, as shown in FIG. 7B, e.g., half of the predetermined range $D_1$, or another fraction of the predetermined range $D_1$. For example, where the predetermined range $D_1$ is approximately one meter (1 m), or one hundred centimeters (100 cm), the predetermined range $D_2$ may be approximately 0.3 to 0.5 meters (0.3-0.5 m), or thirty to fifty centimeters (30-50 cm).

As is shown in FIG. 7C, a position $P_3$ of the unmanned aerial vehicle 710, or an actual distance from the unmanned aerial vehicle 710 to the obstacle 775, may be estimated or determined by calculating a latency distance, or $L_{23}$, beyond the position $P_2$, e.g., based on a product of the speed $V_2$ and a latency time associated with one or more sensors or processors used to determine positions of the unmanned aerial vehicle 710, e.g., a localization and mapping module, or to process sensor readings regarding ranges to objects. The position $P_3$ may be a future position calculated or estimated to be located at the latency distance $L_{23}$ forward of the position $P_2$, and a distance or range to the obstacle 775 may be calculated with respect to the position $P_3$. Upon determining that the obstacle 775 is not within the distance $D_2$, or is not forward of the unmanned aerial vehicle 710, or that the unmanned aerial vehicle 710 is otherwise not at risk of contacting the obstacle 775, the unmanned aerial vehicle 710 may change its speed accordingly, such as by executing one or more commands to travel at the speed $V_1$, or at any other speed. In some implementations, the unmanned aerial vehicle 710 may delay an acceleration from the speed $V_2$ to the speed $V_1$ by a predetermined period of time, e.g., approximately three seconds, to ensure that the determination that no objects have been detected is accurate and not anomalous.

Figure 8:
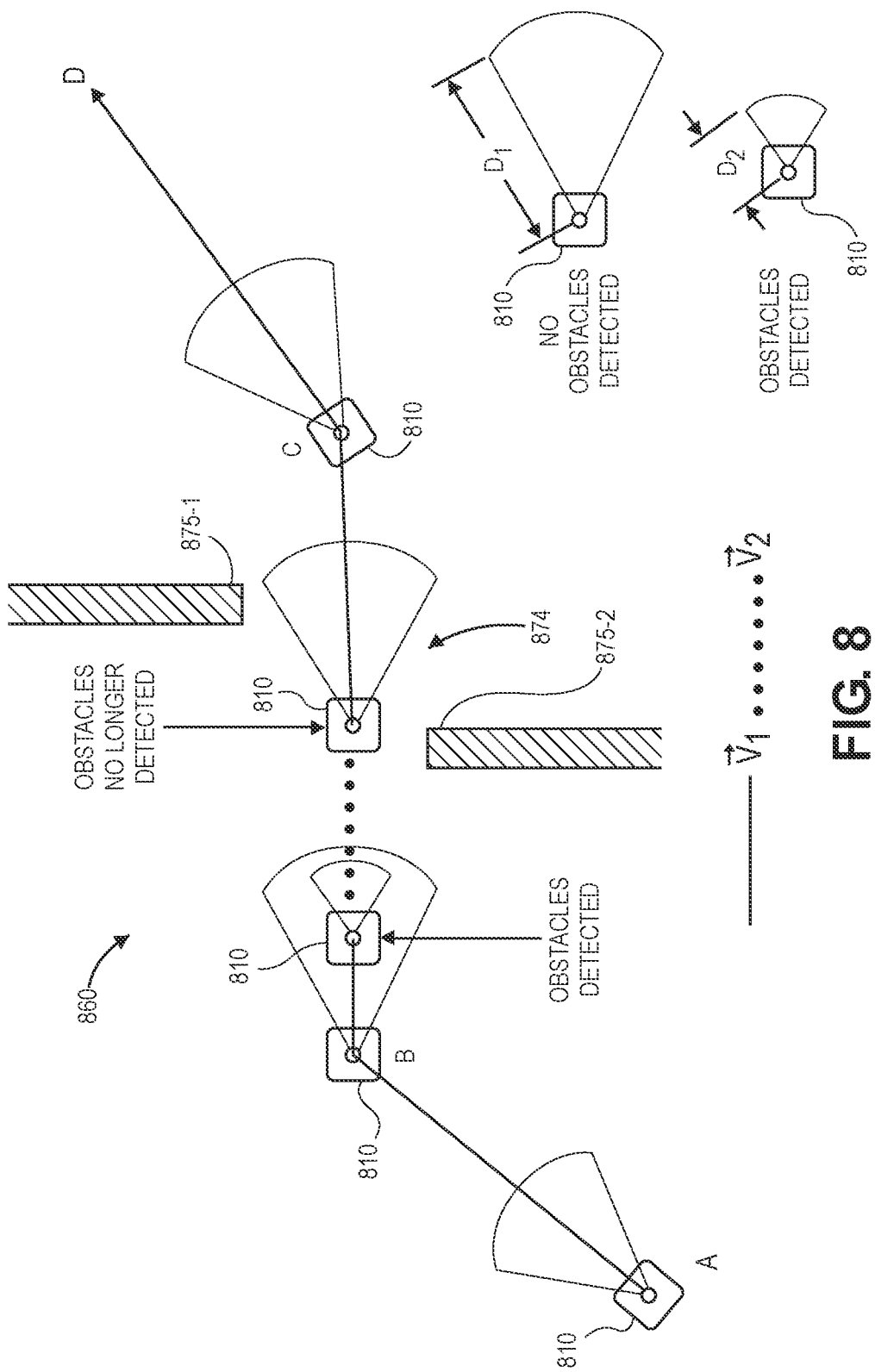
FIG. 8 is a view of aspects of one system in accordance with embodiments of the present disclosure.

Referring to FIG. 8, views of aspects of one system in accordance with embodiments of the present disclosure are shown. Except where otherwise noted, reference numerals preceded by the number "8" shown in FIG. 8 indicate components or features that are similar to components or features having reference numerals preceded by the number "7" shown in FIGS. 7A through 7C, by the number "4" shown in FIGS. 4A through 4C, by the number "3" shown in FIGS. 3A through 3C, by the number "2" shown in FIG. 2 or by the number "1" shown in FIGS. 1A through 1H.

As is shown in FIG. 8, an unmanned aerial vehicle 810 is traveling within a facility 860 on a trajectory defined based on a path including waypoints (or spatial points) A, B, C and D. A segment of the path extending between the waypoint B and the waypoint C passes through an opening 874 of the facility 860, e.g., a door, a portal or another opening, such as a gap between two or more walls or other structural features 875-1, 875-2 of the facility 860.

The unmanned aerial vehicle 810 is outfitted or equipped with one or more range sensors for continuously or repeatedly determining whether any obstacles are present forward of the unmanned aerial vehicle 810, or otherwise in a direction of travel of the unmanned aerial vehicle 810, e.g., within a predetermined range or distance, and within a sector having an arc defined by an angle on either side of the direction of travel, such as a detection area or a detection zone, as well as whether any of such objects poses a risk of collision to the unmanned aerial vehicle 810. The predetermined range or distance or the angle may have any dimension, and may be selected on any basis, such as an operating range of one or more sensors, a minimum distance required for the unmanned aerial vehicle to decelerate or change course upon detecting an obstacle, or any other factors.

In some implementations, a speed of the unmanned aerial vehicle 810 may be selected based on a state of the unmanned aerial vehicle 810, or a level of risk to the unmanned aerial vehicle 810. For example, where the unmanned aerial vehicle 810 does not detect any obstacles within the predetermined range or distance and within the sector, the unmanned aerial vehicle 810 may be deemed to be in a low-risk state, and may travel at a maximum speed $V_1$ between two or more waypoints.

As is shown in FIG. 8, however, when the unmanned aerial vehicle 810 detects an edge or a side of one of the structural features 875-1, 875-2 defining the opening 874 within the predetermined range or distance and within the sector, the unmanned aerial vehicle 810 may execute one or more braking maneuvers to slow to a speed $V_2$ that may be a fraction of the maximum speed $V_1$ and may be selected on any basis. Alternatively, or additionally, a new trajectory may be calculated for the unmanned aerial vehicle 810, with a speed of the unmanned aerial vehicle 810 being limited to the speed $V_2$ on the new trajectory.

While traveling at the speed $V_2$, the unmanned aerial vehicle 810 may continuously or repeatedly monitor for any obstacles that may be present forward of the unmanned aerial vehicle 810, or in a direction of travel of the unmanned aerial vehicle 810, at a predetermined range or distance that may be smaller than the predetermined range or distance at which the edge or the side of either of the structural features 875-1, 875-2 defining the opening 874 was originally detected. The predetermined range or distance or an angle defining an arc of a sector on either side of a direction of travel of the unmanned aerial vehicle may be selected on any basis, e.g., a minimum distance required for the unmanned aerial vehicle to decelerate to a velocity of zero or execute an emergency braking maneuver, or any other factors. The unmanned aerial vehicle 810 may continue to travel at the speed $V_2$ until no obstacles are detected forward of the unmanned aerial vehicle 810, or otherwise within a direction of travel of the unmanned aerial vehicle 810, or until any such obstacles are determined to not pose a risk of collision to the unmanned aerial vehicle 810.

Subsequently, upon determining that the unmanned aerial vehicle 810 is no longer at risk of colliding with edges or sides of the opening 874 or any other obstacles, the unmanned aerial vehicle 810 may calculate a new trajectory, limited only by the maximum speed $V_1$, and may travel along the new trajectory through the waypoint C to the waypoint D.

Referring to FIGS. 9A through 9G, views of aspects of one system in accordance with embodiments of the present disclosure are shown. Except where otherwise noted, reference numerals preceded by the number "9" shown in FIGS. 9A through 9G indicate components or features that are similar to components or features having reference numerals preceded by the number "8" shown in FIG. 8, by the number "7" shown in FIGS. 7A through 7C, by the number "4" shown in FIGS. 4A through 4C, by the number "3" shown in FIGS. 3A through 3C, by the number "2" shown in FIG. 2 or by the number "1" shown in FIGS. 1A through 1H.

Figure 9A:
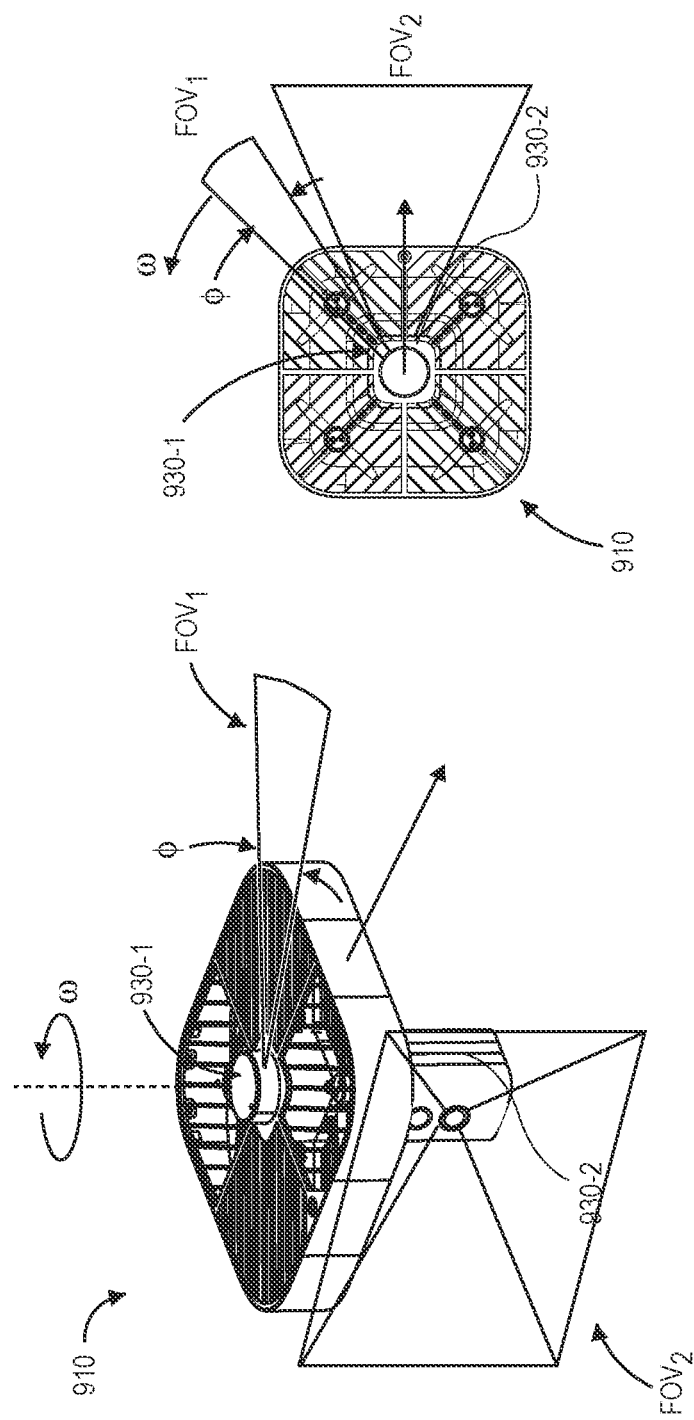

As is shown in FIG. 9A, an unmanned aerial vehicle 910 is equipped with a pair of range sensors 930-1, 930-2. As is further shown in FIG. 9A, the range sensor 930-1 may be a LIDAR sensor that extends above the aerial vehicle 910 and is configured to transmit light within a planar field of view $FOV_1$ having a fixed angular width b that may rotate at any angular velocity ω relative to one or more principal axes of the unmanned aerial vehicle 910.

In some implementations, the range sensor 930-1 may be a LIDAR sensor that is configured to calculate distances to objects at an angular range of three hundred sixty degrees about the range sensor 930-1, and at any maximum measuring radius, e.g., twelve meters (12 m) or more. For example, in some implementations, the range sensor 930-1 may be configured to transmit light at any measurement frequency, e.g., up to 4,500 Hertz (or 4,500 measurements per second). The transmitted light may be infrared light, or light at any other wavelength or frequency. In some implementations, the range sensor 930-1 may transmit light in a single direction, and capture or receive reflections of the light from one or more objects. A difference between a time at which light is transmitted, and a time at which reflections of the light are received, is commonly called a "time-of-flight," and may be used with the speed of light to calculate distances to objects from which the light was reflected. In some implementations, the range sensor 930-1 may be configured to emit light at a wavelength of approximately 905 nanometers, e.g., within an infrared band, and at a power of approximately twenty-five milliwatts (25 mW).

The range sensor 930-1 may further combine distances calculated based on times-of-flight with information regarding angles at which the light was emitted and received to generate a point cloud or another representation of positions of objects, which may be stored by the unmanned aerial vehicle 910 and processed or transmitted to one or more external devices or systems for processing. The range sensor 930-1 may also include one or more motor drivers or other components for controlling a start, a stop or a speed of a motor, and may generate and transmit packets of data including any information regarding transmissions or returns, e.g., rotational speeds, start or end angles, time stamps, or other related data.

As is also shown in FIG. 9A, the range sensor 930-2 may be a time-of-flight sensor provided in association with a surface of a fuselage or another component of the unmanned aerial vehicle 910, and is configured to transmit light within a substantially pyramidal field of view $FOV_2$ having a fixed axis or direction relative to the unmanned aerial vehicle 910. Alternatively, either or both of the range sensors 930-1, 930-2 may be a time-of-flight sensor, a LIDAR sensor, an imaging device, or any other type or form of sensor, and the unmanned aerial vehicle 910 may include any number of other sensors (not shown).

As is shown in FIG. 9B, the unmanned aerial vehicle 910 is traveling within a facility 960 such as a home, an office, or any other facility, on a course, at an altitude and at a speed in accordance with a trajectory. For example, a trajectory for the unmanned aerial vehicle 910 may be calculated in any manner, such as according to an equation or formula that minimizes snap of the unmanned aerial vehicle, e.g., the drone trajectory equation of FIG. 1B, or any other equation or formula. In some implementations, the unmanned aerial vehicle 910 may operate at or near a maximum speed, where possible, such as by inserting intervening waypoints between pairs of waypoints, and programming the unmanned aerial vehicle to operate at the maximum speed between the intervening waypoints, or on any other basis.

The unmanned aerial vehicle 910 may be configured to capture information or data using the range sensors 930-1, 930-2 while traveling within the facility 960. As is further shown in FIG. 9B, the facility 960 may include any number of structural features or internal components for accommodating humans, machines or other entities within the facility 960. Additionally, a temporary obstacle 975 (e.g., a ladder) is located within the facility 960 and forward of the unmanned aerial vehicle 910, e.g., within a direction of travel of the unmanned aerial vehicle 910.

As is further shown in FIG. 9B, the unmanned aerial vehicle 910 is programmed with a navigation map (or an environment map) 965, which may include locations or positions of surfaces such as ceilings, floors, walls or other structural features, as well as any internal components such as furniture or cabinets.

Figure 9C:
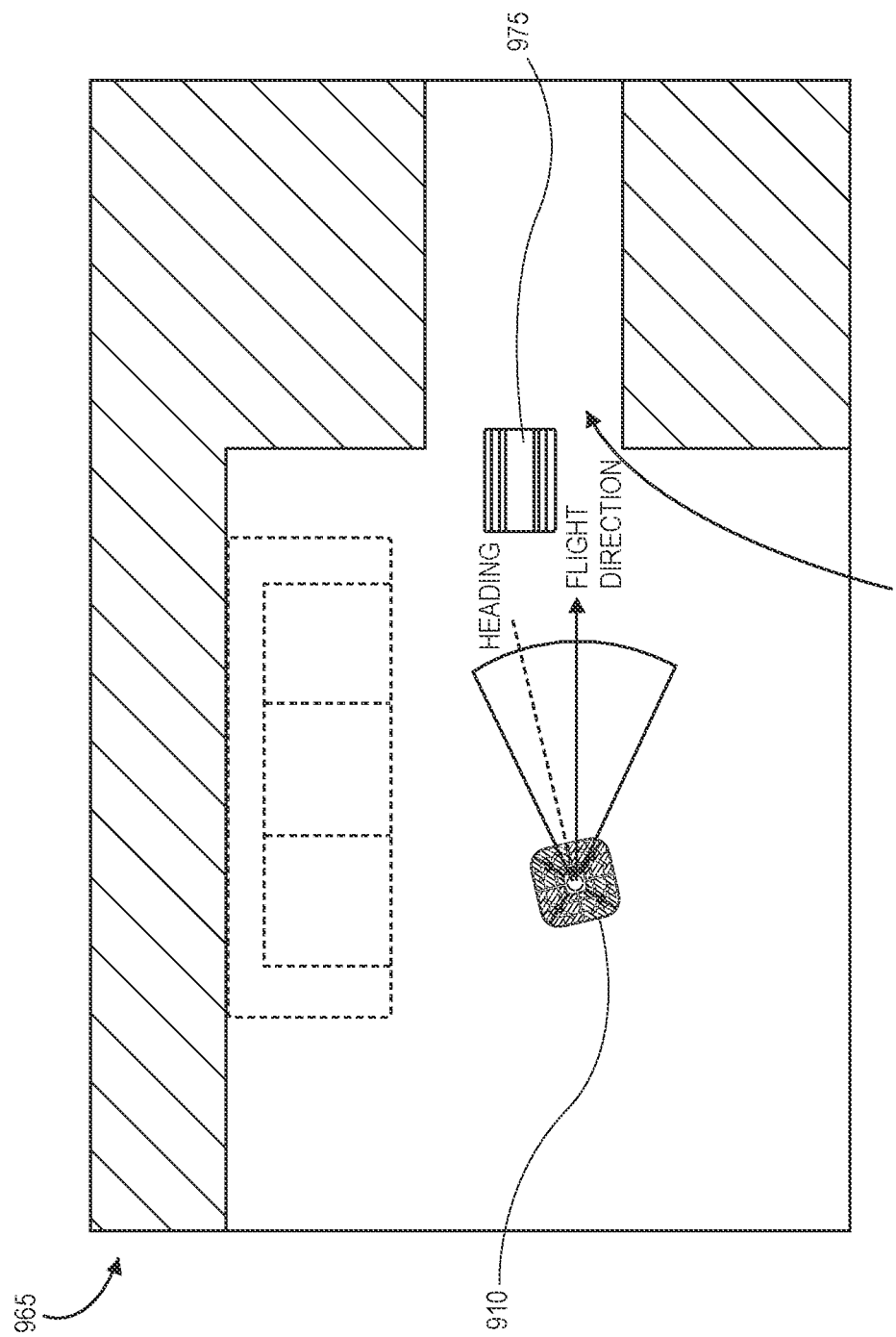

As is shown in FIG. 9C, the unmanned aerial vehicle 910 is shown with respect to the navigation map 965. In some implementations, a pose (e.g., a position and/or an orientation) of the unmanned aerial vehicle 910 may be determined by one or more position sensors, which may include a GPS sensor or any other positioning system. For example, as is shown in FIG. 9C, a heading of the unmanned aerial vehicle 910 may be determined with respect to a direction of travel of the unmanned aerial vehicle 910.

In some other implementations, a position or an orientation of the unmanned aerial vehicle 910 may be determined based on information or data captured by one or more other sensors, e.g., the range sensors 930-1, 930-2, which may detect one or more objects having known positions within the facility 960, e.g., according to a local or global coordinate system, and may determine a position or an orientation of the unmanned aerial vehicle 910 with respect to such objects.

Figure 9D:
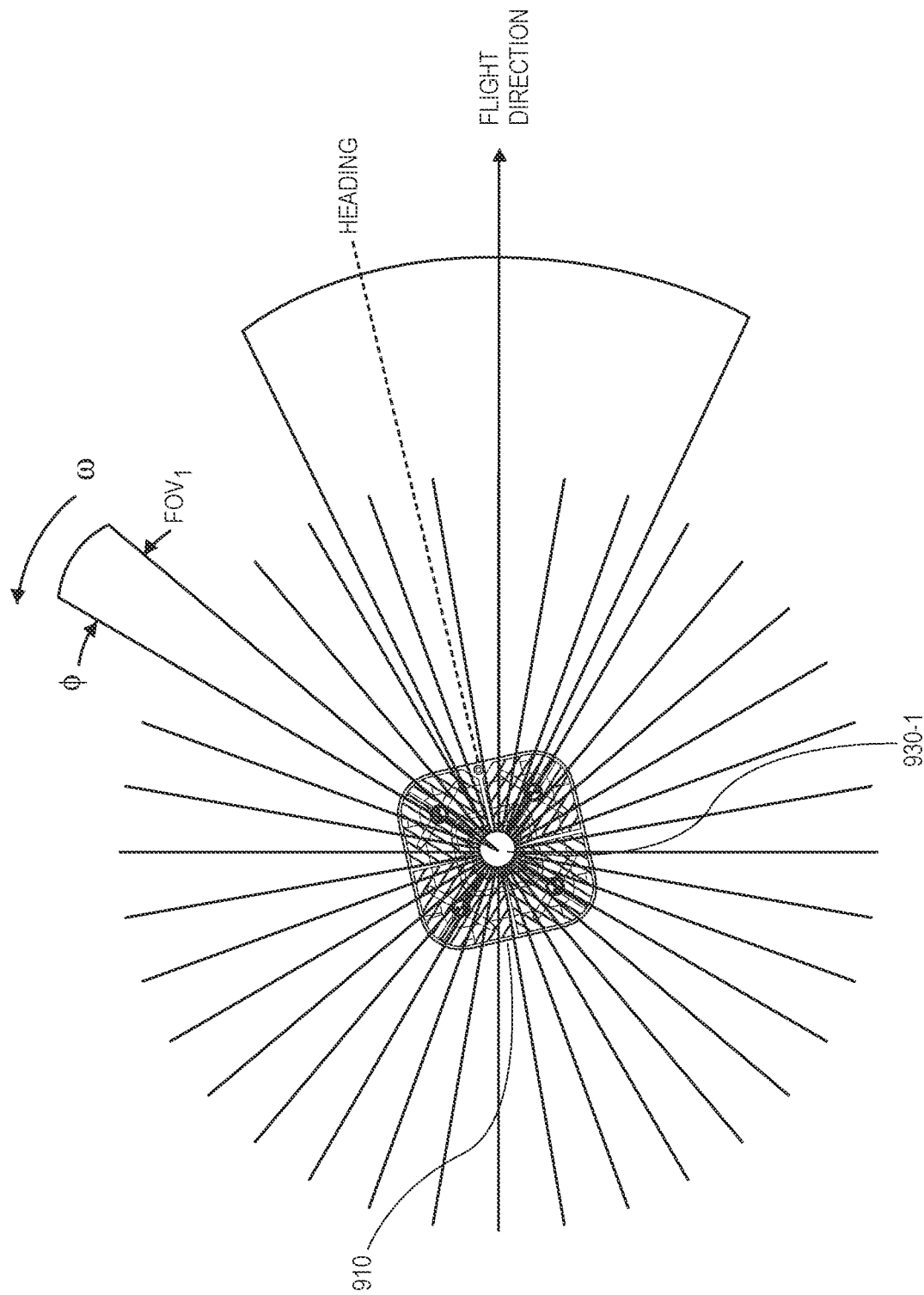

The unmanned aerial vehicle 910 may capture information or data using such sensors, e.g., the range sensors 930-1, 930-2, and determine whether any objects are within a detection area or a detection zone defined by a predetermined range or distance forward of the unmanned aerial vehicle 910, and within an arc or sector that has a radius of the predetermined range or distance and subtends an angle on either side of the flight direction of approximately twenty to thirty degrees, or any other angle. For example, as is shown in FIG. 9D, the range sensor 930-1 may transmit and receive light within the planar field of view $FOV_1$ having the fixed angular width $\phi$, which may rotate at any angular velocity $\omega$ relative to one or more principal axes, e.g., a yaw axis, of the unmanned aerial vehicle 910.

The range sensor 930-1 may be configured to transmit and receive light at regular intervals about the one or more principal axes. For example, as is shown in FIG. 9D, in some implementations, the fixed angular width $\phi$ of the field of view $FOV_1$ may be approximately five degrees, and the range sensor 930-1 may transmit and receive light at seventy-two different intervals about the one or more principal axes, and determine whether any objects are present forward of the unmanned aerial vehicle 910 and within a predetermined range D based on any reflections of the transmitted light received by the range sensor 930-1. Upon receiving data regarding one or more returns of reflections of the transmitted light, the range sensor 930-1 may determine an angle from the unmanned aerial vehicle 910 to an object (e.g., an obstacle), based on the angular interval by which the returns of the reflected light were received, as well as a distance to the object, based on an elapsed time between the transmission and the return, or in any other manner.

In some implementations, the predetermined range D may be approximately one meter (1 m), or one hundred centimeters (100 cm), where no objects have been detected forward of the unmanned aerial vehicle 910, or approximately 0.3 to 0.5 meters (0.3-0.5 m), or thirty to fifty centimeters (30-50 cm), where one or more objects have been detected forward of the unmanned aerial vehicle 910. Alternatively, the predetermined range D may be defined by one or more limitations of the range sensor 930-1.

Figure 9E:
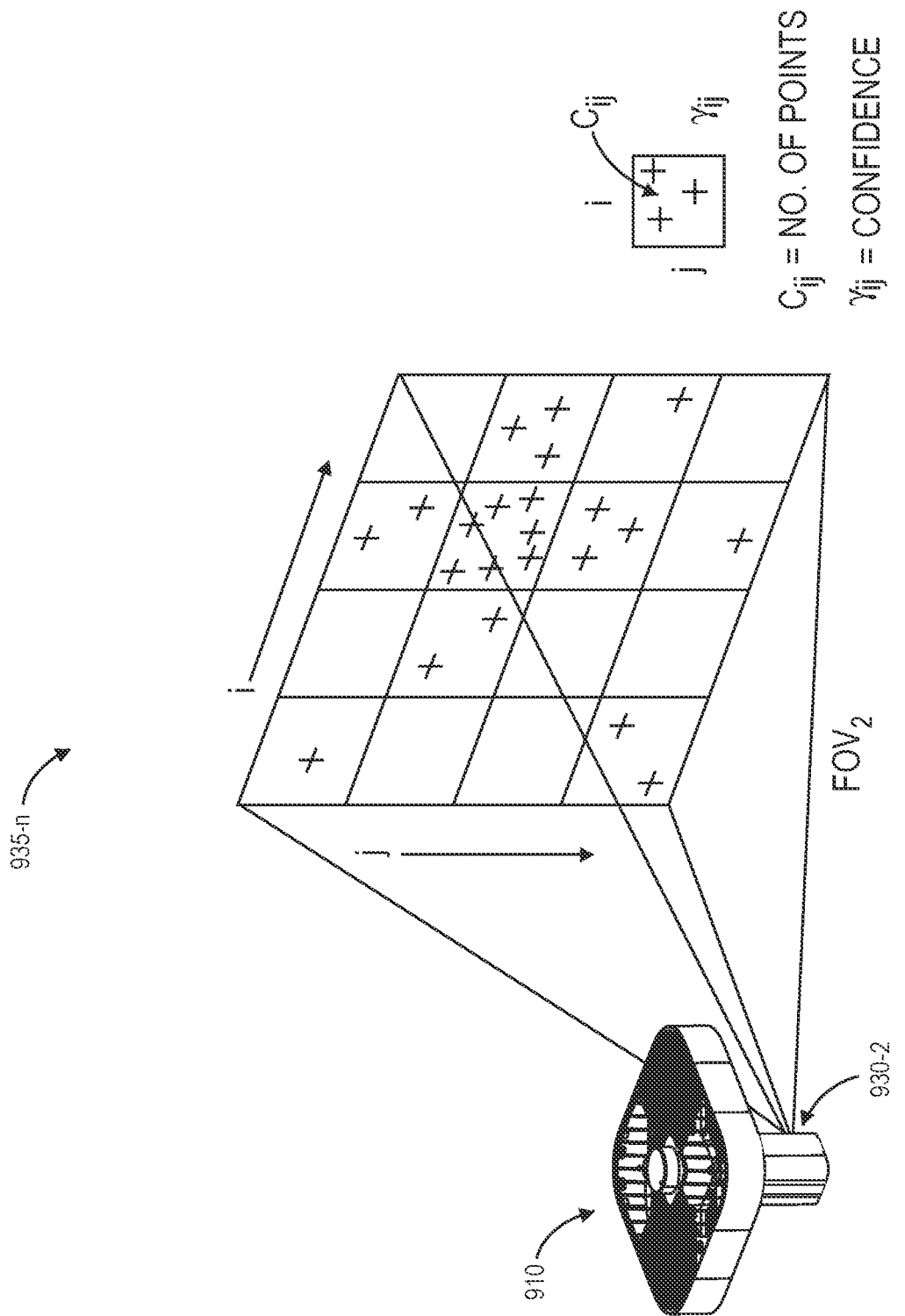

As is shown in FIG. 9E, the range sensor 930-2 may transmit and receive light within the pyramidal field of view $FOV_2$, which may be defined by any angle, e.g., approximately forty-five degrees, or any other angle. For example, in some implementations, the unmanned aerial vehicle 910 may interpret any received light in a local map with a grid having a plurality of cells 935-$n$ arranged in rows and columns, e.g., a grid of sixteen cells in four rows and four columns. Where the range sensor 930-2 transmits light, and receives points (or returns or detections) of the transmitted light reflected off one or more surfaces, the unmanned aerial vehicle 910 may calculate a number of the points $C_{ij}$ within any given cell of the cells 935-$n$ at row i and column j, and calculate a confidence score $\gamma_{ij}$ in such points (or returns or detections). The numbers of points $C_{ij}$ and the confidence scores $\gamma_{ij}$ may be calculated for each of such cells 935-$n$ at any rate or frequency, e.g., ten hertz (10 Hz), one hundred hertz (100 Hz), or any other rate or frequency, based on points received by the range sensor 930-2. Upon receiving data regarding one or more returns of reflections of the transmitted light, the range sensor 930-2 may determine a distance to the object, based on an elapsed time between the transmission and the return, or in any other manner.

Figure 9F:
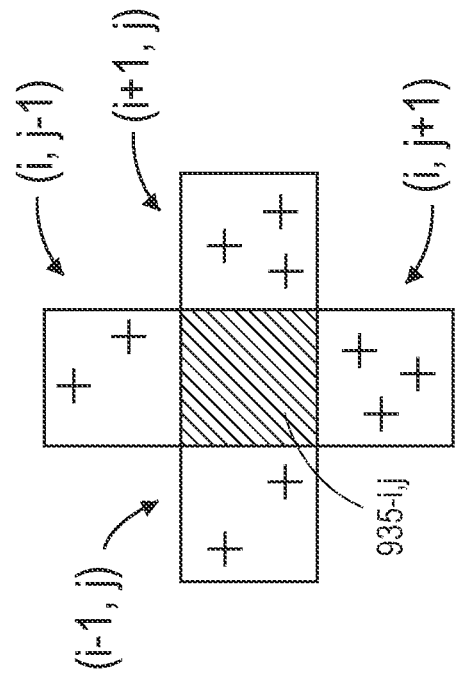
Figure 9F:
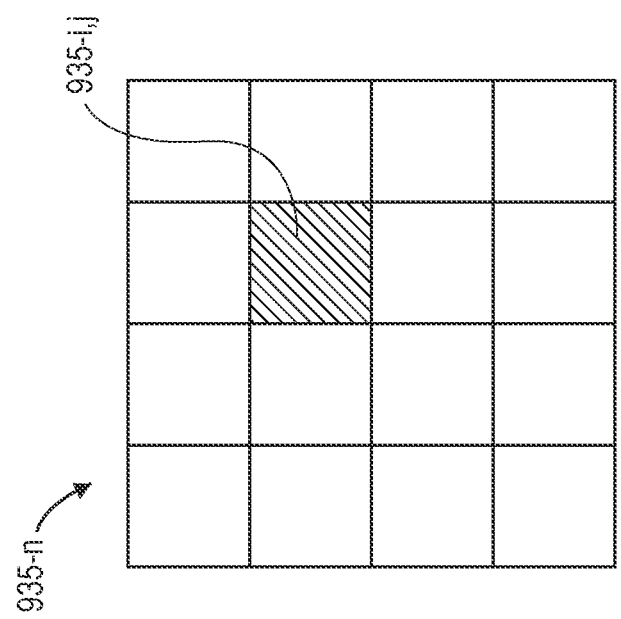

As is shown in FIG. 9F, whether the cell 935-$ij$ may be deemed non-empty (or obstructed), or empty (or unobstructed), is determined based on the number of the points $C_{ij}$ calculated for the cell 935-$ij$, the confidence score $\gamma_{ij}$ in the number of the points $C_{ij}$, and how the number of the points $C_{ij}$ compares to numbers of points of one or more neighboring cells. First, where the confidence score $\gamma_{ij}$ is sufficiently high, the number of the points $C_{ij}$ calculated for the cell 935-$ij$ may be relied upon as accurately reflecting the presence or absence of objects within the cell 935-$ij$. Next, where the number of the points $C_{ij}$ is consistent with numbers of points in neighboring cells, viz., a cell (i,j−1) located above the cell 935-$ij$, a cell (i,j+1) located below the cell 935-$ij$, a cell (i−1,j) located to a left side of the cell 935-$ij$, or a cell (i+1,j) located to a right side of the cell 935-$ij$, the number of the points Cy calculated for the cell 935-$ij$ may be deemed to be accurate, and neither an outlier nor an aberration.

Thus, where the number of the points $C_{ij}$ calculated for the cell 935-$ij$ exceeds a threshold K, where the confidence score $\gamma_{ij}$ in the number of the points Cy exceeds a threshold T, and where the number of the points $C_{ij}$ is consistent with numbers of points of one or more neighboring cells, the cell 935-$ij$ may be determined to be non-empty (or obstructed), and an object may be determined to be within the field of view $FOV_2$. Conversely, if the cell 935-$ij$ does not exceed the threshold K, if the confidence score $\gamma_{ij}$ in the number of the points Cy does not exceed the threshold T, or if the number of the points $C_{ij}$ is inconsistent with each of the numbers of points of neighboring cells, the cell 935-$ij$ may be determined to be empty (or unobstructed), and the field of view $FOV_2$. may be determined to be free of objects within a predetermined distance D. The unmanned aerial vehicle 910 may be determined to be at risk of collision where any number of the cells 935-$n$, viz., one or more, is determined to be non-empty (or obstructed).

Figure 9G:
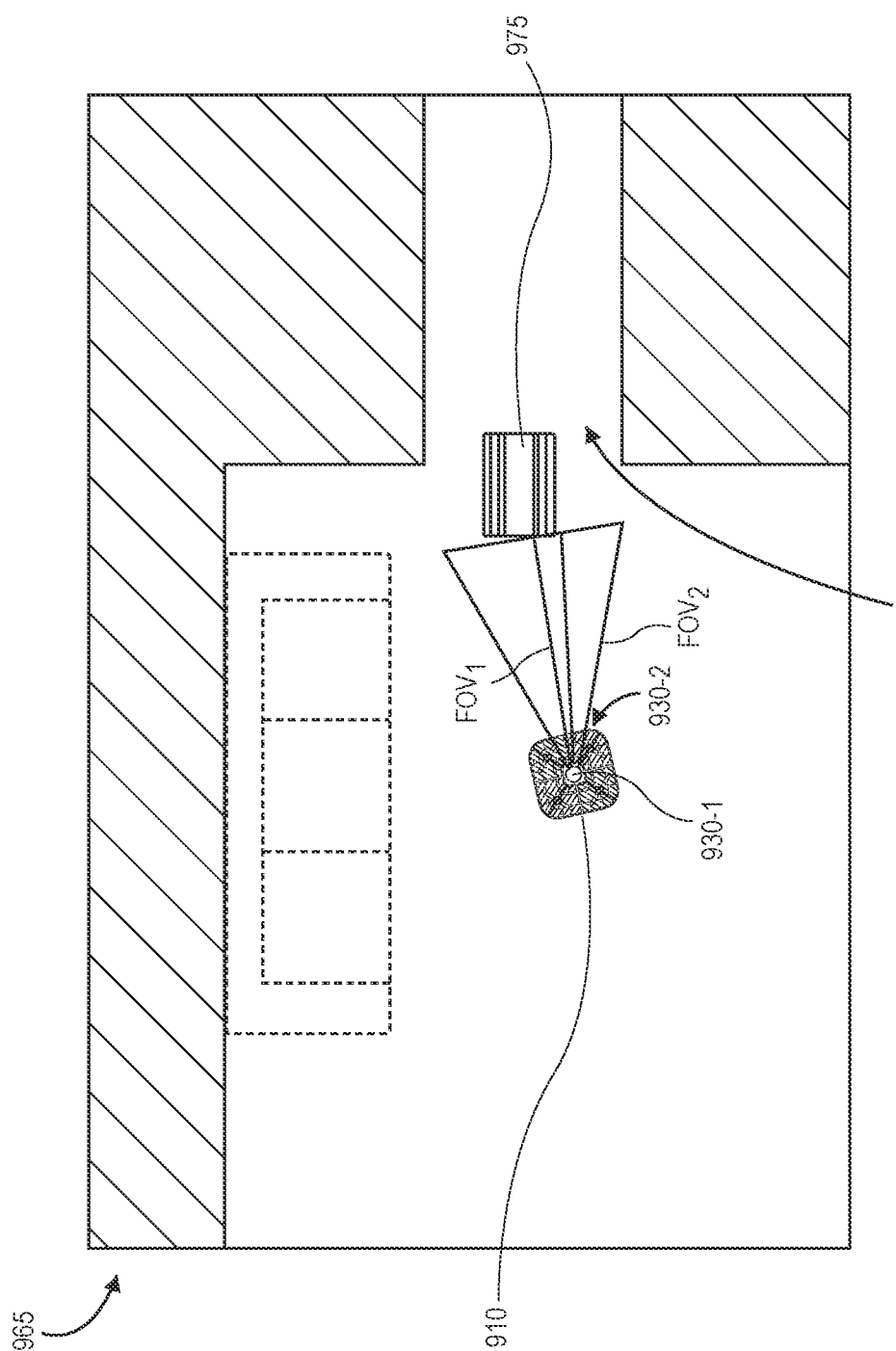

As is shown in FIG. 9G, the temporary obstacle 975 may be detected based on returns within the field of view $FOV_1$ of the range sensor 930-1 or within the field of view $FOV_2$ of the range sensor 930-2, returns from one or more of the sectors forward of the unmanned aerial vehicle 910, such as is shown in FIG. 9D, or returns in one or more of the cells forward of the unmanned aerial vehicle 910, such as is shown in FIGS. 9E and 9F.

Upon detecting the temporary obstacle 975, a position of the temporary obstacle 975 in three-dimensional space may be determined, e.g., based on the navigation map 965, or in any other manner, and stored in one or more data stores. In some implementations, the position of the temporary obstacle 975 may be determined based on times associated with detections of the temporary obstacle 975 by the range sensor 930-1 and the range sensor 930-2, respectively. For example, a two-dimensional point cloud or other representation determined by the range sensor 930-1 may be fused or combined with a three-dimensional depth image or other representation determined by the range sensor 930-2, to determine a position in three-dimensional space of the temporary obstacle 975, where a pose (e.g., a position or an orientation) of the unmanned aerial vehicle 910 are known.

Accordingly, the unmanned aerial vehicle 910 may execute one or more braking maneuvers, calculate a new trajectory for the unmanned aerial vehicle 910, or take any other actions.

In accordance with one or more preferred implementations, an unmanned aerial vehicle determines a yaw adjustment plan for a flight from a first waypoint to a second waypoint separate from determination of a translation plan (e.g., a translation plan determined based on a calculated trajectory). Such a yaw adjustment plan may be determined based on (i) a calculated trajectory or (ii) pose/yaw information for waypoints stored as part of path or waypoint data. For example, waypoint data for a first waypoint may include an indication that, at the first waypoint, the unmanned aerial vehicle should have a particular yaw angle with respect to a particular point of reference or coordinate system. As another example, trajectory data for a first waypoint may include an indication that, at the first waypoint, the unmanned aerial vehicle should have a particular yaw angle with respect to a particular point of reference or coordinate system. In accordance with one or more preferred implementations, a desired yaw value for a waypoint is determined based on spatial data for a next waypoint.

In some implementations, where a calculated trajectory or yaw adjustment plan calls for a change in yaw of an unmanned aerial vehicle between a pair of waypoints, an estimated time for achieving the change in yaw may be calculated based on a maximum yaw velocity of the unmanned aerial vehicle, and compared to an estimated time required to translate between the pair of waypoints according to a calculated trajectory.

For example, in accordance with one or more preferred implementations, where an estimated time for achieving a change in yaw is greater than an estimated time required to translate between a pair of waypoints according to a calculated trajectory, then two-point path planning for an unmanned aerial vehicle to travel from a first waypoint of the pair to a second waypoint of the pair is utilized. Once the unmanned aerial vehicle reaches the second waypoint, the unmanned aerial vehicle may pause its translation to complete a required yaw rotation, or, alternatively, continue onward in accordance with a calculated trajectory. Commands or instructions for causing the unmanned aerial vehicle to translate along the trajectory and effect a yaw rotation may be generated and sent to a flight controller separately or together.

In accordance with one or more preferred implementations, where the estimated time for achieving the change in yaw is less than the estimated time required to translate between the pair of waypoints according to the calculated trajectory, however, an intervening waypoint is inserted between the pair of waypoints, at a distance from the second waypoint that is sufficient to allow the unmanned aerial vehicle to complete the yaw rotation during its flight from the intervening waypoint to the second waypoint. During flight, yaw rotation may begin when the unmanned aerial vehicle reaches the intervening waypoint. Alternatively, in accordance with one or more preferred implementations, where the estimated time for achieving the change in yaw is less than the estimated time required to translate between the pair of waypoints according to the calculated trajectory, an intervening waypoint is inserted between the pair of waypoints, based on a determined point that is a distance from the first waypoint sufficient to allow the unmanned aerial vehicle to complete its yaw rotation during its flight from the first waypoint to the intervening waypoint. During flight, yaw rotation may begin at the first waypoint and ends when the unmanned aerial vehicle reaches the intervening waypoint. Commands or instructions for causing the unmanned aerial vehicle to translate along the trajectory and effect yaw rotation may be generated and sent to a flight controller separately or together.

The contents of U.S. patent application Ser. Nos. 16/584,721 and 17/029,688, and International Patent Application No. PCT/US2020/052268, are incorporated by reference herein in their entireties.

Although some embodiments of the present disclosure show the use of unmanned aerial vehicles in support of one or more applications or functions at a facility such as a home or a like structure, those of ordinary skill in the pertinent arts will realize that the systems and methods of the present disclosure are not so limited. Rather, the systems and methods of the present disclosure may be utilized in connection with any facility, including but not limited to homes, in support of any type of application or function.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 5 or 6, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An aerial vehicle comprising:
a plurality of propulsion motors, wherein each of the propulsion motors is configured to rotate a propeller at one or more rotational speeds;
at least one range sensor provided in association with a fuselage defining a first axis, wherein the at least one range sensor is configured to transmit light and receive reflected light;
at least one memory component; and
at least one computer processor,
wherein the at least one memory component is programmed with one or more sets of instructions that, when executed by the at least one computer processor, cause the aerial vehicle to at least:

identify positions of each of a plurality of waypoints aligned in a path, wherein each of the positions is located within at least one indoor space of a facility;

operate at least one of the plurality of propulsion motors to cause the aerial vehicle to travel on a course, at a speed, and at an altitude associated with a first trajectory from a first waypoint of the plurality of waypoints through a second waypoint of the plurality of waypoints to a third waypoint of the plurality of waypoints;

determine, based at least in part on first data captured by the at least one range sensor, that at least one object is within a detection zone defined at least in part by:

a first predetermined distance; and
an angle relative to an axis defined based on a front of the aerial vehicle;

based at least in part on determining that the detection zone;

determine a position of the aerial vehicle at a first time;

calculate a second trajectory from the position of the aerial vehicle at the first time through the second waypoint to the third waypoint, wherein the second trajectory is calculated according to an equation for minimizing snap of an aerial vehicle comprising a plurality of polynomial functions based at least in part on:

a maximum speed of the aerial vehicle;
a maximum acceleration of the aerial vehicle;
the position of the aerial vehicle at the first time;
a speed of the aerial vehicle at the first time;
a position of the second waypoint; and
a position of the third waypoint;

generate commands for causing the aerial vehicle to travel on a course, at a speed, and at an altitude associated with the second trajectory from the position of the aerial vehicle at the first time to the second waypoint through at least the third waypoint according to the second trajectory; and execute at least a first set of the commands for causing the aerial vehicle to travel from the position of the aerial vehicle at the first time to the third waypoint.

2. The aerial vehicle of claim 1, wherein the at least one range sensor comprises:

a first range sensor mounted at an upper end of the fuselage, wherein the first range sensor is configured to transmit first light along a second axis normal to and radially outward from the first axis and to receive one or more reflections of the first light, and wherein the first range sensor is configured to rotate the second axis about the first axis within a plane perpendicular to the first axis; or a second range sensor provided within a chamber defined by the fuselage, wherein the second range sensor is configured to transmit second light along a third axis extending normal to one of the sides of the fuselage and to receive one or more reflections of the second light.

3. The aerial vehicle of claim 1, wherein the one or more sets of instructions, when executed by the at least one computer processor, further cause the aerial vehicle to at least:

determine based at least in part on second data captured by the at least one range sensor that at least one object is located within a second predetermined distance of the aerial vehicle at a second time, wherein the second time follows the first time; and in response to determining that the at least one object is located within the second predetermined distance of the aerial vehicle at the second time, cause the aerial vehicle to execute a deceleration maneuver, wherein the first predetermined distance is approximately one hundred centimeters, and wherein the second predetermined distance is approximately thirty centimeters.

4. A method comprising:

storing spatial point data for each of a plurality of spatial points, wherein the plurality of spatial points comprises a first spatial point, a second spatial point, and a third spatial point;

determining, based at least in part on a first maximum speed value, first trajectory data for traveling from the first spatial point to the third spatial point through the second spatial point;

operating, by at least one processor unit provided aboard an aerial vehicle, at least one propulsion motor of the aerial vehicle to cause the aerial vehicle to travel in a facility based at least in part on the first trajectory data;

generating, by at least a first sensor provided aboard the aerial vehicle, first sensor data based at least in part on return of light transmitted by the first sensor;

determining, based at least in part on the first sensor data, that an obstacle is located within a first distance of the aerial vehicle;

in response to determining that the obstacle is located within the first distance of the aerial vehicle, determining a position associated with the aerial vehicle; and determining, based at least in part on a second maximum speed value, second trajectory data for traveling from the position associated with the aerial vehicle to the third spatial point through the second spatial point, wherein the second maximum speed value is less than the first maximum speed value; and operating, by the at least one processor unit, the at least one propulsion motor to cause the aerial vehicle to travel in the facility based at least in part on the second trajectory data.

5. The method of claim 4, wherein the first trajectory data defines a first trajectory from the first spatial point to the third spatial point through the second spatial point.

6. The method of claim 4, wherein the first trajectory data comprises spatial point data for at least the first spatial point, the second spatial point and the third spatial point.

7. The method of claim 6, wherein the spatial point data for the plurality of spatial points was generated based at least in part on a set of one or more equations based at least in part on a maximum speed of the aerial vehicle; a maximum acceleration of the aerial vehicle; the position of the aerial vehicle at the first time; a speed of the aerial vehicle at the first time; a position of the second spatial point; and a position of the third spatial point.

8. The method of claim 6, wherein operating the at least one propulsion motor to cause the aerial vehicle to travel in the facility based at least in part on the first trajectory data comprises:

sending, to a flight controller of the aerial vehicle, setpoint data for one of the plurality of spatial points.

9. The method of claim 6, wherein the plurality of spatial points comprises the first spatial point, the second spatial point, and the third spatial point.

10. The method of claim 4, wherein the first trajectory data defines a first trajectory from the first spatial point to the third spatial point through the second spatial point, and
wherein operating the at least one propulsion motor to cause the aerial vehicle to travel in the facility based at least in part on the first trajectory data comprises:
sending, to a flight controller, setpoint data for a fourth spatial point.

11. The method of claim 4, wherein the first trajectory data defines a first trajectory from the first spatial point to the third spatial point through the second spatial point,
wherein the method further comprises:
determining, for a first time, a fourth spatial point, and
wherein operating the at least one propulsion motor to cause the aerial vehicle to travel in the facility based at least in part on the first trajectory data comprises:
sending, to a flight controller, setpoint data for the fourth spatial point.

12. The method of claim 11, wherein the setpoint data for the fourth spatial point comprises data representing an x-value with respect to a coordinate system, data representing a y-value with respect to the coordinate system, and data representing a z-value with respect to the coordinate system.

13. The method of claim 4, wherein the spatial point data comprises, for each of the plurality of spatial points, data representing an x-value with respect to a coordinate system, data representing a y-value with respect to the coordinate system, and data representing a z-value with respect to the coordinate system.

14. The method of claim 4, wherein the position associated with the aerial vehicle is a position of the aerial vehicle at a first time.

15. The method of claim 14, wherein the first time is a current time.

16. The method of claim 14, wherein the first time is a most recent time for which position data is available.

17. The method of claim 14, wherein the first time is a time at which that the obstacle is located within the first distance of the aerial vehicle is determined.

18. The method of claim 14, wherein the first time is a future time, and
wherein the position associated with the aerial vehicle is a calculated future position.

19. The method of claim 4, wherein the position associated with the aerial vehicle is a position associated with a trajectory associated with the aerial vehicle.

20. The method of claim 4, wherein the position associated with the aerial vehicle is randomly selected based at least in part on another position associated with the aerial vehicle.

21. The method of claim 4, further comprising:
in response to determining that the obstacle is located within the first distance of the aerial vehicle,
sending a command to a flight controller to reduce a speed of the aerial vehicle.

22. The method of claim 4, further comprising:
in response to determining that the first obstacle is located within the first distance of the aerial vehicle, and prior to operating the at least one propulsion motor to cause the aerial vehicle to travel in the facility based at least in part on the second trajectory data,
operating the at least one propulsion motor to cause the aerial vehicle to decelerate.

23. The method of claim 4, wherein determining that the obstacle is located within the first distance of the aerial vehicle comprises:

determining, based at least in part on the first sensor data, that the obstacle is located within a flight path of the aerial vehicle,
wherein the second trajectory is determined in response to determining that the obstacle is located within the flight path of the aerial vehicle.

24. The method of claim 4, wherein determining that the obstacle is located within the first distance of the aerial vehicle comprises:
determining, based at least in part on the first sensor data, that the obstacle has been detected within a detection area defined based at least in part on an angle relative to an axis defined based at least in part on a front of the aerial vehicle.

25. The method of claim 4, wherein determining that the obstacle is located within the first distance of the aerial vehicle comprises:
determining, based at least in part on the first sensor data, that the obstacle has been detected within a detection area defined based at least in part on an angle relative to a direction associated with movement of the aerial vehicle.

26. The method of claim 4, wherein the second trajectory data is calculated according to an equation comprising a plurality of polynomial functions based at least in part on:
the first maximum speed value,
the position of the aerial vehicle at the first time,
a speed value of the aerial vehicle associated with the first time,
a position of the second spatial point, and
a position of the third spatial point.

27. The method of claim 4, wherein the first sensor comprises a LIDAR sensor.

28. The method of claim 4, wherein the first sensor comprises a time-of-flight sensor.

29. The method of claim 4, further comprising:
updating, based at least in part on the first sensor data, a first environment map; and
generating, based at least in part on the first sensor data, a second environment map,
wherein that the first obstacle is located within the first distance of the aerial vehicle is determined based at least in part on the second environment map.

30. The method of claim 4, further comprising:
updating, based at least in part on the first sensor data, a first environment map;
generating, based at least in part on the first sensor data, a second environment map;
generating, by at least the first sensor provided aboard the aerial vehicle, second data based at least in part on return of light transmitted by the first sensor;
updating, based at least in part on the second data, the first environment map; and
generating, based at least in part on the second data, a third environment map,
wherein that the first obstacle is located within the first distance of the aerial vehicle is determined based at least in part on the second environment map and the third environment map.

31. The method of claim 4, further comprising:
updating, based at least in part on the first sensor data, a first environment map;
generating, based at least in part on the first sensor data, a second environment map, and
wherein that the obstacle is located within the first distance of the aerial vehicle is determined based at least in part on the second environment map, and wherein the position associated with the aerial vehicle is based at least in part on the first environment map.

32. The method of claim 4, wherein the aerial vehicle comprises:
   a fuselage having a first height and a first cross-section;
   a frame having a second height and a second cross-section,
      wherein the frame comprises a plurality of sides having the second height and a second width that define the second cross-section, and
      wherein a centroid of the first cross-section is aligned along a first axis with a centroid of the second cross-section;
   a plurality of struts, wherein each of the struts has a proximal end joined to an external surface of the fuselage and a distal end joined to an internal surface of the frame, wherein the at least one propulsion motor comprises a housing coupled to one of the plurality of struts, and wherein the at least one propulsion motor is configured to rotate a propeller at one or more rotational speeds;
   a first range sensor mounted in association with the fuselage;
   a second range sensor mounted in association with the frame;
   a visual camera disposed within a chamber defined by the fuselage, wherein the visual camera comprises a lens defining a field of view extending normal to the fuselage, and wherein the at least one memory component is provided within the chamber; and
   at least one transceiver provided within the chamber defined by the fuselage, wherein the at least one memory component and the processor unit are provided within the chamber,
   wherein the at least one processor unit is in communication with each of the motors, the first range sensor, the second range sensor, the at least one memory component and the at least one transceiver, and
   wherein the first sensor is one of the first range sensor, the second range sensor or the visual camera.

33. The method of claim 4, further comprising:
   determining a second distance required for the aerial vehicle to accelerate from a speed of zero to the maximum speed;
   determining a third distance required for the aerial vehicle to decelerate from the maximum speed to a speed of zero;
   determining that a distance between the first spatial point and the second spatial point is not less than a sum of the second distance and the third distance; and
   in response to determining that the distance between the first spatial point and the second spatial point is not less than the sum of the second distance and the third distance,
   generating a fourth spatial point based on the first spatial point and the second spatial point, wherein a position of the fourth spatial point in three-dimensional space is at the second distance from the position of the first spatial point; and
   generating a fifth spatial point based on the first spatial point and the second spatial point, wherein a position of the fifth spatial point in three-dimensional space is at the third distance from the position of the second spatial point,
   wherein the first trajectory data is generated based at least in part on the fourth spatial point and the fifth spatial point.

34. An aerial vehicle comprising:
   a plurality of propulsion motors
   a first range sensor, wherein the first range sensor is configured to transmit light and receive reflected light;
   at least one memory component;
   at least one transceiver; and
   at least one computer processor,
   wherein the at least one memory component is programmed with one or more sets of instructions that, when executed by the at least one computer processor, cause the unmanned aerial vehicle to perform operations comprising:
   storing spatial point data for each of a plurality of spatial points, wherein the plurality of spatial points comprises a first spatial point, a second spatial point, and a third spatial point;
   determining, based at least in part on a first maximum speed value, first trajectory data for traveling from the first spatial point to the third spatial point through the second spatial point;
   operating at least one of the plurality of propulsion motors to cause the aerial vehicle to travel based at least in part on the first trajectory data;
   generating first sensor data based on return of light transmitted by the first range sensor;
   determining that the first sensor data indicates that an obstacle is located within a first distance of the aerial vehicle;
   in response to determining that the obstacle is located within the first distance of the aerial vehicle,
      determining a position associated with the aerial vehicle;
   determining, based at least in part on a second maximum speed value, second trajectory data for traveling from the position to the third spatial point through the second spatial point, wherein the second maximum speed value is less than the first maximum speed value; and
   operating the at least one of the plurality of propulsion motors to cause the aerial vehicle to travel based on the second trajectory data.

* * * * *